United States Patent
Hughes

(10) Patent No.: US 11,520,301 B2
(45) Date of Patent: Dec. 6, 2022

(54) DATA INTERACTION PLATFORMS UTILIZING DYNAMIC RELATIONAL AWARENESS

(71) Applicant: DSi Digital, LLC, Peachtree Corners, GA (US)

(72) Inventor: Anthony Mitchell Hughes, Alpharetta, GA (US)

(73) Assignee: DSi Digital, LLC, Peachtree Corners, GA (US)

( * ) Notice: Subject to any disclaimer, the term of this patent is extended or adjusted under 35 U.S.C. 154(b) by 0 days.

(21) Appl. No.: 17/474,588

(22) Filed: Sep. 14, 2021

(65) Prior Publication Data

US 2021/0405596 A1 Dec. 30, 2021

Related U.S. Application Data

(63) Continuation of application No. 16/699,874, filed on Dec. 2, 2019, now Pat. No. 11,144,018.
(Continued)

(51) Int. Cl.
*G05B 13/04* (2006.01)
*G06F 16/21* (2019.01)
(Continued)

(52) U.S. Cl.
CPC ......... *G05B 13/048* (2013.01); *G06F 16/212* (2019.01); *G06F 16/248* (2019.01);
(Continued)

(58) Field of Classification Search
CPC ............. G05B 13/048; G06F 16/24573; G06F 16/2458; G06F 16/287; G06F 16/212;
(Continued)

(56) References Cited

U.S. PATENT DOCUMENTS 6,405,364 B1 6/2002 Bowman-Amuah
6,584,184 B1 6/2003 Nabkel et al.
(Continued)

FOREIGN PATENT DOCUMENTS

CN 108229440 A 6/2018

OTHER PUBLICATIONS

NonFinal Office Action for U.S. Appl. No. 17/474,536, dated Aug. 19, 2022, (15 pages), United States Patent and Trademark Office, US.
(Continued)

*Primary Examiner* — Jorge A Casanova
(74) *Attorney, Agent, or Firm* — Alston & Bird LLP

(57) ABSTRACT

There is a need for more effective and efficient data modeling and/or data visualization solutions. This need can be addressed by, for example, solutions for performing data modeling and/or data visualization in an effective and efficient manner. In one example, solutions for generating a data model with dynamic relational awareness are disclosed. In another example, solutions for processing data retrieval queries using data models with dynamic relational awareness are disclosed. In yet another example, solutions for generating data visualizations using data models with dynamic relational awareness are disclosed. In a further example, solutions for integrating external data objects into data models with dynamic relational awareness are disclosed.

20 Claims, 39 Drawing Sheets

Related U.S. Application Data

(60) Provisional application No. 62/774,573, filed on Dec. 3, 2018, provisional application No. 62/774,602, filed on Dec. 3, 2018, provisional application No. 62/774,569, filed on Dec. 3, 2018, provisional application No. 62/774,579, filed on Dec. 3, 2018.

(51) Int. Cl.

| | | |
|---|---|---|
| *G06F 16/2457* | (2019.01) | |
| *G06F 16/2458* | (2019.01) | |
| *G06F 16/248* | (2019.01) | |
| *G06F 16/26* | (2019.01) | |
| *G06F 16/28* | (2019.01) | |
| *G06F 21/60* | (2013.01) | |
| *G06F 21/62* | (2013.01) | |
| *G06F 3/0482* | (2013.01) | |
| *G06F 3/0484* | (2022.01) | |
| *G06K 9/66* | (2006.01) | |
| *G06N 20/00* | (2019.01) | |
| *G06N 3/02* | (2006.01) | |
| *G06N 5/04* | (2006.01) | |
| *G06N 7/00* | (2006.01) | |
| *H04L 29/06* | (2006.01) | |
| *H04L 9/40* | (2022.01) | |
| *G06V 30/194* | (2022.01) | |

(52) U.S. Cl.
CPC .... *G06F 16/2458* (2019.01); *G06F 16/24573* (2019.01); *G06F 16/24578* (2019.01); *G06F 16/26* (2019.01); *G06F 16/282* (2019.01); *G06F 16/287* (2019.01); *G06F 16/288* (2019.01); *G06F 16/289* (2019.01); *G06F 21/604* (2013.01); *G06F 21/6209* (2013.01); *G06N 3/02* (2013.01); *G06N 5/04* (2013.01); *G06N 7/005* (2013.01); *G06N 20/00* (2019.01); *G06V 30/194* (2022.01); *H04L 63/105* (2013.01); *G06F 3/0482* (2013.01); *G06F 3/0484* (2013.01)

(58) Field of Classification Search
CPC .. G06F 16/24578; G06F 16/26; G06F 16/248; G06F 16/289; G06F 16/282; G06F 16/288; G06F 21/604; G06F 21/6209; G06F 3/0482; G06F 3/0484; G06F 2221/2111; G06F 21/62; G06N 20/00; G06N 20/10; G06N 20/20; G06N 5/04; G06N 7/005; G06N 3/02; G06N 5/022; H04L 63/105; G06K 9/66; G06T 11/206; G06Q 10/04; G06Q 10/06

See application file for complete search history.

(56) References Cited

U.S. PATENT DOCUMENTS

| | | |
|---|---|---|
| 7,389,208 B1 | 6/2008 | Solinsky |
| 10,739,955 B2 | 8/2020 | Wang et al. |
| 11,126,151 B2 | 9/2021 | Hughes |
| 2001/0048217 A1 | 12/2001 | Seip |
| 2002/0083072 A1 | 6/2002 | Steuart |
| 2003/0023715 A1 | 1/2003 | Reiner et al. |
| 2003/0154381 A1 | 8/2003 | Ouye et al. |
| 2005/0060048 A1 | 3/2005 | Pierre et al. |
| 2008/0148340 A1 | 6/2008 | Powell et al. |
| 2008/0288306 A1 | 11/2008 | MacIntyre et al. |
| 2009/0273602 A1 | 11/2009 | Wong et al. |
| 2009/0292755 A1 | 11/2009 | Waagen et al. |
| 2011/0167479 A1 | 7/2011 | Maes |
| 2011/0173264 A1 | 7/2011 | Kelly |
| 2014/0074758 A1 | 3/2014 | Amid et al. |
| 2014/0101580 A1 | 4/2014 | Shen et al. |
| 2014/0250534 A1 | 9/2014 | Flores |
| 2014/0297268 A1 | 10/2014 | Govrin et al. |
| 2014/0379615 A1 | 12/2014 | Brigham et al. |
| 2014/0380285 A1 | 12/2014 | Gabel et al. |
| 2015/0347746 A1 | 12/2015 | Martel et al. |
| 2016/0026253 A1 | 1/2016 | Bradski et al. |
| 2016/0092691 A1 | 3/2016 | Thom et al. |
| 2016/0182529 A1 | 6/2016 | Biehl et al. |
| 2016/0224664 A1 | 8/2016 | Noren et al. |
| 2016/0248809 A1 | 8/2016 | Smith et al. |
| 2016/0378919 A1 | 12/2016 | McNutt et al. |
| 2017/0032017 A1 | 2/2017 | Morinaga et al. |
| 2017/0220582 A1 | 8/2017 | McCann et al. |
| 2017/0323028 A1 | 11/2017 | Jonker et al. |
| 2017/0351241 A1 | 12/2017 | Bowers et al. |
| 2017/0364534 A1 | 12/2017 | Zhang et al. |
| 2018/0046714 A1 | 2/2018 | Blaas |
| 2019/0058682 A1 | 2/2019 | MacAskill et al. |
| 2019/0073406 A1 | 3/2019 | Xu et al. |
| 2019/0121350 A1 | 4/2019 | Celia et al. |
| 2019/0129732 A1 | 5/2019 | Sivertson |
| 2019/0158498 A1 | 5/2019 | Brouillette et al. |
| 2019/0213282 A1 | 7/2019 | Perumal et al. |

OTHER PUBLICATIONS

Notice of Allowance and Fee(s) Due for U.S. Appl. No. 16/699,838, dated Mar. 23, 2022, (15 pages), United States Patent and Trademark Office, USA.

Building Information Modeling, Wikipedia, (19 pages), [online], [retrieved from the Internet Dec. 31, 2019] <https://en.wikipedia.org/wiki/Building_information_modeling>.

Cabrera, Derek, Relationships (R ) Are Not Enough!, (7 pages), [article, online], [retrieved from the Internet Dec. 31, 2019] <https://stdaily.ghost.io/relationships-r-are-not-enough/>.

DARPA Perspective On Artificial Intelligence, Defense Advanced Research Projects Agency, (2 pages), [article, online], [retrieved from the Internet Dec. 31, 2019] <https://www.darpa.mil/about-us/darpa-perspective-on-ai>.

Ge, Chenjie et al. *Deep Learning and Multi-Sensor Fusion For Glioma Classification Using Multistream 2D Convolutional Networks*, 2018 40th Intenrational Conference of the IEEE Engineering In Medicine and Socity (EMBC), Jul. 18, 2018, pp. 5894-5897. XP033429601, DOI: 10.1109/EMBC.2018.8513556.

Huth, Alexander G. et al. A Continuous Semantic Space Descibes The Representation Of Thousands of Object and Action Categories Action Categories Across The Human Brain, Neuron, vol. 76, Issue 6, pp. 1210-1224, Dec. 20, 2012. DOI: https://doi.org/10.1016/j.neuron.2012.10.014.

Huth, Alexander G. *Natural Speech Reveals The Semantic Maps That Tile Human Cerebral Cortex*, Nature, vol. 532, pp. 453-458, Apr. 28, 2016. DOI: 10.1038/nature17637.

International Searching Authority, International Search Report and Written Opinion for International Application No. PCT/US2019/064000, dated Jan. 29, 2020, (14 pages), European Patent Office, Rijswijk, The Netherlands.

International Searching Authority, International Search Report and Written Opinion for International Application No. PCT/US2019/064007, dated Jan. 29, 2020, (14 pages), European Patent Office, Rijswijk, The Netherlands.

International Searching Authority, International Search Report and Written Opinion for International Application No. PCT/US2019/064009, dated Jan. 29, 2020, (15 pages), European Patent Office, Rijswijk, The Netherlands.

International Searching Authority, International Search Report and Written Opinion for International Application No. PCT/US2019/064014, dated Feb. 24, 2020, (15 pages), European Patent Office, Rijswijk, The Netherlands.

International Searching Authority, International Search Report and Written Opinion for International Application No. PCT/US2019/064019, dated Feb. 4, 2020, (16 pages), European Patent Office, Rijswijk, The Netherlands.

(56) References Cited

OTHER PUBLICATIONS

Kanner, Josh et al. *Get Ready For Artificial Intelligence In Construction*, Autodesk University, (5 pages), [article, online], [retrieved from the Internet Dec. 31, 2019] <https://www.autodesk.com/autodesk-university/class/Get-Ready-Artificial-Intelligence-Construction-2017#chapter>.

Kaur, Karamjit et al. *Modeling and Querying Data In NoSQL Databases*, 2013 IEEE International Conference On Big Data, Oct. 6, 2013, pp. 1-7, IEEE. XP032535034. DOI: 10.1109/BIGDATA.2013.6691765.

Liu, Jie et al. *An Integrated Multi-Sensor Fusion-Based Deep Feature Learning Approach For Rotating Machinery Diagnosis*, Measurement Science and Technology, IOP Publishing, vol. 29, No. 5:055103, Mar. 23, 2012, pp. 1-12. XP020326551, ISSN: 0957-0233, DOI: 10.1088/1361-6501/AAACA6.

Mac Carron, Pádraig et al. *Calling Dunbar's Numbers*, Elsevier Social Networks, vol. 47, pp. 151-155 (2016). DOI:10.1016/j.socnet.2016.003.

Mees, Oier et al. *Choosing Smartly: Adaptive Multimodal Fusion For Object Detection In Changing Environments*, Cornell University Library, arXiv: 1707.05733v2 [cs.RO], Nov. 19, 2019, (6 pages). XP08156082, DOI: 10.1109/IROS.2016.7759048.

Mobile Attribution Platform & Mobile App Analytics, Kochava, (7 pages), [online], [retrieved from the Internet Dec. 31, 2019] <https://www.kocha.com/>.

NonFinal Office Action for U.S. Appl. No. 16/699,853, dated Sep. 1, 2021, (26 pages), United States Patent and Trademark Office, USA.

NonFinal Office Action for U.S. Appl. No. 16/699,881, dated Feb. 5, 2021, (27 pages), United States Patent and Trademark Office, USA.

NonFinal Office Action for U.S. Appl. No. 16/699,892, dated Jun. 17, 2021, (13 pages), United States Patent and Trademark Office, USA.

Notice of Allowance and Fee(s) Due for U.S. Appl. No. 16/699,874, dated Jun. 16, 2021, (21 pages), United States Patent and Trademark Office, USA.

Probabilistic Programming, (10 pages), [article, online], [retrieved from the Internet Dec. 31, 2019] <http://www.cs.cornell.edu/courses/cs4110/2016fa/lectures/lecture33.html>.

Roemer, Michael J. et al. *Assessment Of Data and Knowledge Fusion Strategies For Prognostics and Health Management*, . In 2001 IEEE Aerospace Conference Proceedings (Cat. No. 01TH8542), vol. 6, Mar. 10-17, 2001, pp. 2979-2988. XP010548420, ISBN: 978-0-7803-6599-5.

Thaler, S.L. Autonomous Ultrahard Materials Discovery Via Spreadsheet-Implemented Neural Network Cascades, (11 pages), [article, online], [retrieved from the Internet Dec. 31, 2019] <https://www.tms.org/pubs/journals/JOM/9704/Thaler/Thaler-9704.html>.

Van Cleeff, André et al. *Benefits Of Location-Based Access Control: A Literature Study*, 2010 IEEE/ACM International Conference On Green Computing and Communications & 2010 IEEE/ACM Intenrational Conference On Cyber, Physical and Social Computing, Dec. 18, 2010, pp. 739-746. XP031923565. ISBN: 978-1-4244-9779-9, DOI: 10.1109/GREENCOM-CPSCOM.2010.148.

Vielzeuf, Valentin et al. *Multi-Level Sensor Fusion With Deep Learning*, arXiv: 1811.02447v1 [cs.CV], Nov. 7, 2018, pp. 1-12. XP055661381, DOI: 10.1109/LSENS.2018/2878908.

What Is A Graph Database and Property Graph, Neo4J, (6 pages), [article, online], [retrieved from the Internet Dec. 31, 2019] <https://neo4j.com/developer/graph-database/>.

```
"dynamicAttrb": {
    "type": "object",
    "description": "this represents a key value pair of attributes",
    "required": [],
    "properties": {
        "attributes": {
            "type": "object",
            "properties": {
                "type": "list",
                "properties": {
                    "attributeName": {"type": "string"},
                    "attributeValue": {"type": "string"}
                },
                "_status": {
                    "type": "string",
                    "default": "ACTIVE"
                },
                "_nodeTag": {
                    "type": "string",
                    "description": "This is name given to a ObjectType"
                }
            }
        }
    }
},
```

FIG. 21

```
"dynamicProp": {
    "type": "string",
    "description": "this represents a key value pair of properties on a relationship",
    "properties": {
        "propertyName": "propertyValue",
        "_status": {"type": "string"},
        "_createdate": {"type": "string"},
        "_updatedate": {"type": "string"}
    }
}
```

FIG. 22

```
"definitions": {

"vizzDataObject": {
        "type": "object",
        "required": ["objectType"],
        "properties": {

"uuid": {
                "type": "string",
                "description": "The uuid of the vizzDataObject"
            },
            "displayName": {
                "type": "string",
                "description": " the name which will be displayed on the front-en
            }, "objectType": {
                "type": "string",
                "description": " defines the object type of the viZZ Data Object",
                "enum": ["sharedspace",
                         "collaboratorspace",
                         "environmentclass",
                         "space",
                         "vizzobject",
                         "secondaryobject",
                         "accessteam",
                         "vizzenvironment",
                         "class"
                        ]
            },
            "item": {"$ref": "#/definitions/dynamicAttrb"},
            "relations": [
                "type": "array",
                "items": {"$ref": "#/definitions/relation"}
            ]
        }
    },
```

FIG. 23

DATA INTERACTION PLATFORMS UTILIZING DYNAMIC RELATIONAL AWARENESS

CROSS-REFERENCES TO RELATED APPLICATIONS

The is a continuation of U.S. application Ser. No. 16/699,874 filed Dec. 2, 2019, which claims priority to US Appl. Nos. 62/774,569, 62/774,573, 62/774,579, and 62/774,602, all filed on Dec. 3, 2018, and all of which are incorporated herein by reference in their entireties.

BACKGROUND

Various embodiments of the present invention address technical challenges related to data modeling and/or data visualization. Existing solutions are ill-suited to efficiently and reliably perform data modeling and/or data visualization. Various embodiments of the present address the shortcomings of the data modeling and/or data visualization solutions and disclose various techniques for efficiently and reliably performing data modeling and/or data visualization.

BRIEF SUMMARY

In general, embodiments of the present invention provide methods, apparatus, systems, computing devices, computing entities, and/or the like for data modeling and/or data visualization. Certain embodiments utilize systems, methods, and computer program products that perform data modeling and/or data visualization using at least one of object absorption scores, relational absorption scores, individual absorption scores, hierarchical absorption scores, operational absorption scores, environment-based absorption scores, attribute-based absorption scores, data visualization spaces, relationship extrapolation spaces, and relational score extrapolation spaces.

In accordance with one aspect, a method is provided. In one embodiment, the method comprises: for each data object of the plurality of data objects: generating an individual absorption score, wherein the individual absorption score indicates an estimated relational awareness tendency given one or more individual attributes of the corresponding data object, generating a hierarchical absorption score, wherein the hierarchical absorption score is generated based at least in part on each individual absorption score for a parent data object that is a hierarchical parent of the corresponding data object, and generating an operational absorption score, wherein the operational absorption score for the data object is determined based at least in part on each individual absorption score for a related data object that is operationally related to the data object; and for each data object relationship that is associated with a plurality of related data objects, generating a relational awareness score for the data object relationship with respect to each of the plurality of related data objects that are associated with the data object relationship, wherein the relational awareness score for a particular data object relationship with respect to a particular related data object is generated based at least in part on the individual absorption score for the particular related data object, the hierarchical absorption score for the particular related data object, and the operational absorption score for the particular related data object.

In accordance with another aspect, a computer program product is provided. The computer program product may comprise at least one computer-readable storage medium having computer-readable program code portions stored therein, the computer-readable program code portions comprising executable portions configured to: for each data object of the plurality of data objects: generate an individual absorption score, wherein the individual absorption score indicates an estimated relational awareness tendency given one or more individual attributes of the corresponding data object, generate a hierarchical absorption score, wherein the hierarchical absorption score is generated based at least in part on each individual absorption score for a parent data object that is a hierarchical parent of the corresponding data object, and generate an operational absorption score, wherein the operational absorption score for the data object is determined based at least in part on each individual absorption score for a related data object that is operationally related to the data object; and for each data object relationship that is associated with a plurality of related data objects, generate a relational awareness score for the data object relationship with respect to each of the plurality of related data objects that are associated with the data object relationship, wherein the relational awareness score for a particular data object relationship with respect to a particular related data object is generated based at least in part on the individual absorption score for the particular related data object, the hierarchical absorption score for the particular related data object, and the operational absorption score for the particular related data object.

In accordance with yet another aspect, an apparatus comprising at least one processor and at least one memory including computer program code is provided. In one embodiment, the at least one memory and the computer program code may be configured to, with the processor, cause the apparatus to: (i) for each data object of a plurality of data objects: for each data object of the plurality of data objects: generate an individual absorption score, wherein the individual absorption score indicates an estimated relational awareness tendency given one or more individual attributes of the corresponding data object, generate a hierarchical absorption score, wherein the hierarchical absorption score is generated based at least in part on each individual absorption score for a parent data object that is a hierarchical parent of the corresponding data object, and generate an operational absorption score, wherein the operational absorption score for the data object is determined based at least in part on each individual absorption score for a related data object that is operationally related to the data object; and for each data object relationship that is associated with a plurality of related data objects, generate a relational awareness score for the data object relationship with respect to each of the plurality of related data objects that are associated with the data object relationship, wherein the relational awareness score for a particular data object relationship with respect to a particular related data object is generated based at least in part on the individual absorption score for the particular related data object, the hierarchical absorption score for the particular related data object, and the operational absorption score for the particular related data object.

BRIEF DESCRIPTION OF THE DRAWINGS

Figure 1:
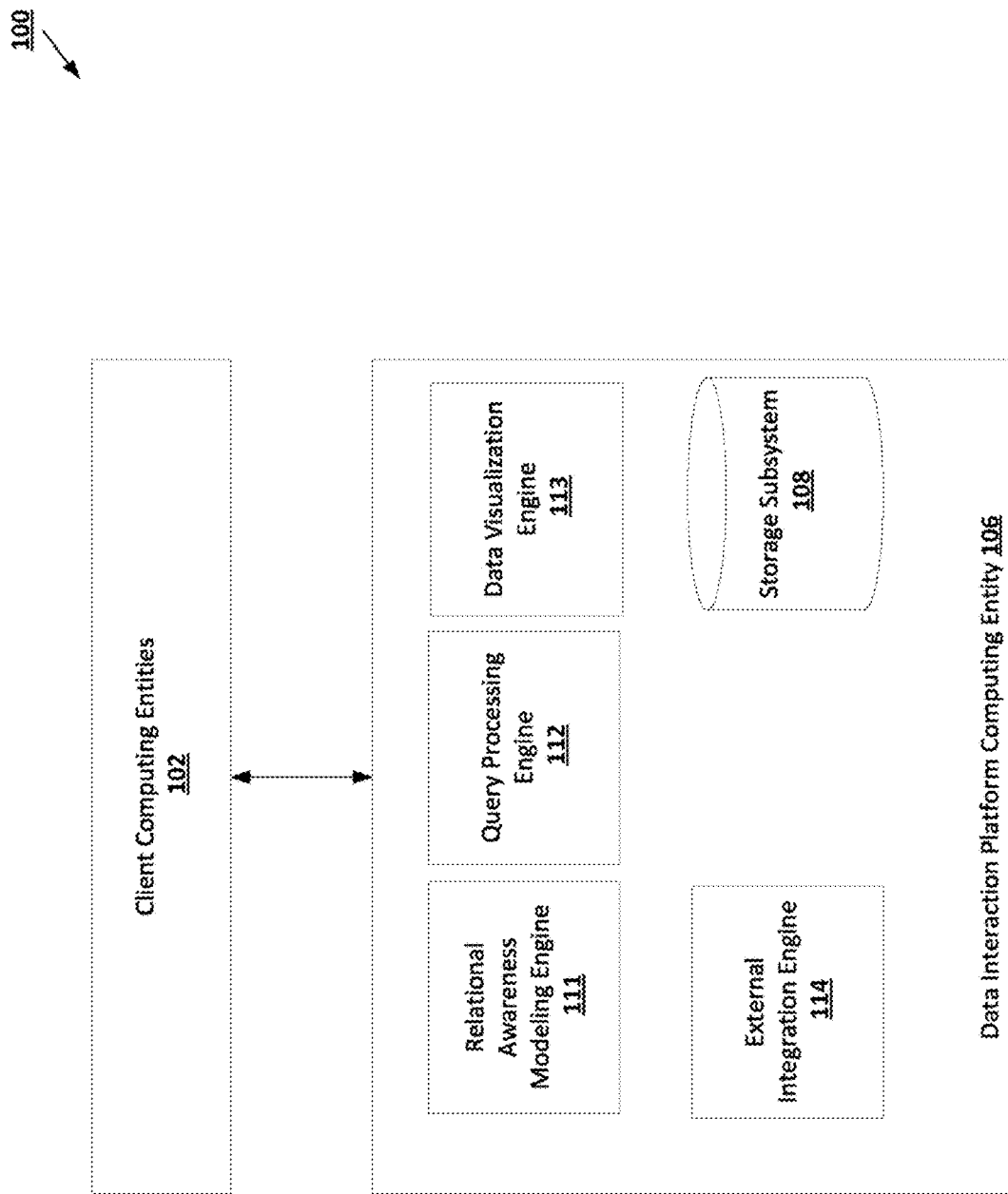

Having thus described the invention in general terms, reference will now be made to the accompanying drawings, which are not necessarily drawn to scale, and wherein:

FIG. 1 provides an exemplary overview of an architecture that can be used to practice embodiments of the present invention.

Figure 2:
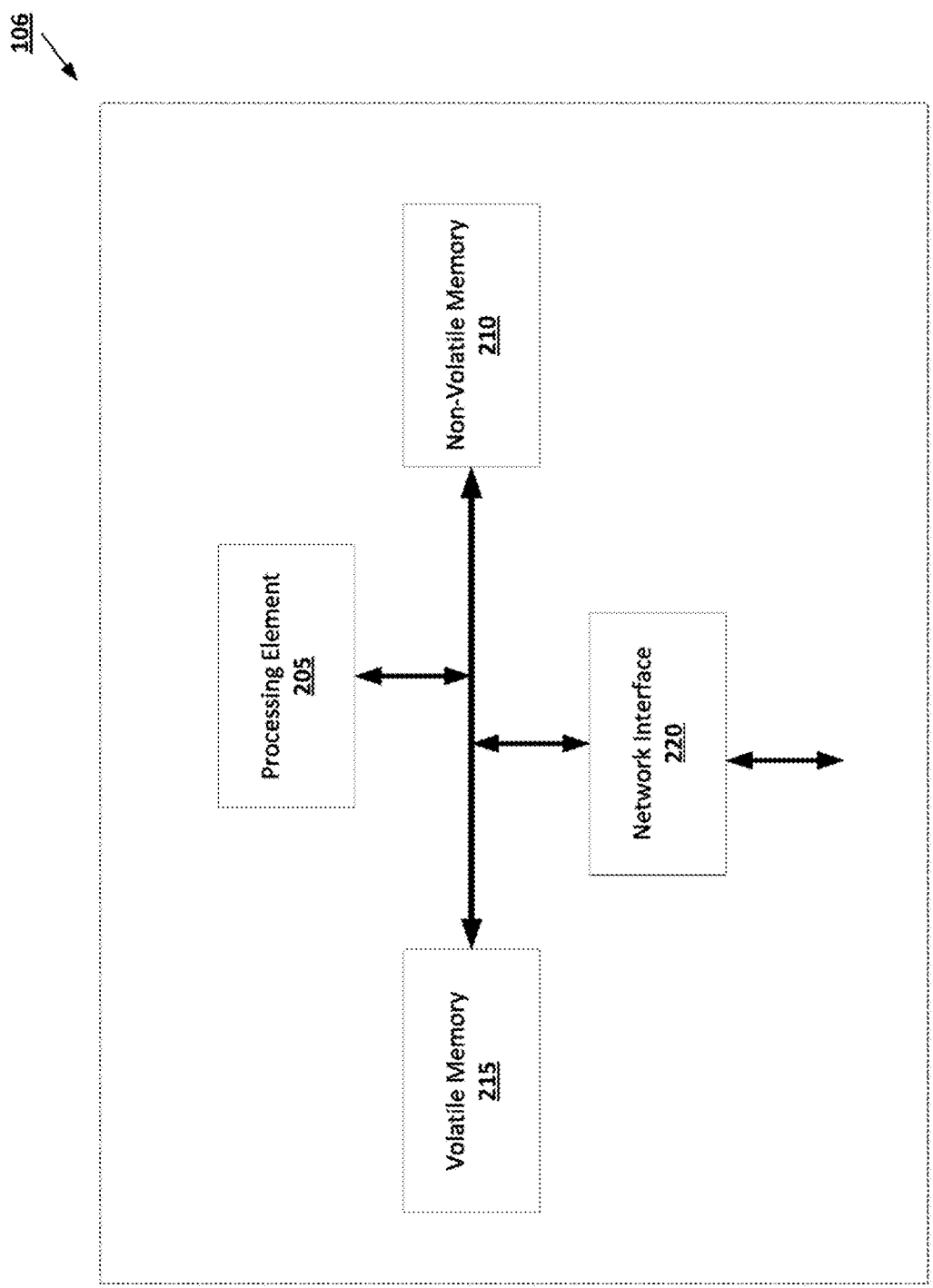

FIG. 2 provides an example data interaction platform computing entity in accordance with some embodiments discussed herein.

Figure 3:
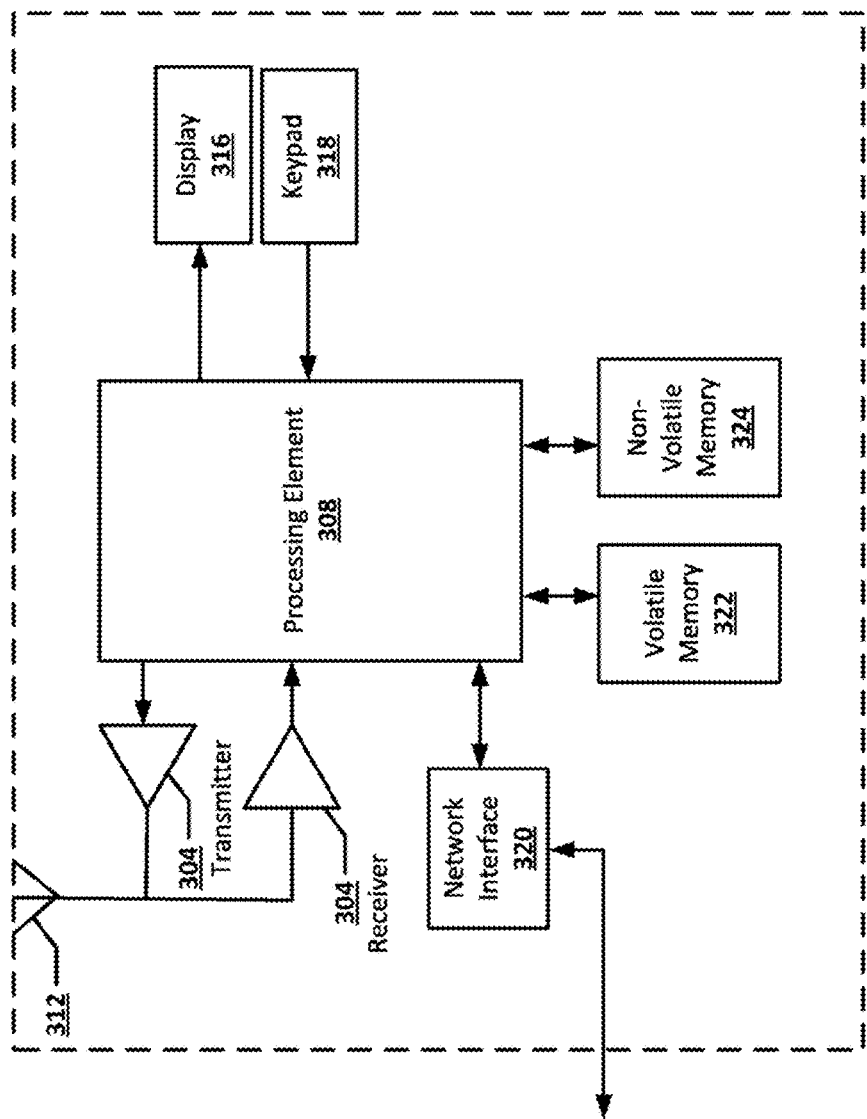

FIG. 3 provides an example client computing entity in accordance with some embodiments discussed herein.

Figure 4:
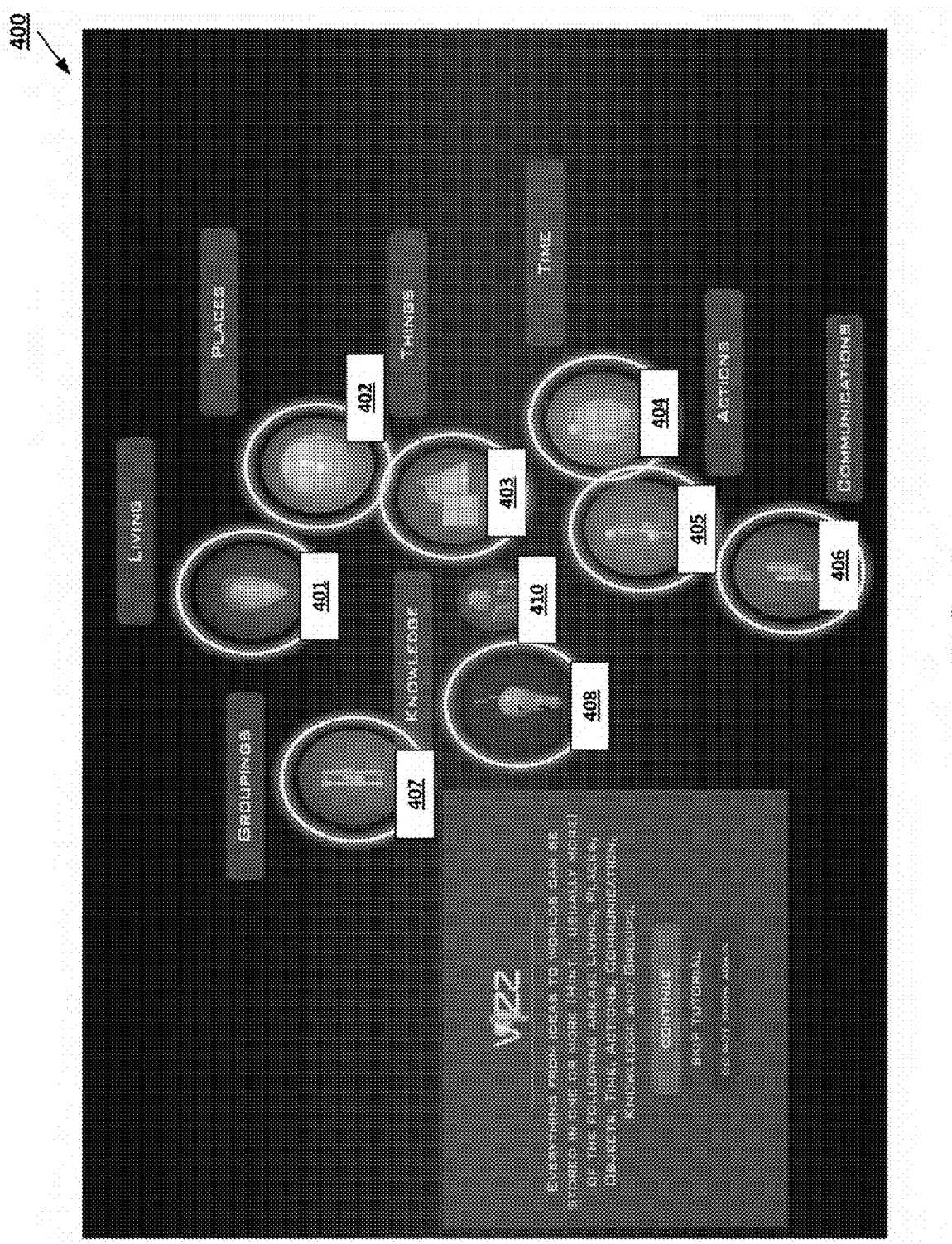

FIG. 4 provides an operational example of a user interface for a data interaction platform in accordance with some embodiments discussed herein.

Figure 5:
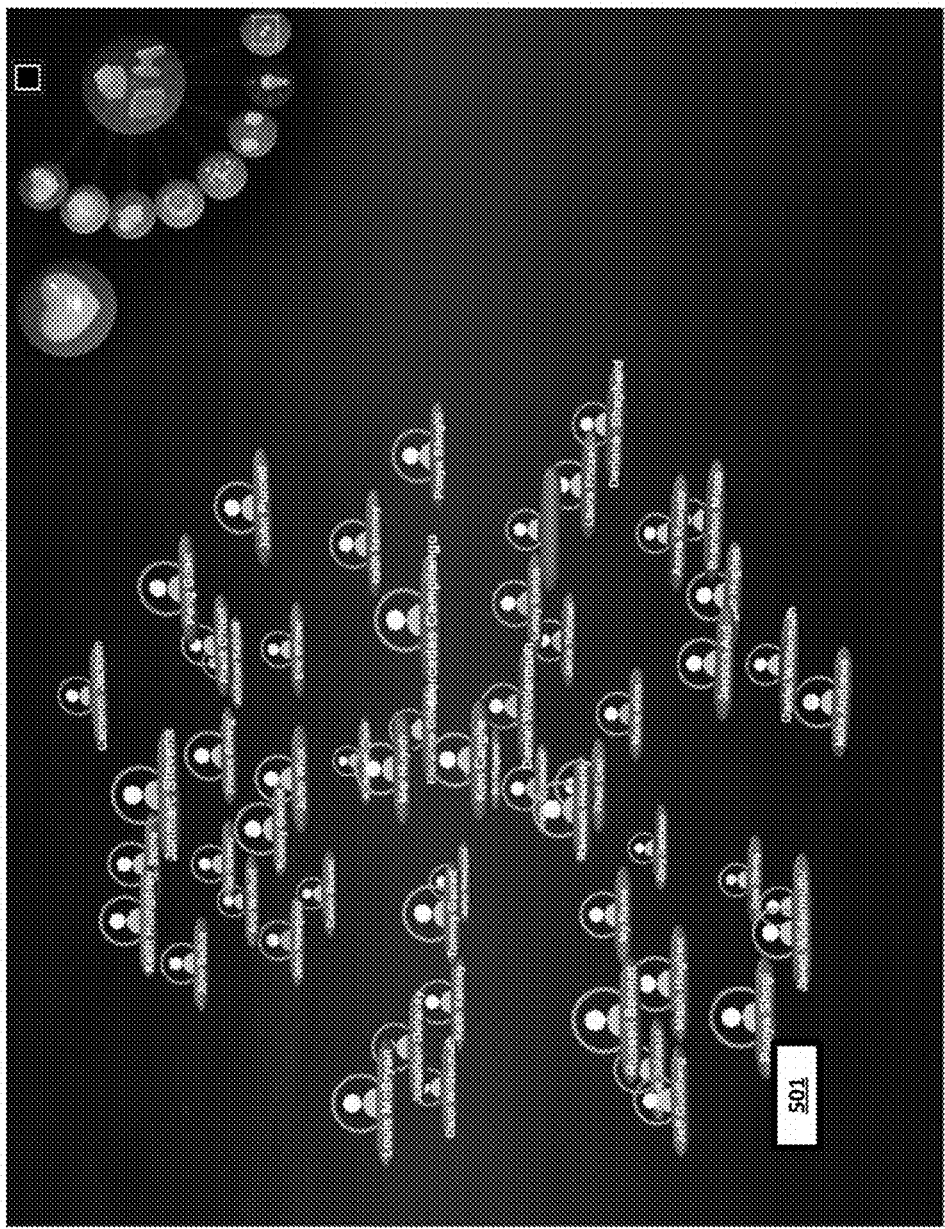

FIG. 5 provides an operational example of a user interface for a multi-object visualization space for various living data objects in accordance with some embodiments discussed herein.

Figure 6:
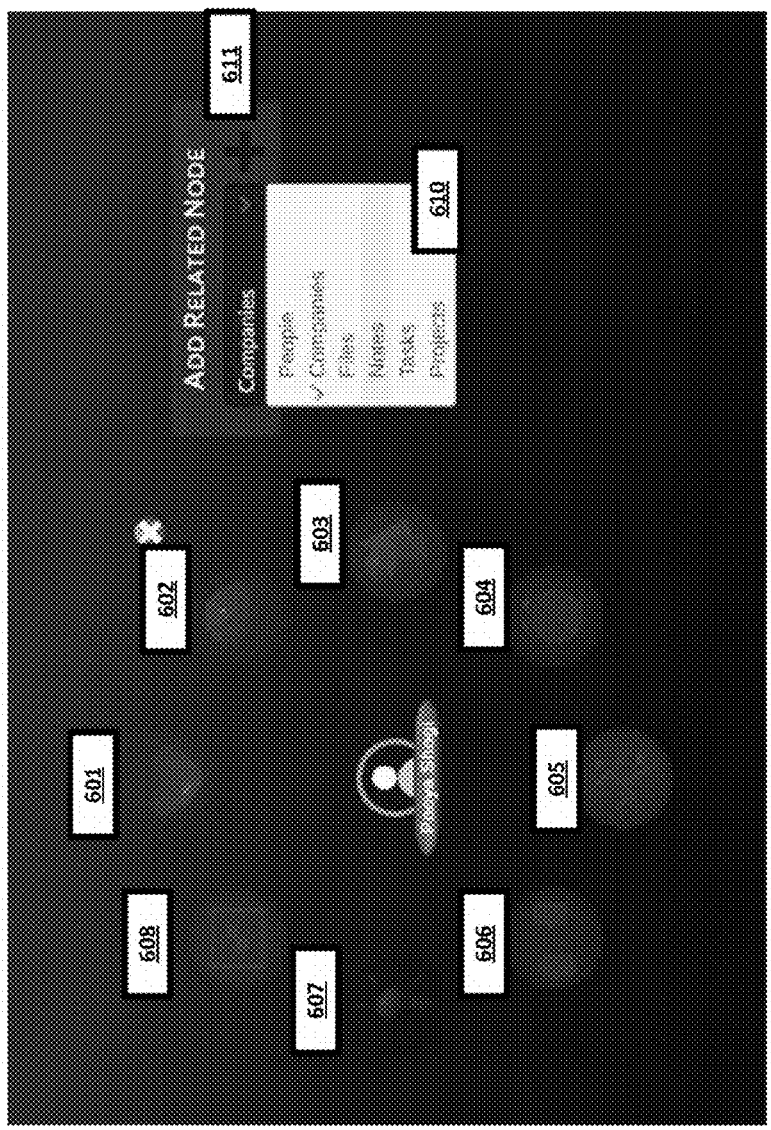

FIG. 6 provides an operational example of a user interface for a per-object visualization space for a living data object in accordance with some embodiments discussed herein.

Figure 7:
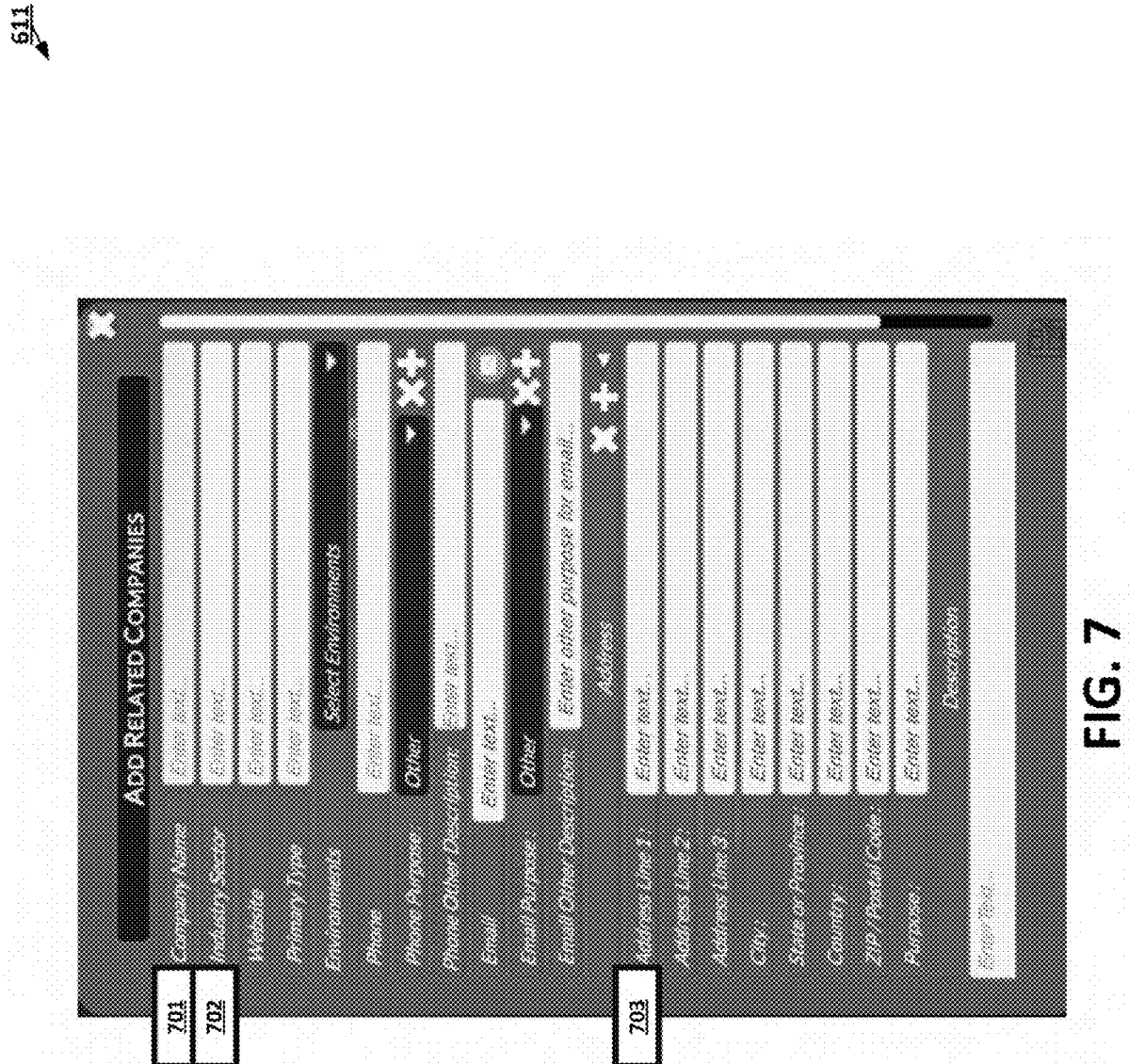

FIG. 7 provides an operational example of a user interface for adding a data object to a data model in accordance with some embodiments discussed herein.

Figure 8:
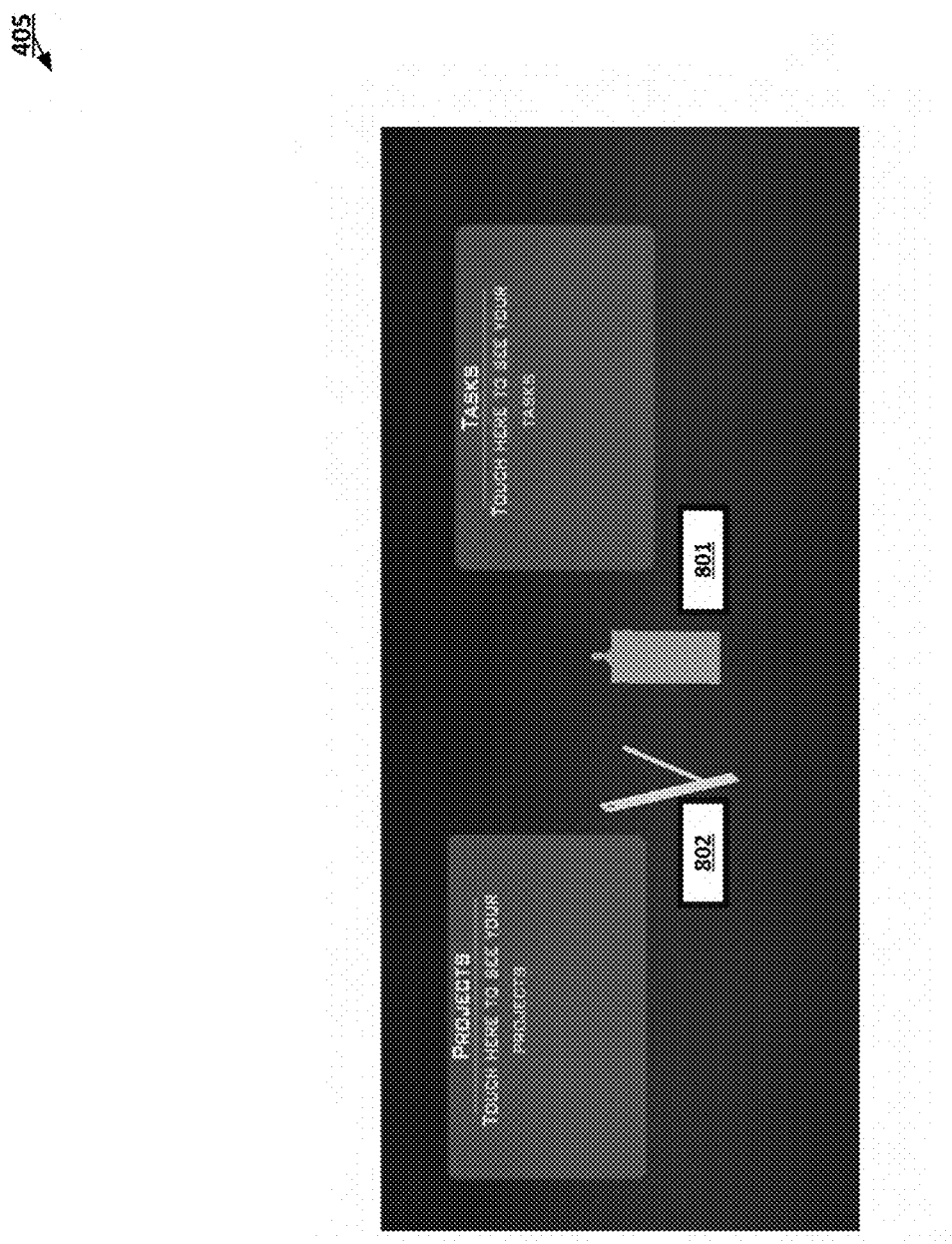

FIG. 8 provides an operational example of a user interface for hierarchical division of actions data objects in accordance with some embodiments discussed herein.

Figure 9:
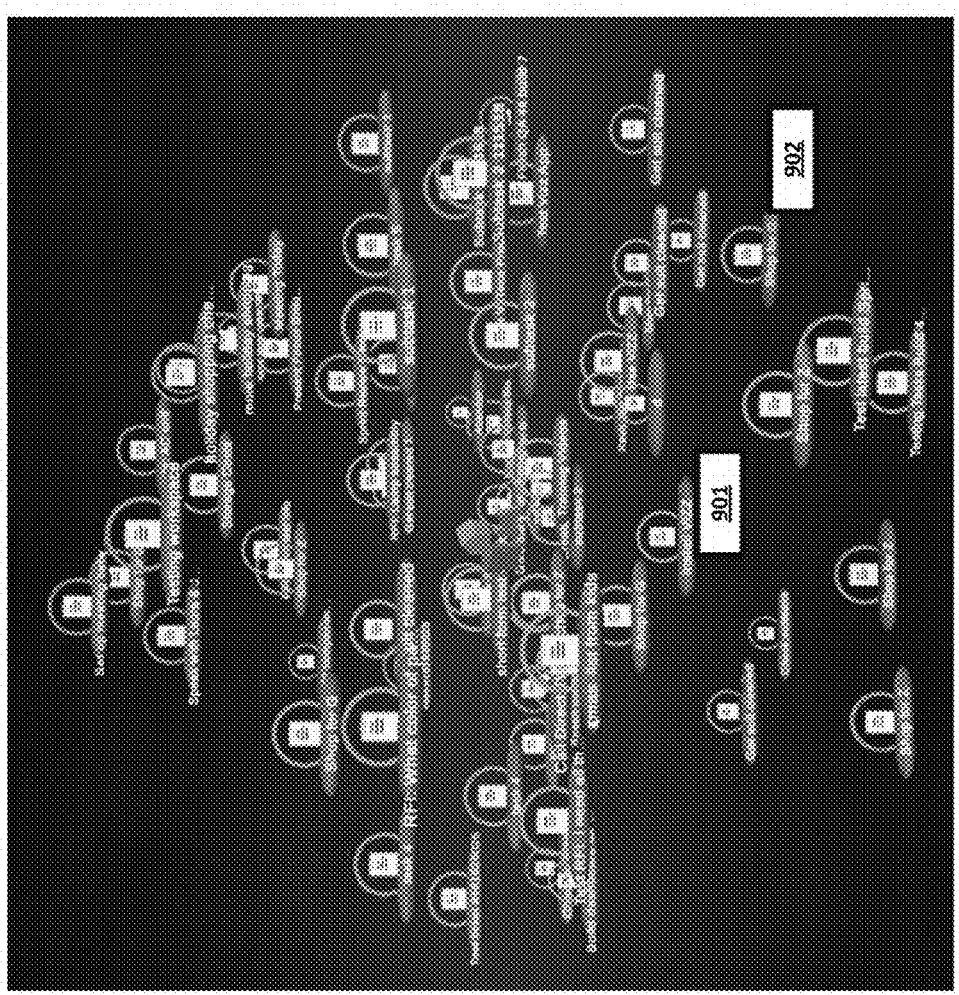

FIG. 9 provides an operational example of a user interface for a multi-object visualization space for various tasks data objects in accordance with some embodiments discussed herein.

Figure 10:
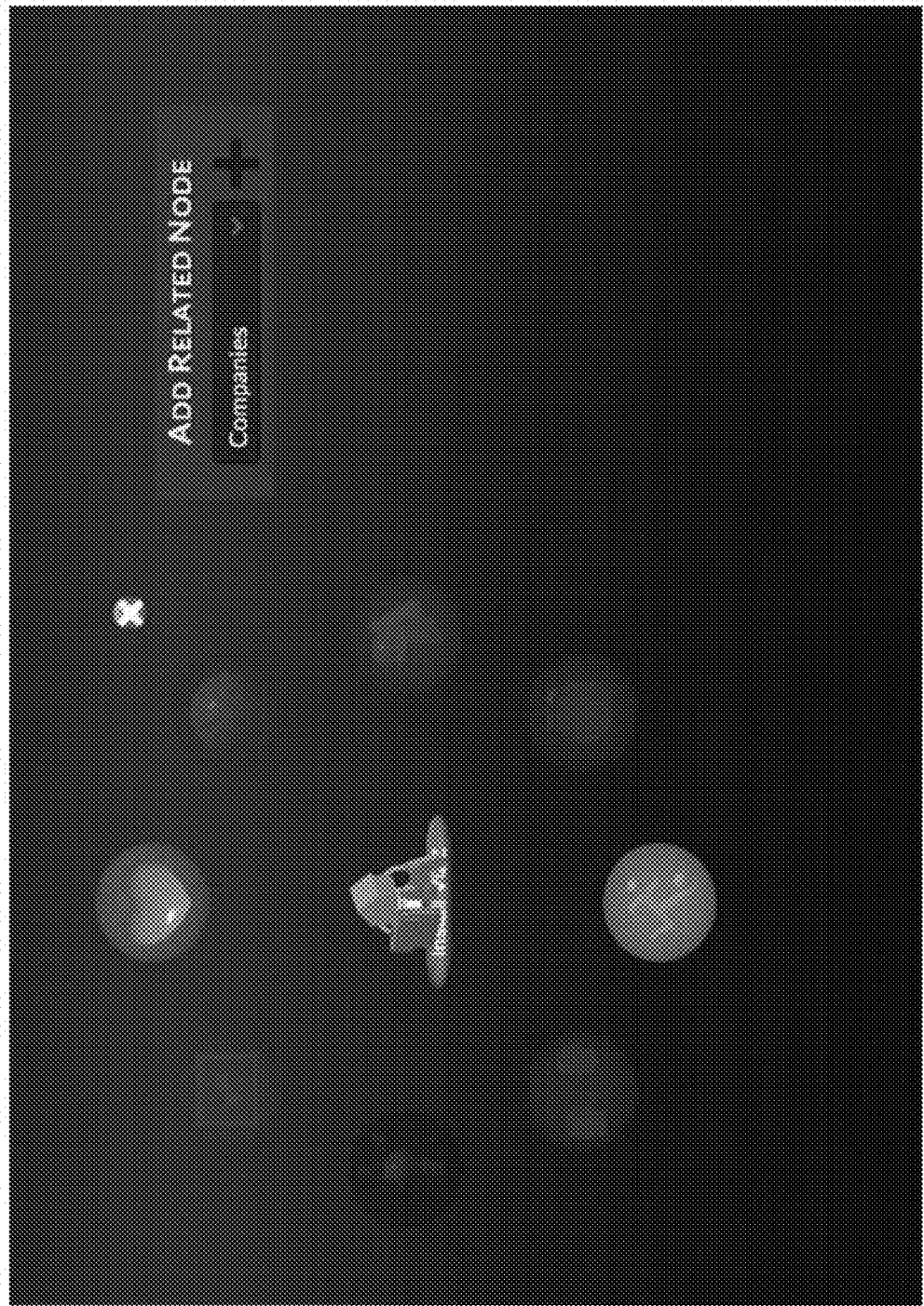

FIG. 10 provides an operational example of a user interface for a per-object visualization space for a tasks data object in accordance with some embodiments discussed herein.

Figure 11:
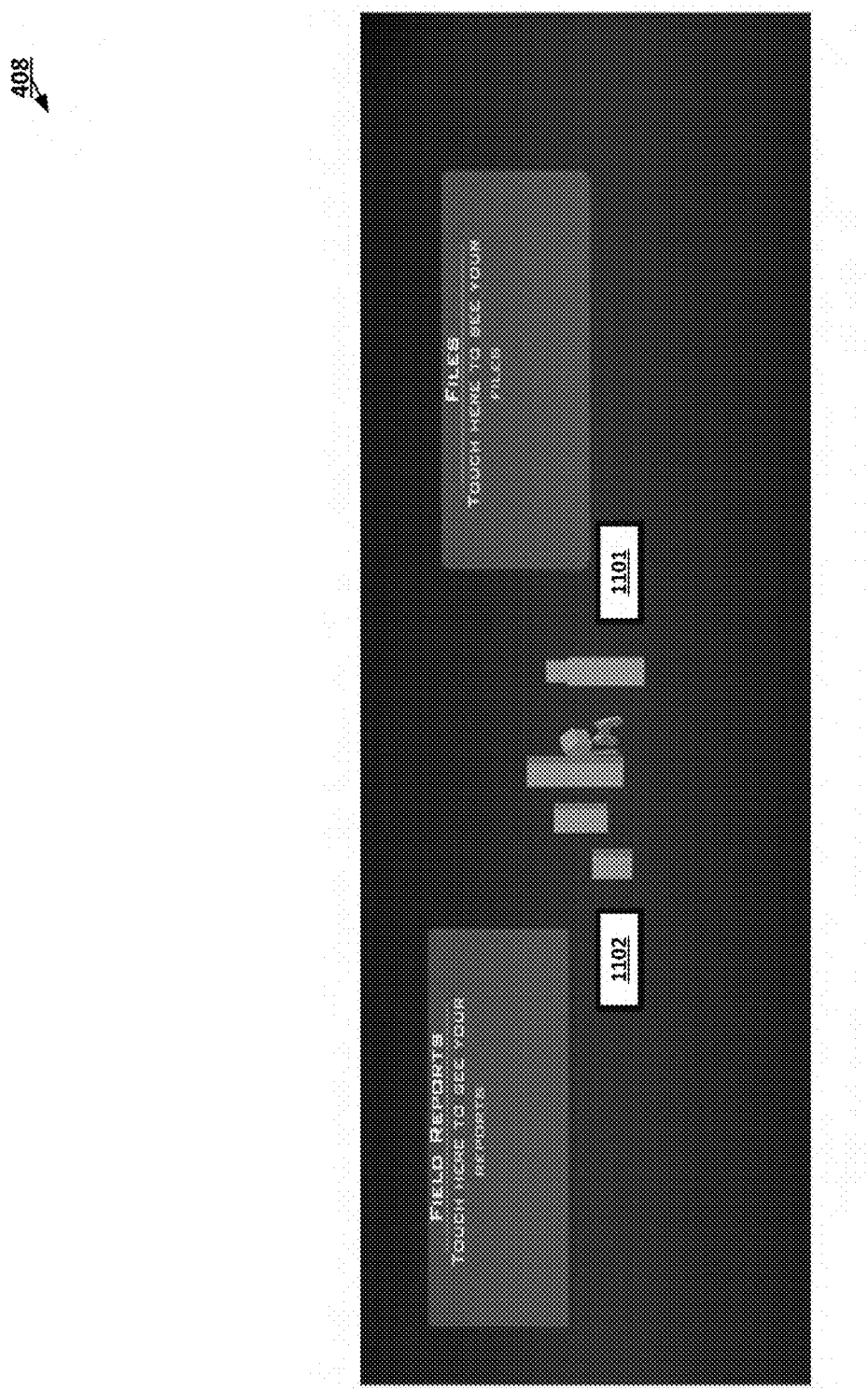

FIG. 11 provides an operational example of a user interface for hierarchical division of knowledge data objects in accordance with some embodiments discussed herein.

Figure 12:
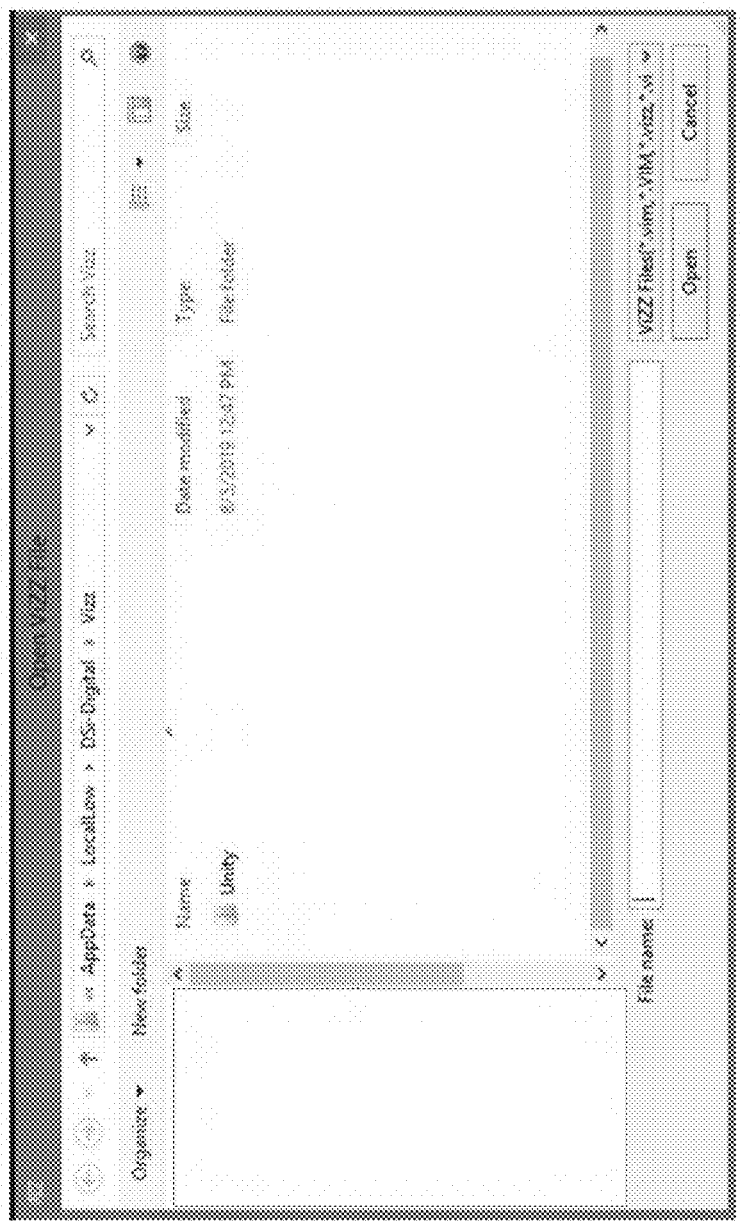

FIG. 12 provides an operational example of a user interface of a file selection user interface for accessing things data objects in accordance with some embodiments discussed herein.

Figure 13:
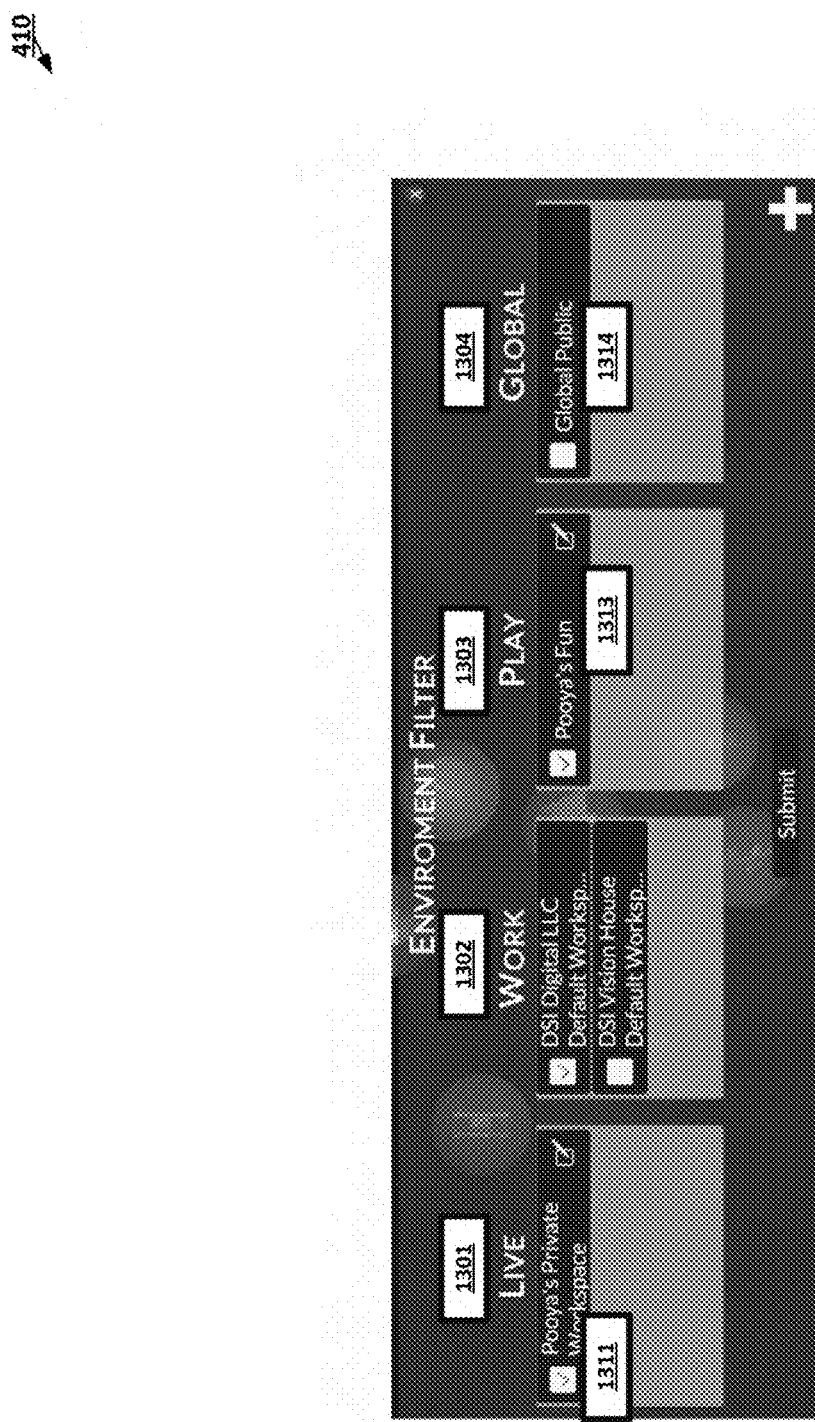

FIG. 13 provides an operational example of a user interface that enables user selection of environment states for a data interaction platform in accordance with some embodiments discussed herein.

Figure 14:
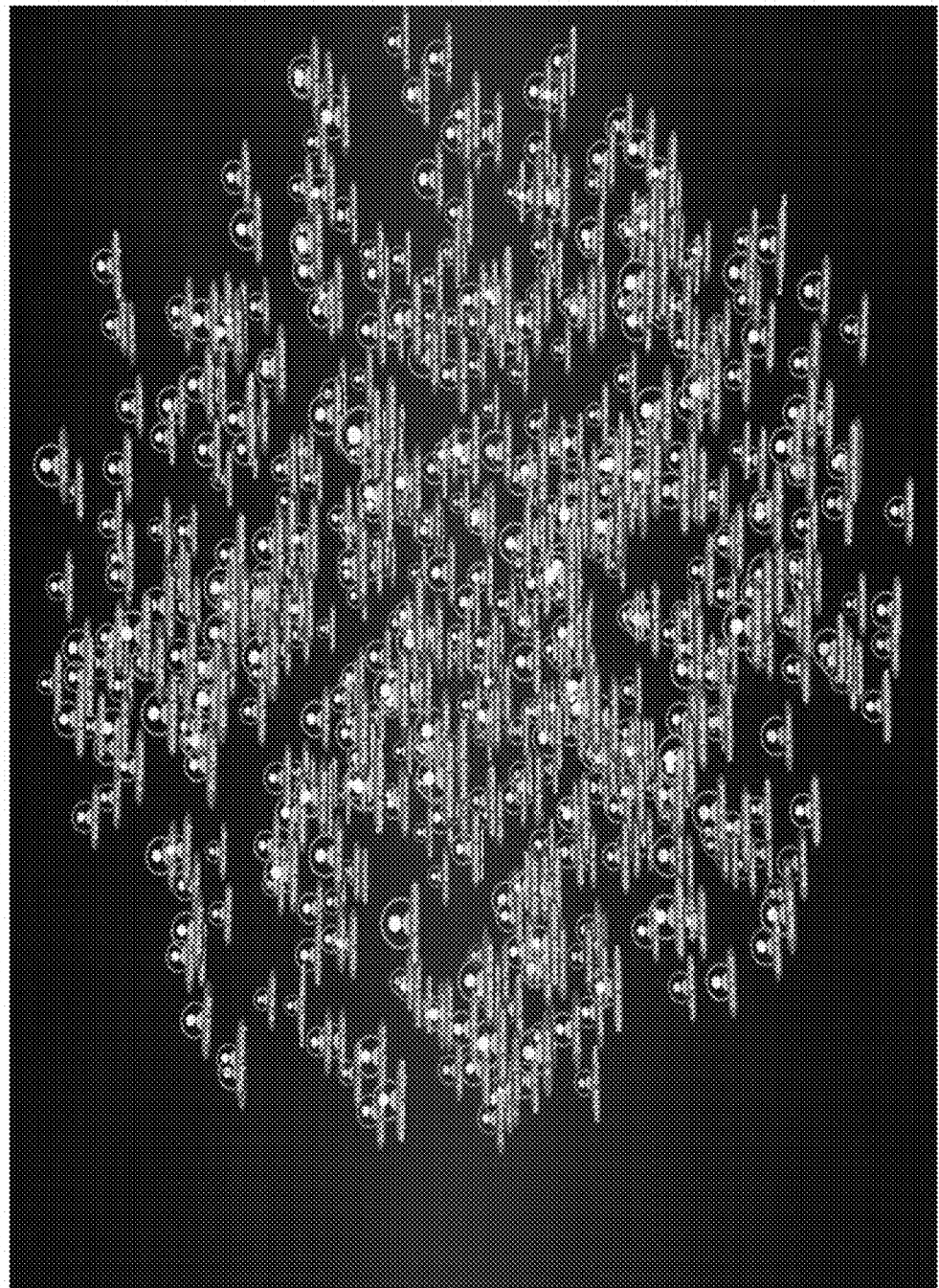

FIG. 14 provides another operational example of a user interface for a multi-object visualization space for various living data objects in accordance with some embodiments discussed herein.

Figure 15:
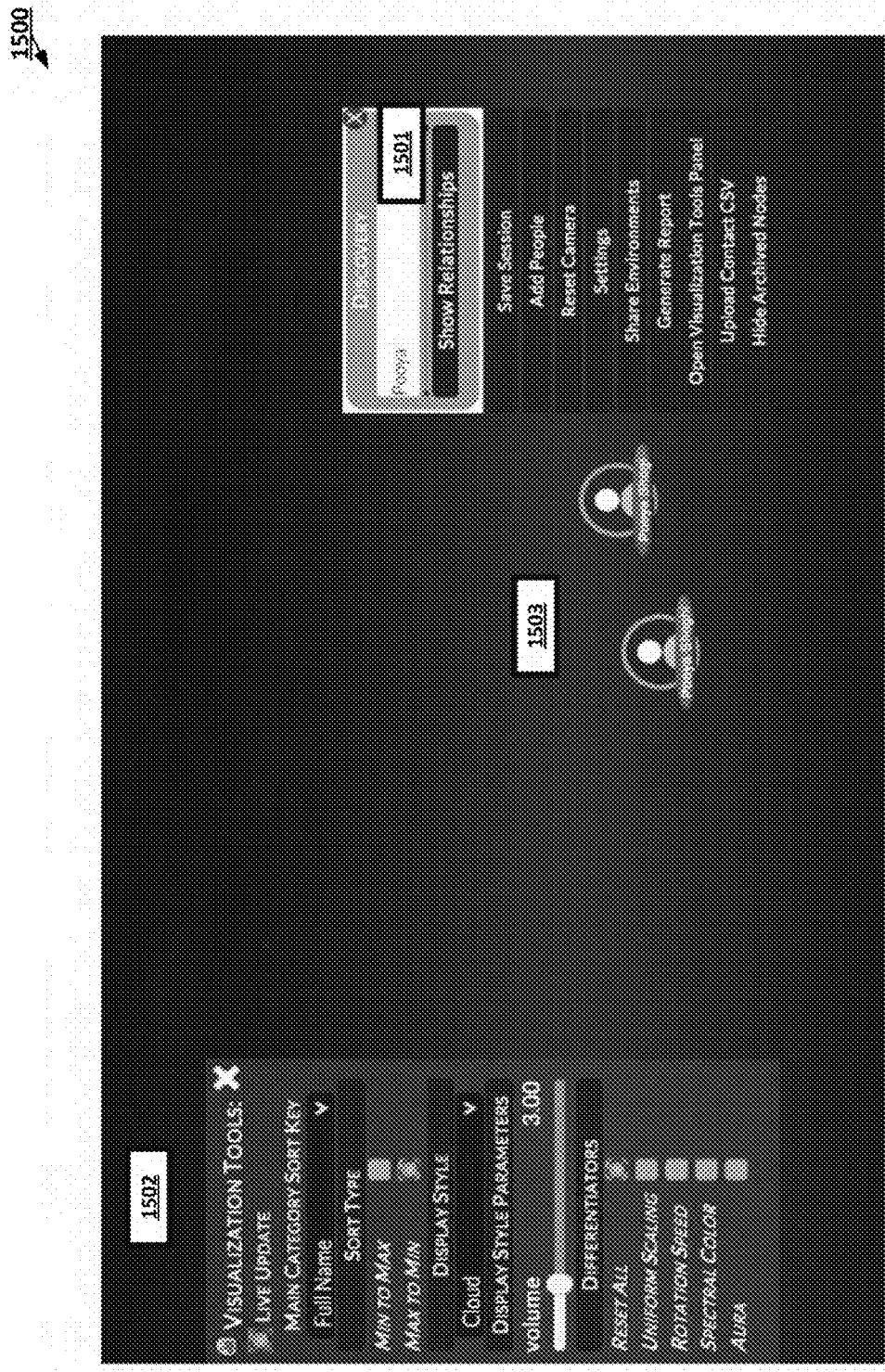

FIG. 15 provides an operational example of a user interface for displaying data object results of a data retrieval query in accordance with some embodiments discussed herein.

Figure 16:
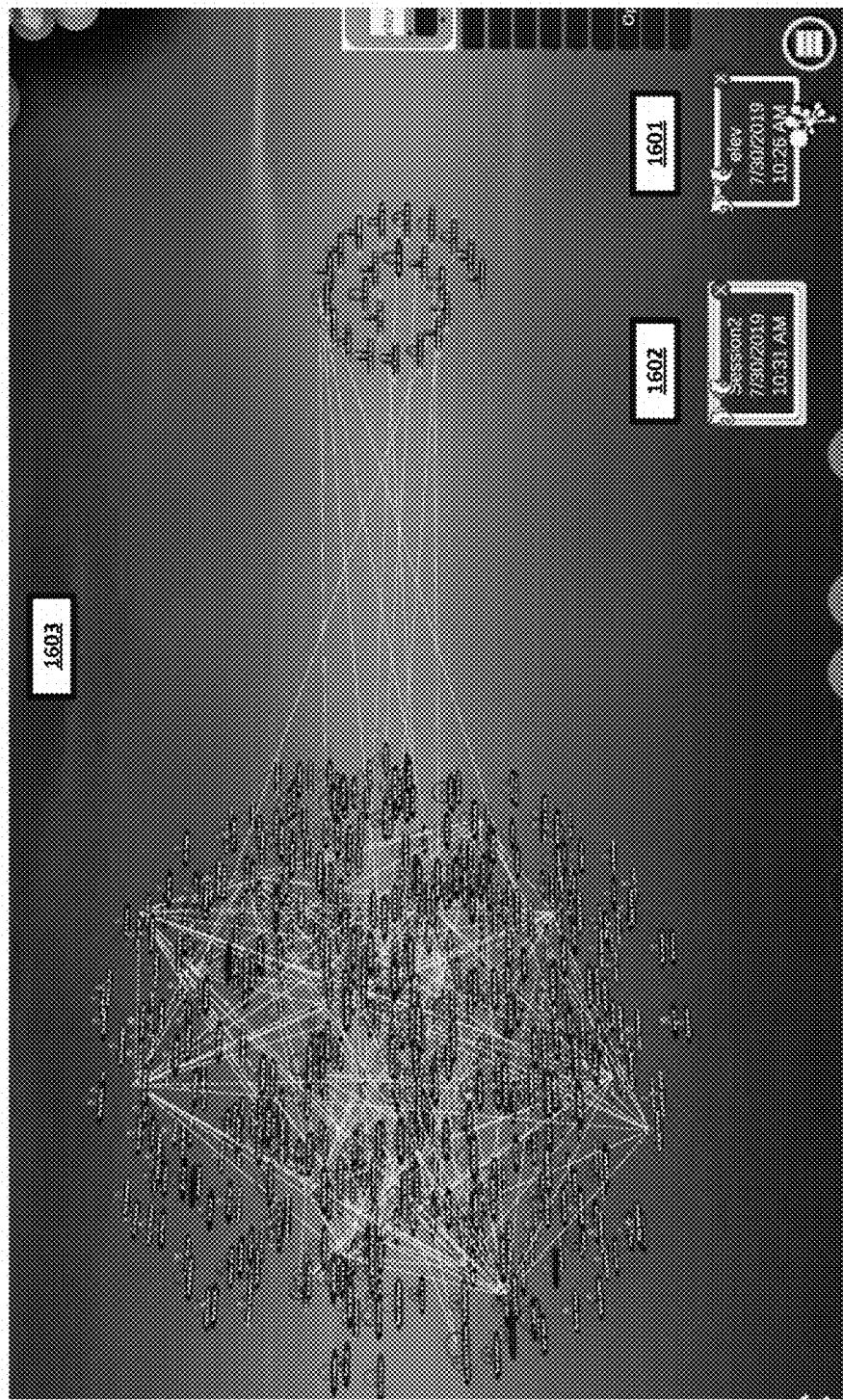

FIG. 16 provides an operational example of a user interface for displaying data object results and data object relationship results of a data retrieval query in accordance with some embodiments discussed herein.

Figure 17:
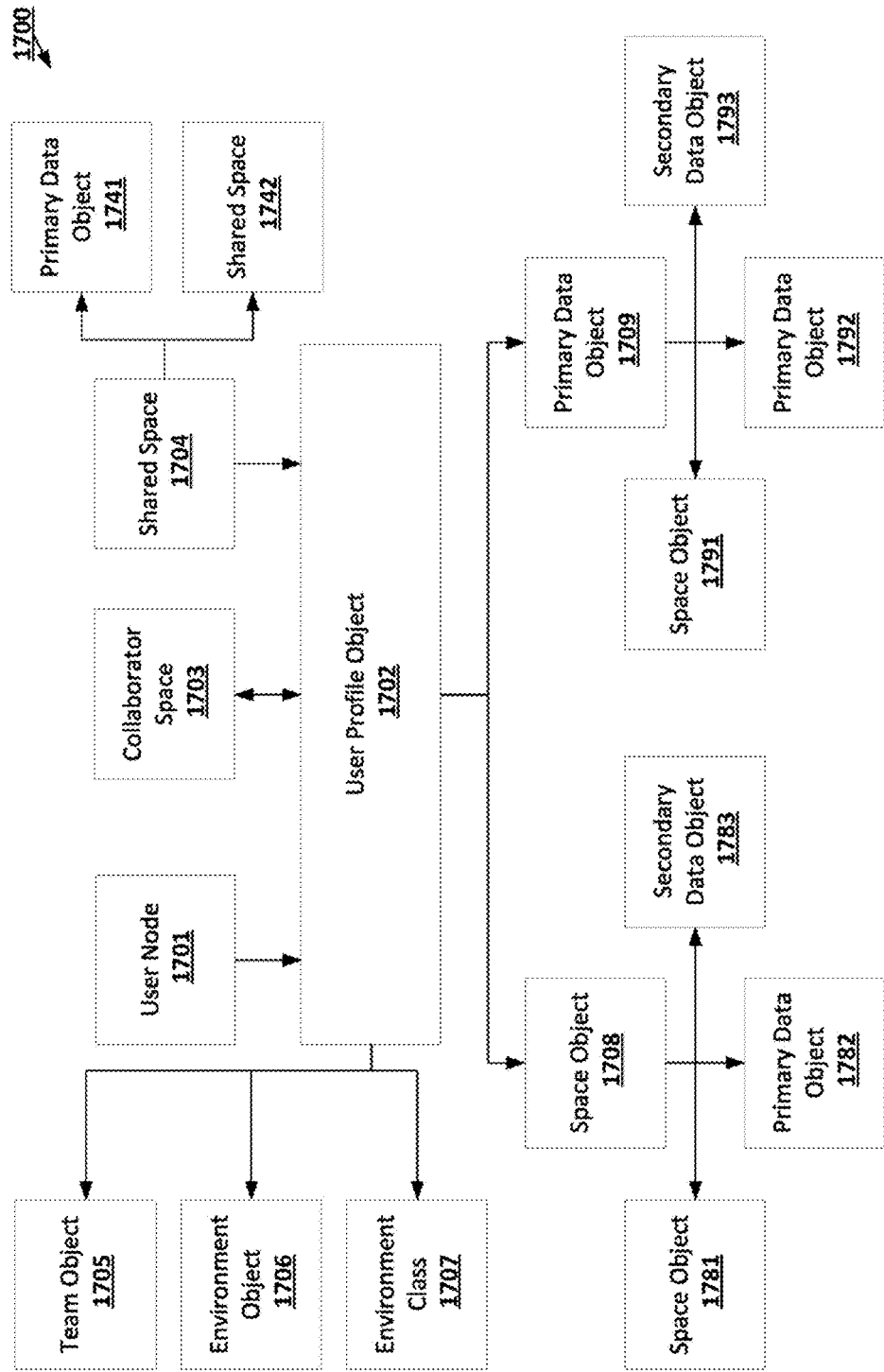

FIG. 17 is a logical data flow diagram for a data interaction system utilizing dynamic relational awareness in accordance with some embodiments discussed herein.

Figure 18:
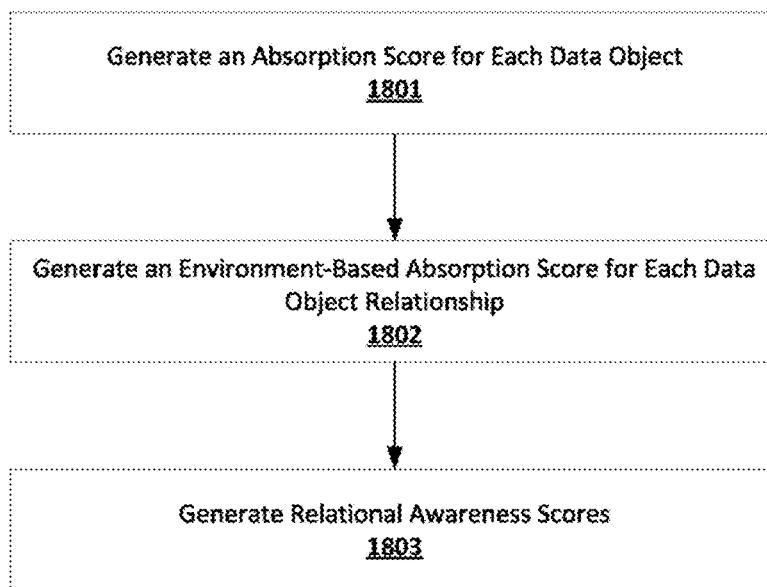

FIG. 18 is a flowchart diagram of an example process for generating relational awareness models for a data interaction platform in accordance with some embodiments discussed herein.

Figure 19:
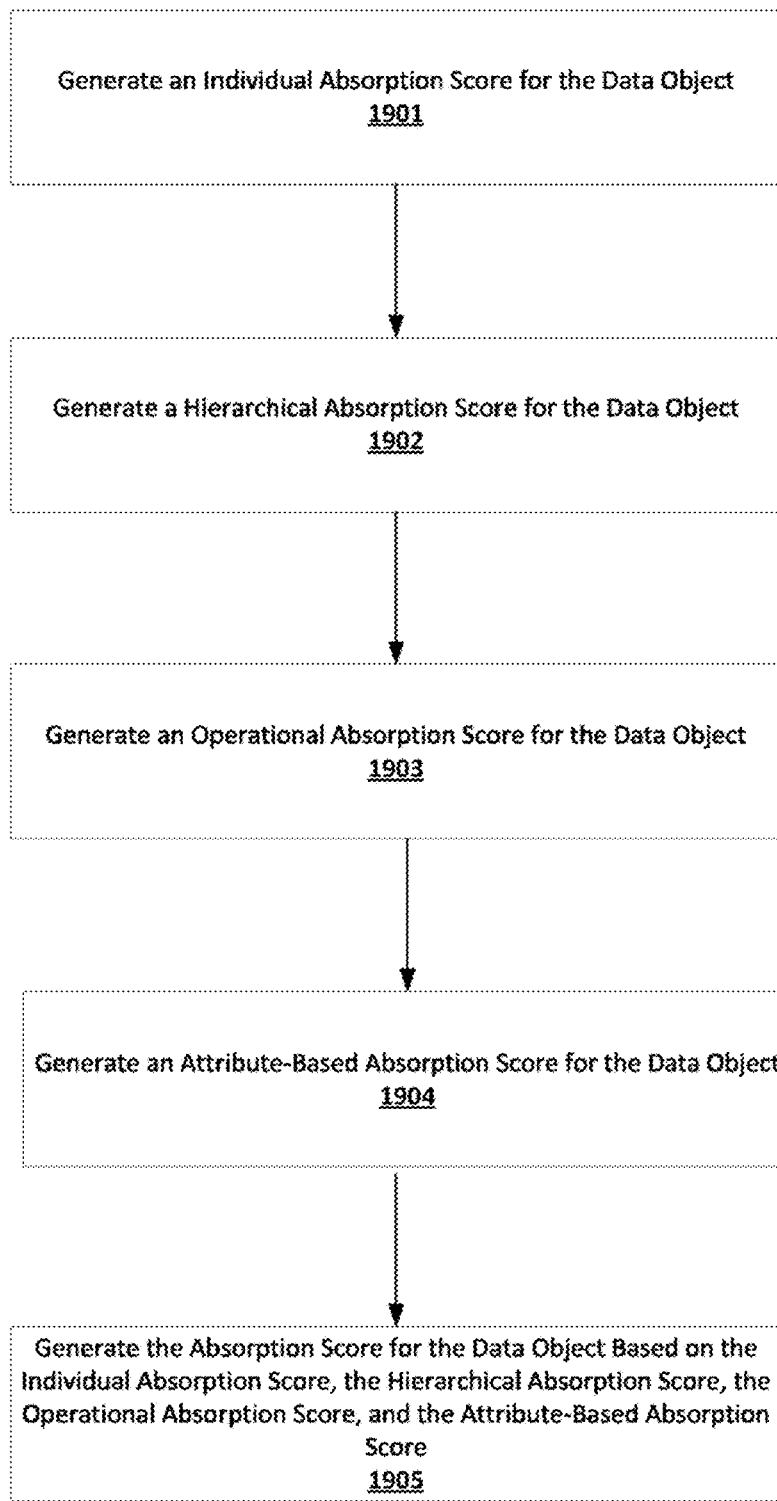

FIG. 19 is a flowchart diagram of an example process for generating an absorption score for a particular data object in accordance with some embodiments discussed herein.

Figure 20:
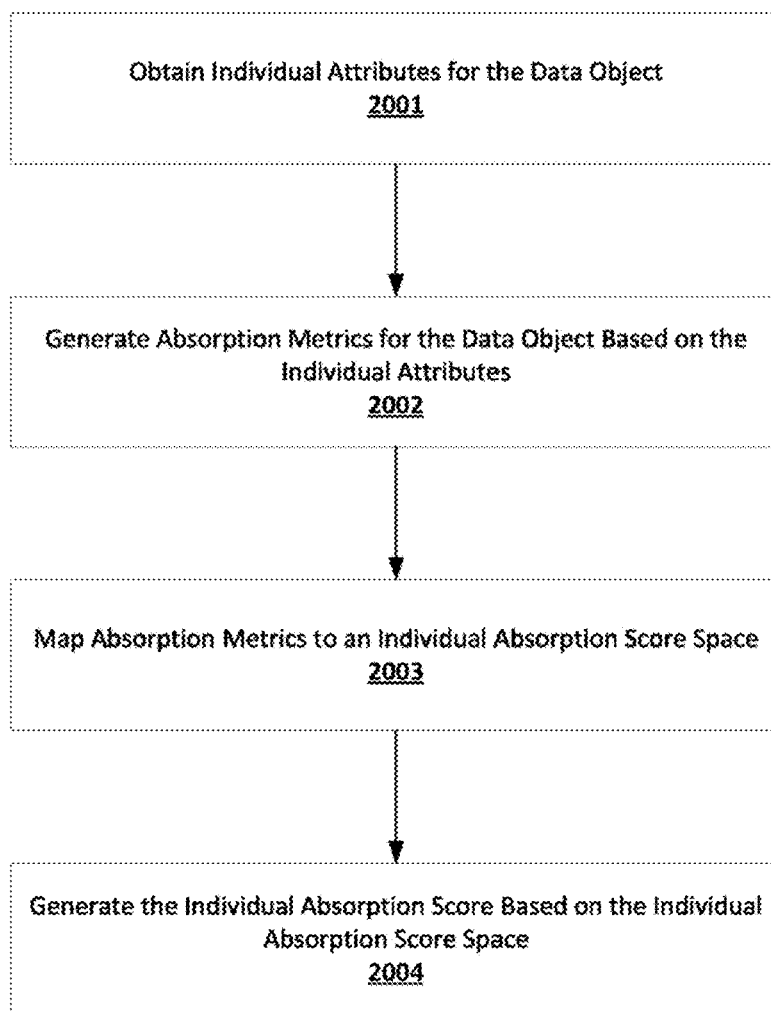

FIG. 20 is a flowchart diagram of an example process for generating an individual absorption score for a particular data object in accordance with some embodiments discussed herein.

FIG. 21 provides an operational example of a dynamic attribute schema in accordance with some embodiments discussed herein.

FIG. 22 provides an operational example of a dynamic property schema in accordance with some embodiments discussed herein.

FIG. 23 provides an operational example of a static attribute schema in accordance with some embodiments discussed herein.

Figure 24:
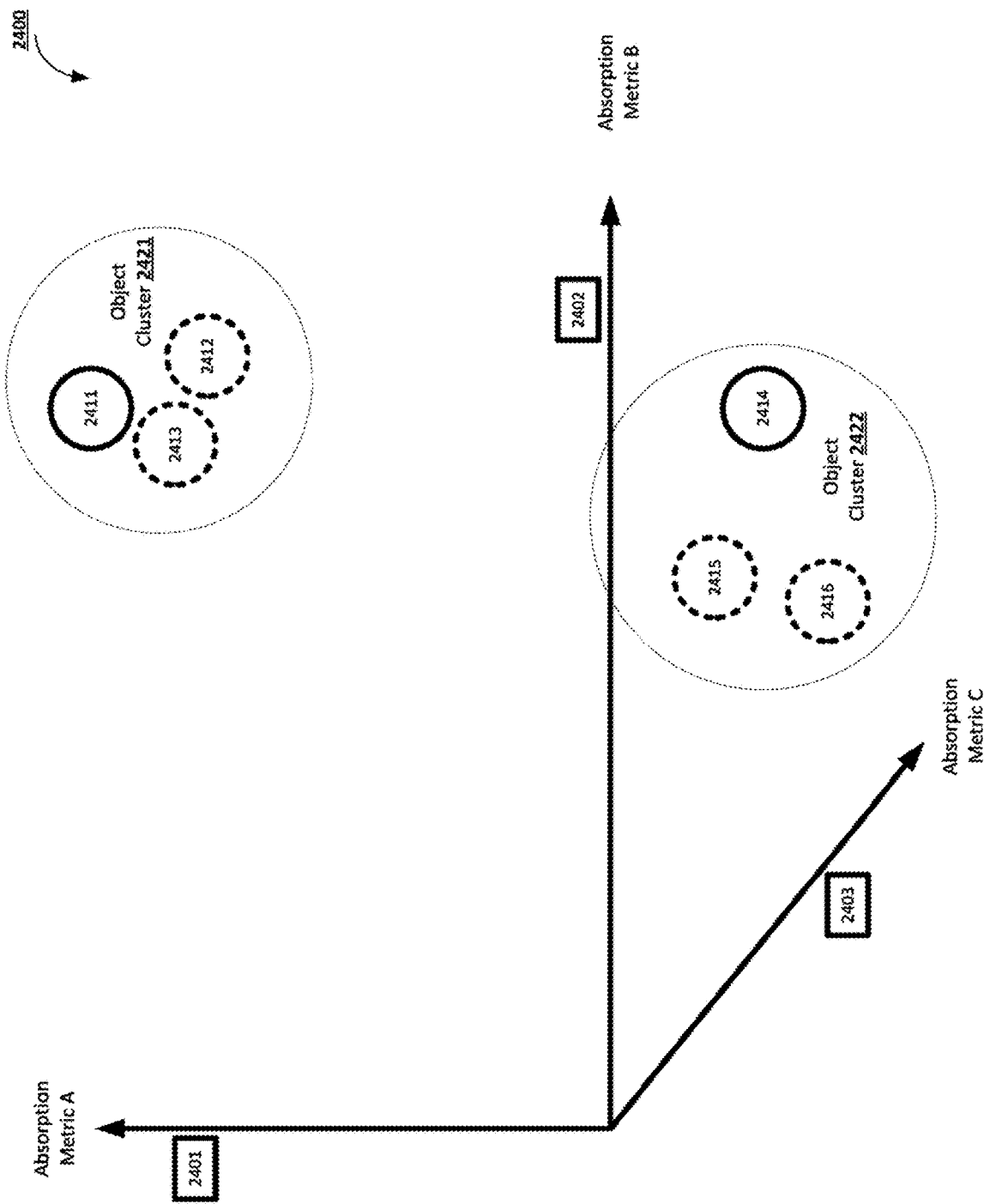

FIG. 24 provides an operational example of an individual absorption space in accordance with some embodiments discussed herein.

Figure 25:
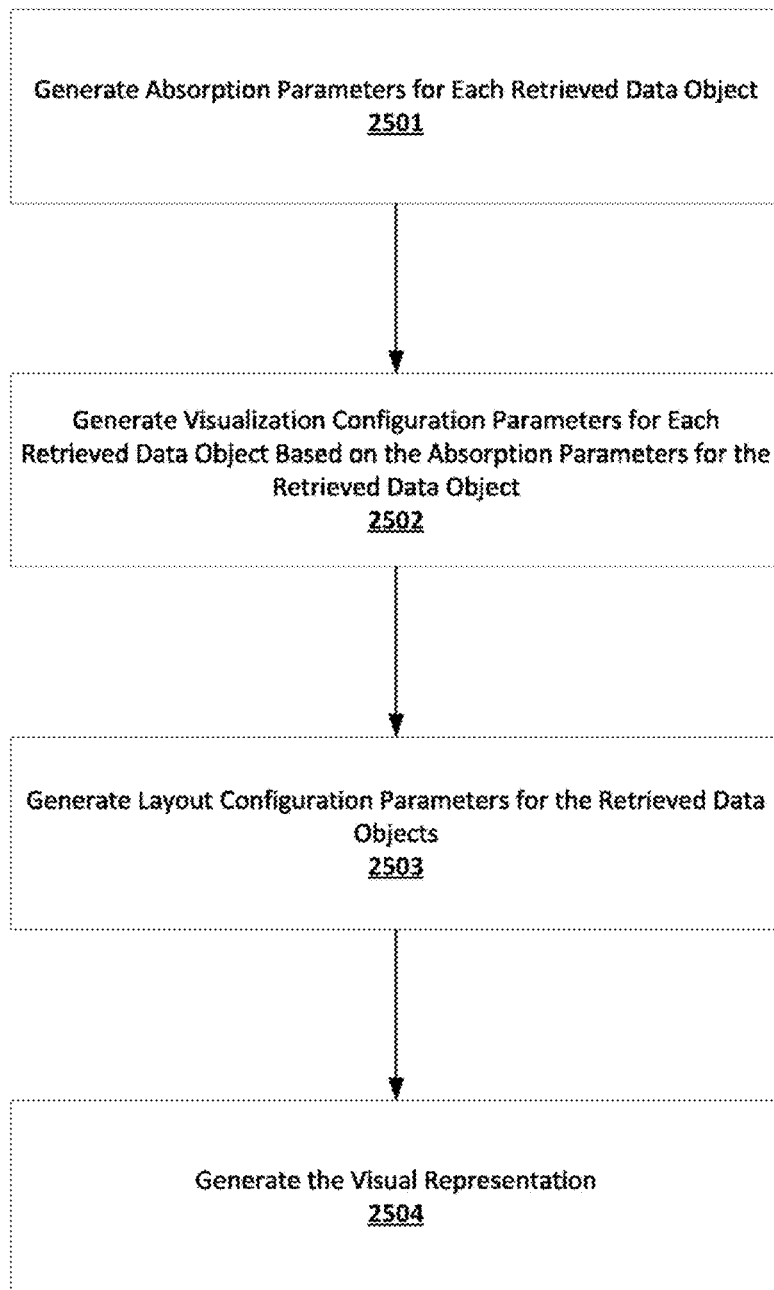

FIG. 25 is a flowchart diagram of an example process 2500 for generating a visual representation of a group of retrieved data objects retrieved in response to a data retrieval query in accordance with some embodiments discussed herein.

Figure 26:
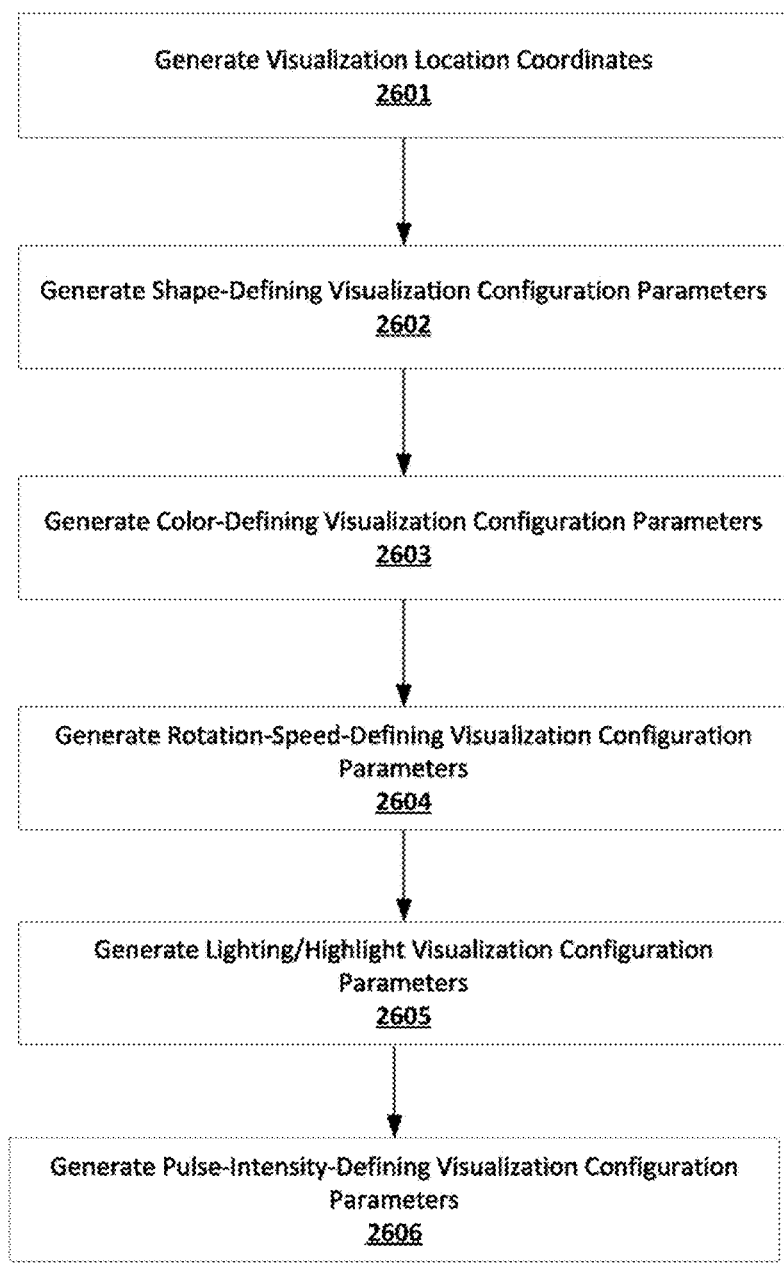

FIG. 26 is a flowchart diagram of an example process for generating visualization configuration parameters for a particular retrieved data object in accordance with some embodiments discussed herein.

Figure 27:

FIG. 27 provides an operational example of a visualization configuration user interface in accordance with some embodiments discussed herein.

Figure 28:
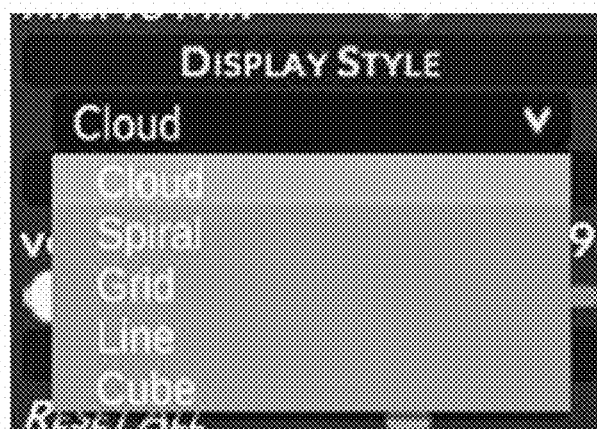

FIG. 28 provides an operational example of a display style selection user interface element in accordance with some embodiments discussed herein.

Figure 29:
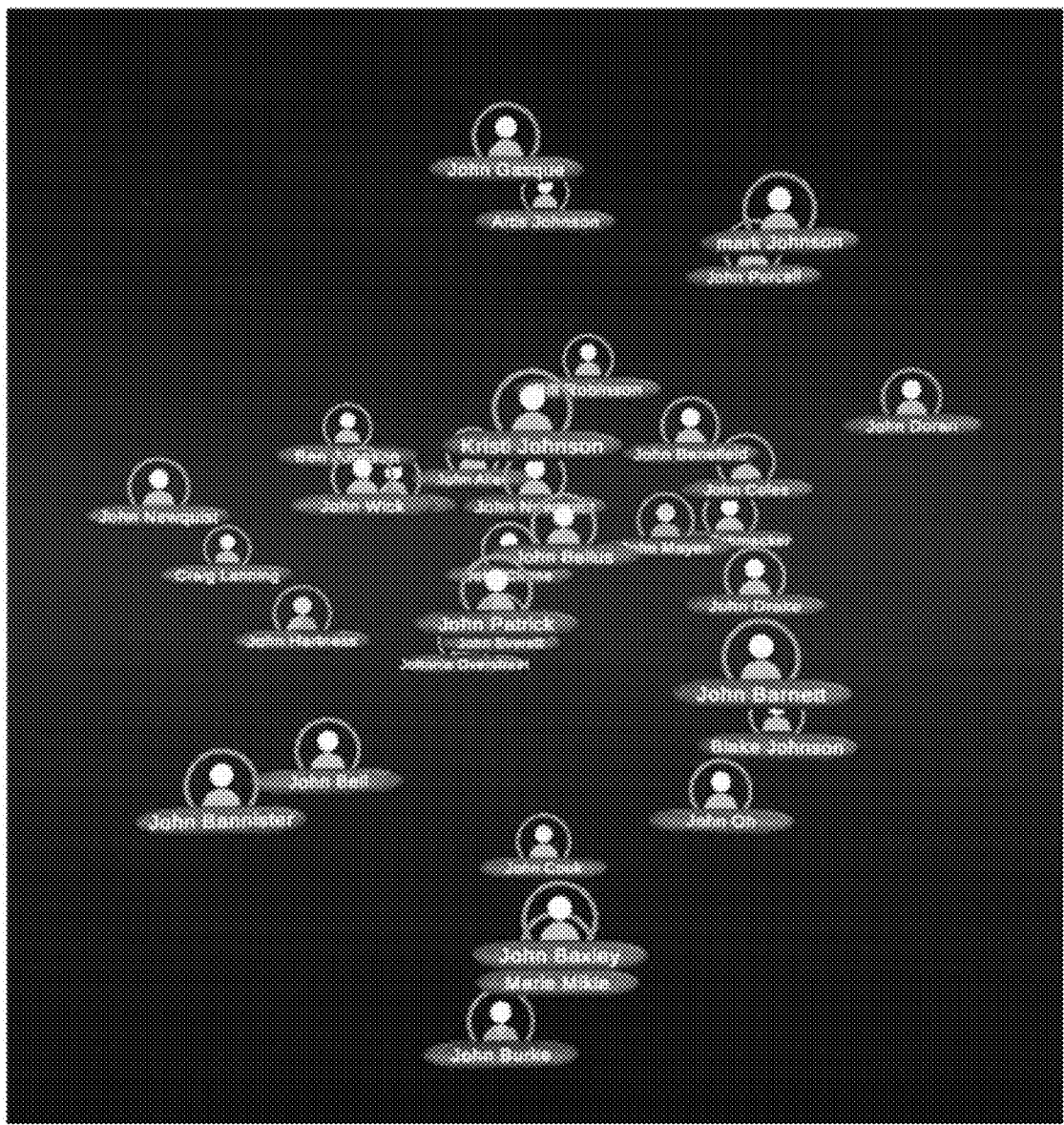

FIG. 29 provides an operational example of a cloud layout user interface in accordance with some embodiments discussed herein.

Figure 30:
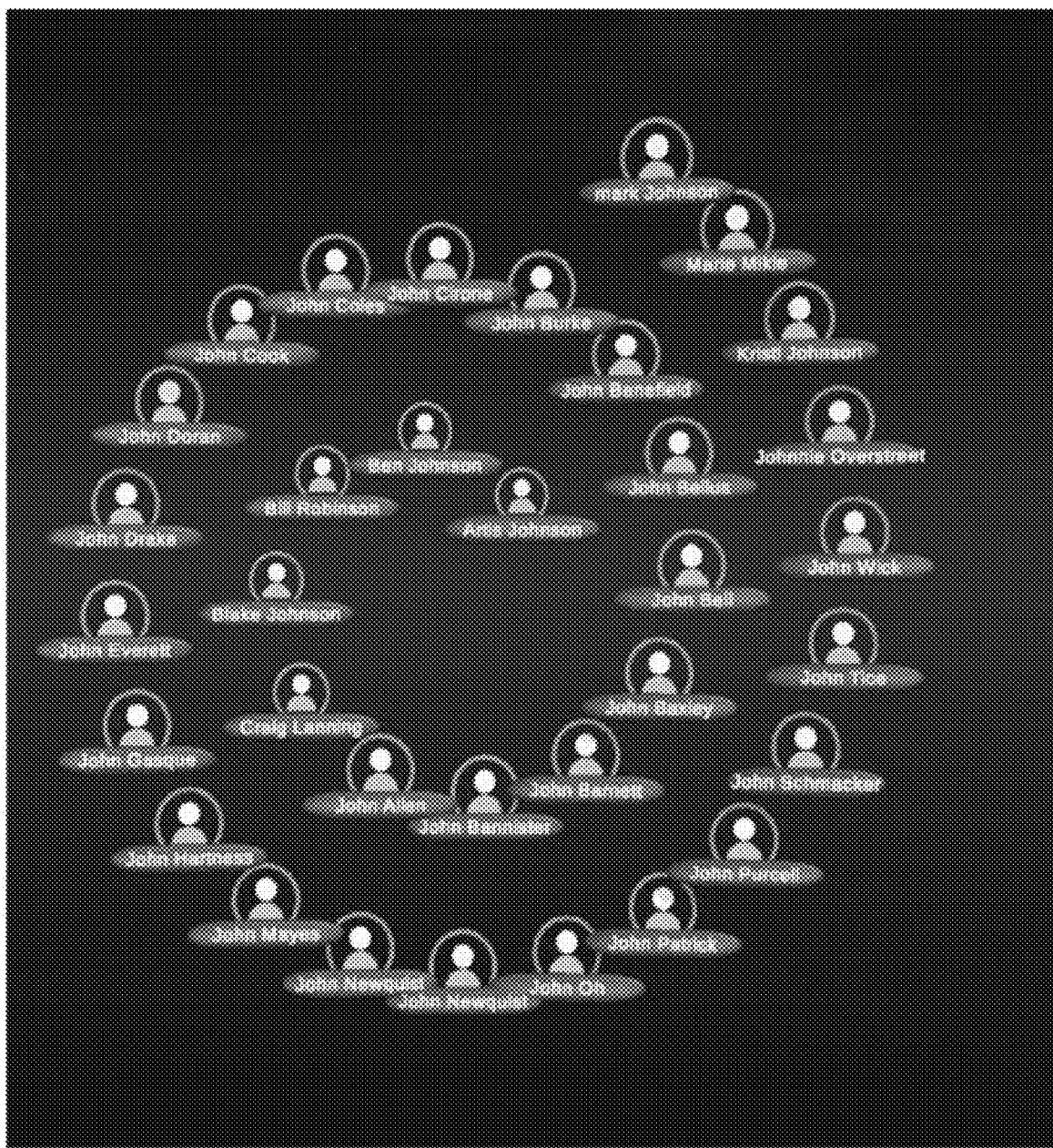

FIG. 30 provides an operational example of a spiral layout user interface in accordance with some embodiments discussed herein.

Figure 31:
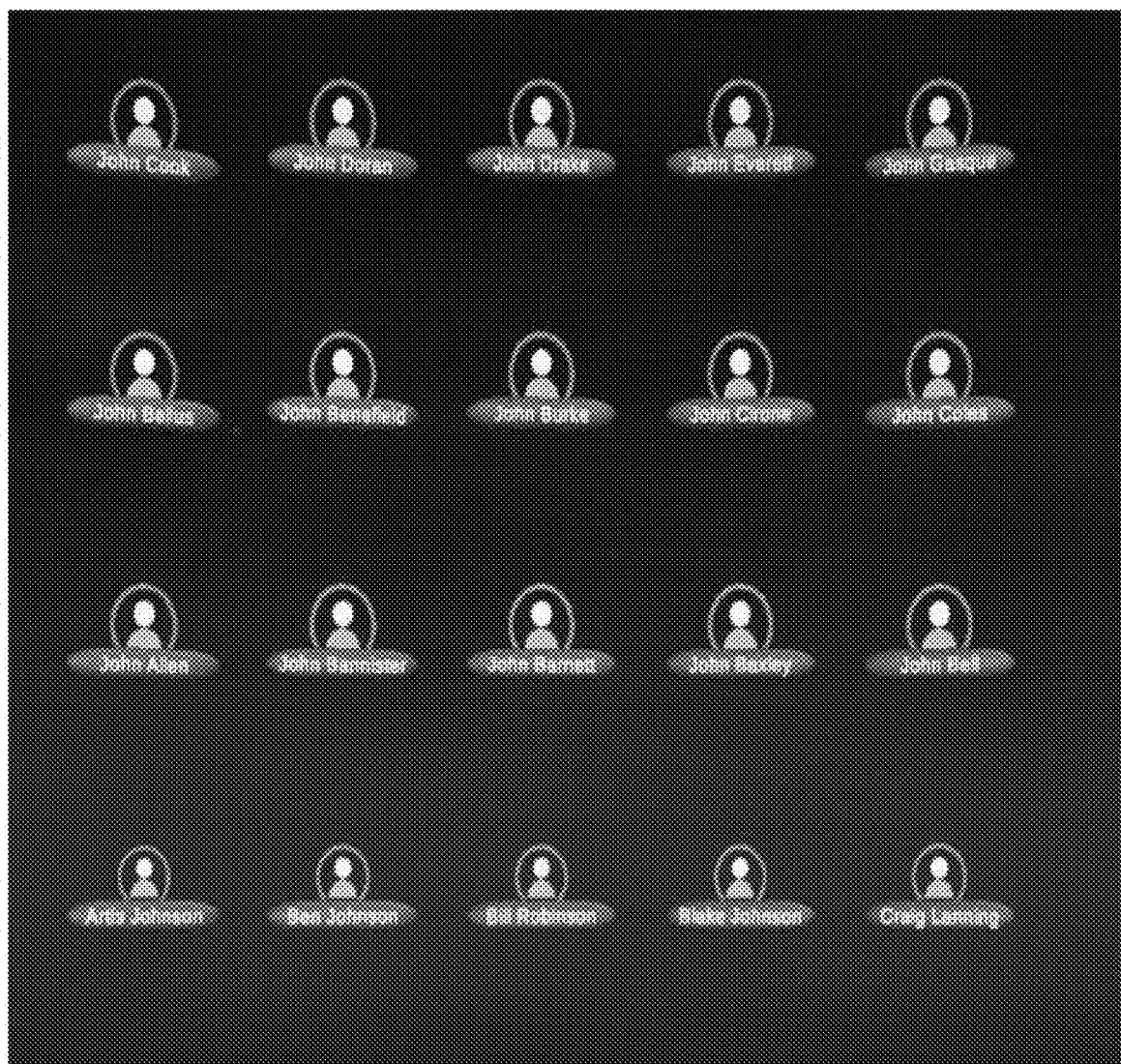

FIG. 31 provides an operational example of a grid layout user interface in accordance with some embodiments discussed herein.

Figure 32:
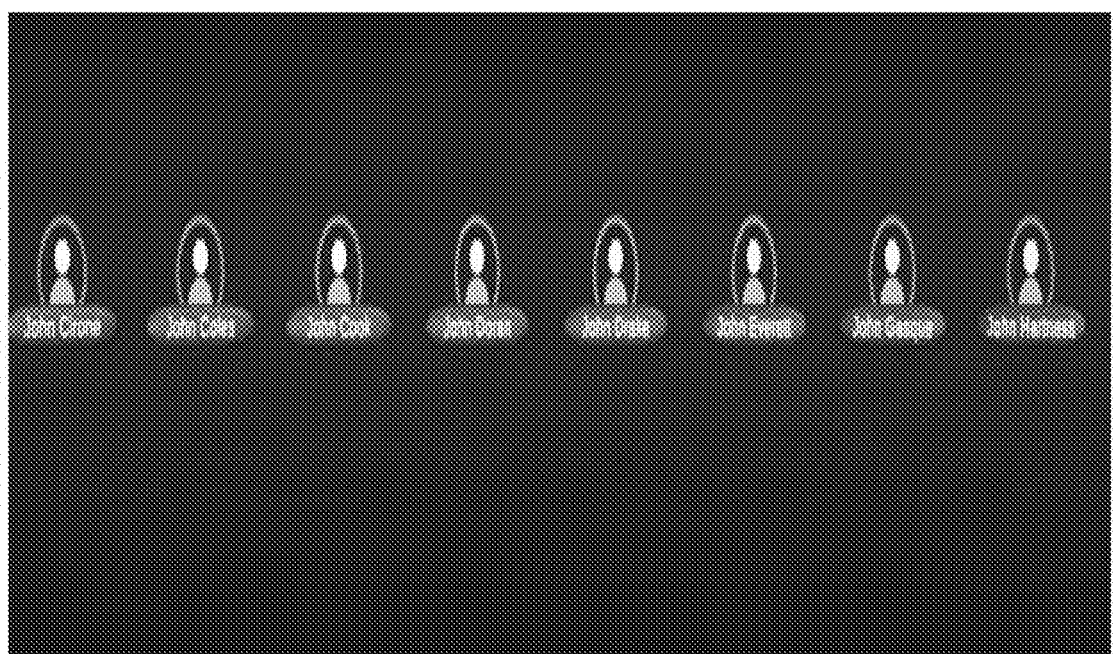

FIG. 32 provides an operational example of a line layout user interface in accordance with some embodiments discussed herein.

Figure 33:
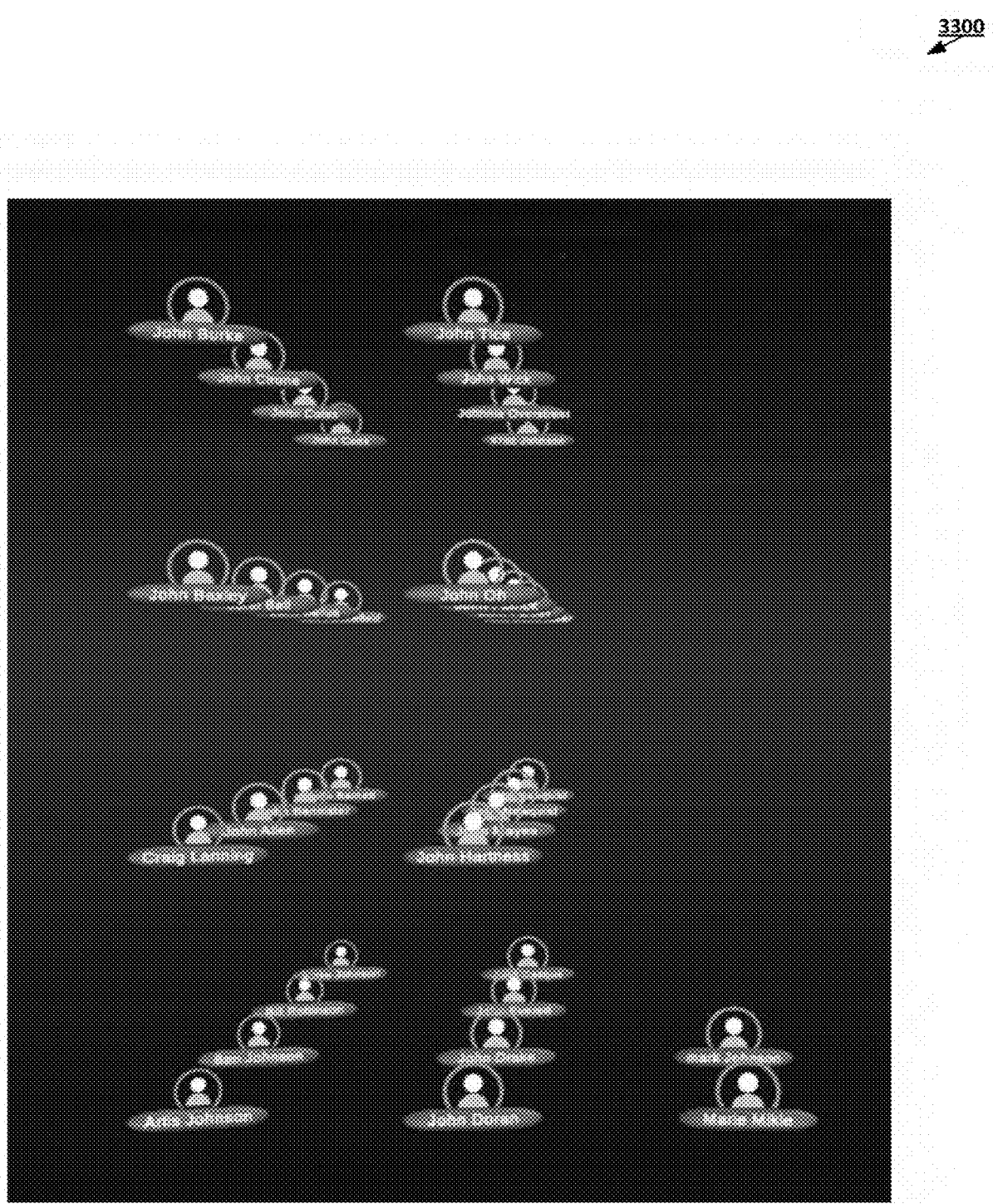

FIG. 33 provides an operational example of a cube layout user interface in accordance with some embodiments discussed herein.

Figure 34:
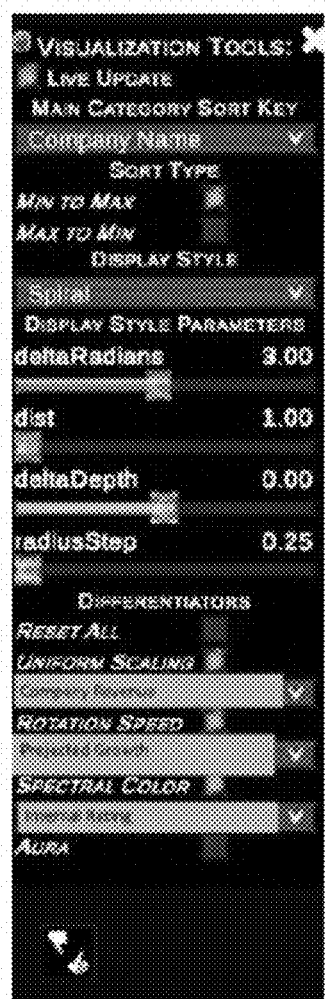

FIG. 34 provides an operational example of a visual tools selection user interface in accordance with some embodiments discussed herein.

Figure 35:
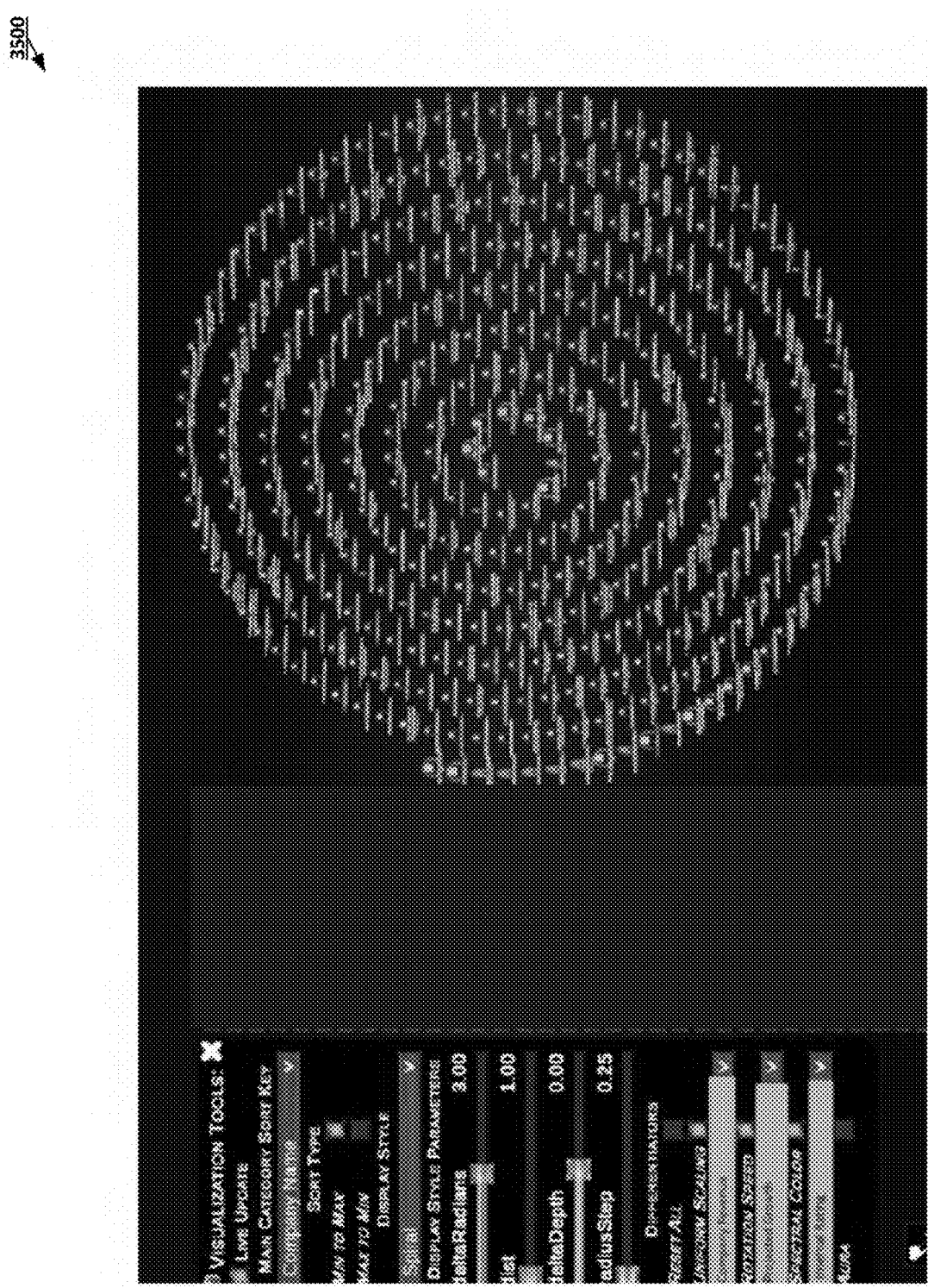

FIG. 35 provides an operational example of a data visualization user interface in accordance with some embodiments discussed herein.

Figure 36:
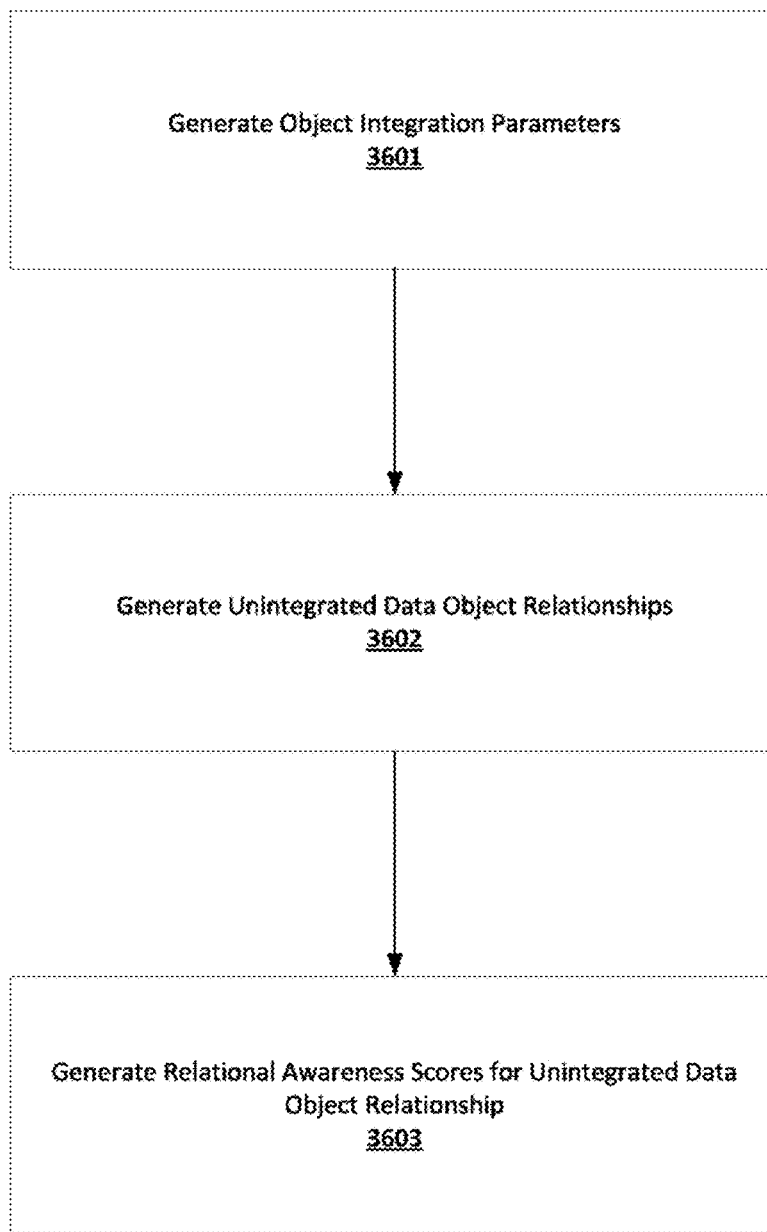

FIG. 36 is a flowchart diagram of an example process for integrating an external data object into a data model with dynamic relational awareness in accordance with some embodiments discussed herein.

Figure 37:
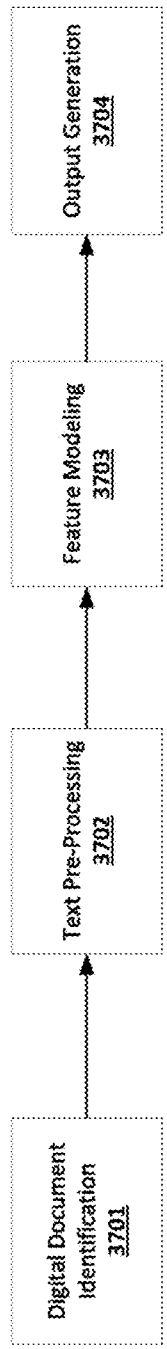

FIG. 37 is an operational flow diagram of an example process for extracting unintegrated data object relationships based on analyzing a particular digital document in accordance with some embodiments discussed herein.

Figure 38:
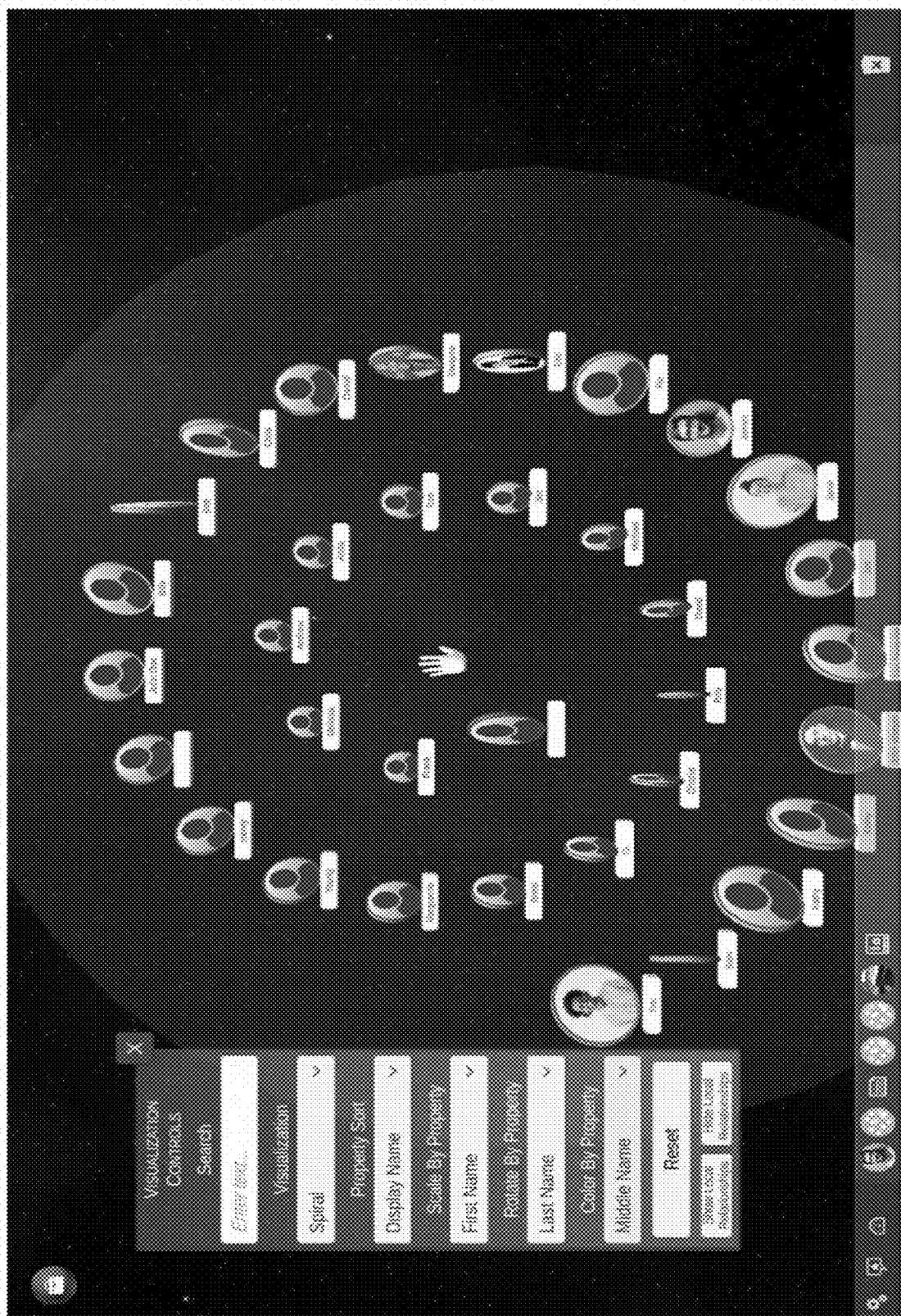

FIG. 38 provides an operational example of another user interface for displaying data object results of a data retrieval query in accordance with some embodiments discussed herein.

Figure 39:
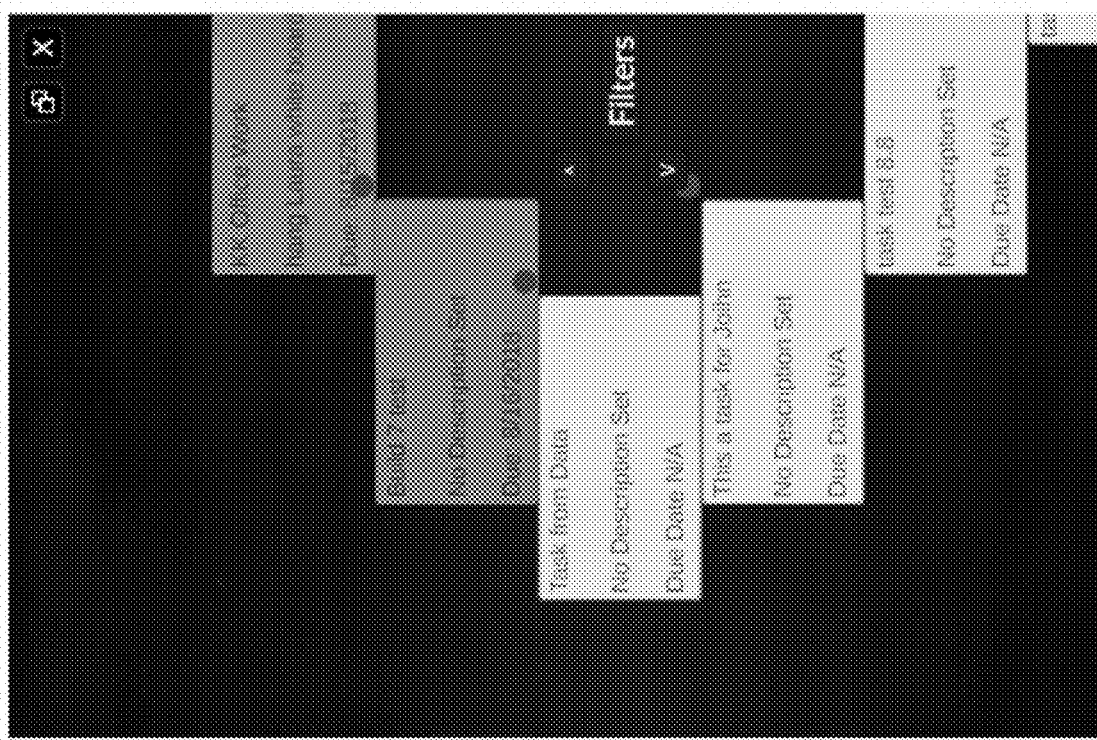

FIG. 39 provides an operational example of another user interface for a multi-object visualization space for various tasks data objects in accordance with some embodiments discussed herein.

DETAILED DESCRIPTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. OVERVIEW

Various embodiments of the present invention address technical shortcomings of traditional graph-based databases. For example, various embodiments of the present invention introduce innovative data models that process relationships between data objects not as static associations that are recorded independent of those data objects, but as dynamic associations that are recorded and absorbed by the data objects according to various attributes of those data objects. According to some aspects, a data object has relational awareness score with respect to each of its associated data object relationships. This allows the data object to have an independent recognition of various data object relationships, including data object relationships that are typically modeled indirect data object relationships in traditional graph models, while being able to distinguish between more significant data object relationships (e.g., data object relationships having higher respective relational awareness scores) and less significant data object relationships (e.g., data object relationships having lower respective relational awareness scores).

In traditional graph-based data models, relationships between data objects are processed and recorded as static associations defined by underlying semantics of data. For example, to show that John is an employee of a subsidiary of the XYZ company, a traditional graph-based model may record a relationship between John and his employer as well as a relationship between John's employer and the XYZ company. In such graph-based data models, depending on the underlying schema definition for a data object in the relevant graph-based database, each data object (e.g., the data object corresponding to John) either has no relational awareness scope (e.g., is simply a data object referenced by a relationship data object) or a relational awareness scope limited to direct relationships (e.g., is simply aware of the "is employed by" relationship with his employer).

In this way, in a traditional graph-based database, the relational awareness of data objects is at best limited by conceptual semantics of the node structure of the graph model. This is despite the fact that such semantics may provide a poor way of modeling functional significance relationships between data objects. The result is ineffective databases that fail to perform efficient and effective data retrieval and/or data visualization. Relatedly, because of the rigid semantic structure of such databases, they are not very scalable, because effective integration of external data objects requires mapping of such external data objects into a rigid and complex structure of restrictive relationships.

Various embodiments of the present invention address the noted shortcomings of the traditional graph-based database by introducing data models that process relationships between data objects not as static associations that are recorded independent of those data objects, but as dynamic associations that are recorded and absorbed by the data objects according to various attributes of those data objects. For example, various embodiments of the present invention enable recording numerous relationships between data objects as well as associating each recorded relationship with a dynamically-generated relational awareness score that indicates the significance of relationships to associated data objects. As discussed in greater detail below, relational awareness scores for particular data objects may be determined based at least in part on individual attributes of the particular data objects, individual attributes of hierarchical parent data objects of the particular data objects, individual attributes of data objects that are operationally related to the particular data objects, individual attributes of data objects that are deemed sufficiently similar to the particular data objects, significance of data objects and/or data object relationships to environment spaces of a data interaction environment, and/or the like.

Through utilizing the dynamic relational awareness concepts described herein, data retrieval and/or data visualization may be rendered more efficient and effective. Various embodiments of the present invention introduce efficient techniques for data retrieval and/or data visualization that utilize relational awareness scores and/or absorption scores. Furthermore, utilizing the dynamic relational awareness concepts described herein that are more scalable and are better capable of integrating external data objects into a relationally aware data model compared to existing data management solutions. Various embodiments of the present invention introduce efficient techniques for efficiently and effectively integrating external data objects into relationally aware data models. Through utilizing at least one of the dynamic relational awareness concepts described herein, the data retrieval concepts discussed herein, the data visualization concepts described, and the external integration concepts described herein, various embodiments of the present invention address various shortcomings of existing data management solutions (e.g., various shortcomings of existing graph-based data management solutions) and make important technical contributions to efficiency and effectiveness of such data management solutions.

Furthermore, various embodiments of the present invention dynamically modify data models (e.g., dynamically define relations between data objects and/or relational parameters for relations between data objects) based on an operational environment of an end-user interacting with a data interaction platform. In doing so, the noted embodiments of the present invention increase efficiency and user-friendliness of data retrieval and/or data searching by taking into account environment and/or contextual considerations in utilizing various relationships between the data objects to perform the noted data retrieval and/or data searching operations. The described environmentally dynamic data modeling techniques enable defining a large number of data object relationships at a time prior to a data retrieval session and utilizing a portion of the large number of data object relationships at a time of the data retrieval session. In this way, the described environmentally dynamic data modeling techniques differ from static data modeling techniques utilized in a variety of data modeling environments, such as relational data modeling environments, graph-based data modeling environments, static schema-based data modeling environments, etc.

Moreover, various embodiments of the present invention introduce dynamic data modeling techniques that enable utilizing machine learning and/or artificial intelligence techniques to set parameters that define relevance of inter-object relationships for data retrieval and/or data searching applications. In doing so, the noted embodiments of the present invention increase efficiency and user-friendliness of data retrieval and/or data searching by integrating predictive inferences (e.g., predictive inferences based on past user activities) in determining relevance of particular inter-object relationships for particular data retrieval and/or data searching tasks (e.g., particular data retrieval and/or data searching tasks defined with respect to an operational environment associated with such tasks). Examples of machine learning techniques used to infer relationship parameters based on past user activity data include techniques that utilize recurrent neural network models as well as techniques that utilize online learning models, such as techniques that utilizes a follow-the-regularized-leader online learning model.

II. DEFINITIONS OF CERTAIN TERMS

The term "individual absorption score" may refer to data that indicate an estimated relational awareness tendency of a particular data object given one or more individual attributes of the particular data object. For example, based at least in part on an example model for inferring individual absorption scores, a data object associated with a particular individual person having a high educational degree may be deemed to have a high absorption score. As another example, based at least in part on another example model for generating individual absorption scores, a data object a data object associated with a particular individual person having a particular physical profile (e.g., age, height, weight, and/or the like) may be deemed to have a high absorption score.

The term "hierarchical absorption score" may refer to data that indicate an estimated relational awareness tendency of a particular data object given one or more individual attributes of a parent data object of the particular data object. In some embodiments, the hierarchical absorption score for the data object is determined based at least in part on each individual absorption score for a parent data object that is a hierarchical parent of the data object. In some embodiments, the one or more parent data objects for a particular data object include a hierarchical meta-type of the particular data object, where the hierarchical meta-type of the particular data object indicates whether the particular data object is comprising one or more related hierarchical meta-type designations of a plurality of predefined hierarchical meta-type designations. In some embodiments, the plurality of predefined hierarchical meta-type designations include: a first predefined hierarchical meta-type designation associated with living real-world entities, a second predefined hierarchical meta-type designation associated with non-living-object real-world entities, a third predefined hierarchical meta-type designation associated with location-defining real-world entities, a fourth predefined hierarchical meta-type designation associated with time-defining real-world entities, a fifth predefined hierarchical meta-type designation associated with communication-defining entities, a sixth predefined hierarchical meta-type designation associated with group-defining entities, and a seventh predefined hierarchical meta-type designation associated with knowledge-defining entities.

The term "operational absorption score" may refer to data that indicate an estimated relational awareness tendency of a particular data object given one or more individual attributes of at least one data object that is deemed to be operationally related to (e.g., have a sufficiently strong relationship with) the particular data object. In some embodiments, the operational absorption score for the data object is determined based at least in part on each individual absorption score for a related data object that is operationally related to the particular data object. In some embodiments, a related data object is deemed related to a particular data object if there is a non-hierarchical relationship between the two data objects. In some embodiments, the one or more related data objects for a particular data object of include one or more user-defining objects associated with the particular data object and one or more access-defining data objects associated with the particular data object. In some embodiments, the one or more user-defining objects associated with the particular data object include one or more primary user-defining objects associated with the particular data object and one or more collaborator user-defining objects associated with the particular data object. In some embodiments, the one or more access-defining data objects associated with the particular data object include one or more sharing space data objects associated with the particular data object (e.g., a public sharing space data object, a collaborator space object, a shared space object, and/or the like).

The term "environment-based absorption score" may refer to data that indicate an estimated relational significance of the particular data object relationship given an environment state of the data interaction platform. In some embodiments, the environment state of the data interaction platform is selected from a plurality of candidate environment states of the data interaction platform. In some of those embodiments, the plurality of candidate environment states of the data interaction platform indicates at least one of the following: one or more private environment states, one or more professional environment states, one or more leisure environment state, and one or more public environment states.

The term "environment state" may refer to data that indicate an inferred user purpose and/or an indicated user purpose behind usage of a software environment such as a data interaction platform at a particular time. Environment states may be generated based at least in part on user-supplied information and/or by performing machine learning analysis of the usages of data at different time intervals and/or in different locations. For example, a data interaction platform computing entity may infer based at least in part on user interaction data that the user uses separate groups of data objects at different time intervals and thus conclude that the separate groups of data objects belong to different environments. Moreover, selection of one or more environment states for a particular usage session may be performed based at least in part on explicit user selection and/or based at least in part on detecting that the user is at a time-of-day and/or at a location associated with a particular environment state. For example, a data interaction platform computing entity may infer a "working" environment state for a particular usage session by a user during working hours and/or while the user is located at a geographic location of the user's office. As further discussed below, an innovative aspect of the present invention relates to utilizing relational awareness signals provided by the environment states for usage of a data interaction platform to generate relational awareness scores for particular data objects. In some embodiments, the environment state of a data interaction platform is selected from a plurality of candidate environment states of the data interaction platform. In some of those embodiments, the plurality of candidate environment states of the data interaction platform indicates at least one of the following: one or more private environment states, one or more professional environment states, one or more leisure environment state, and one or more public environment states.

The term "relational awareness score" may refer to data that indicate an estimated and/or predicted significance of a relationship associated with a particular data object to modeling real-world and/or virtual relationships of the particular data object which a data model seeks to model. In some embodiments, relational awareness score for a relationship indicates an estimated and/or predicted priority of a relationship associated with a particular data object when performing data retrieval and/or data search of data associated with the particular data object. According to some aspects of the present invention, a data object has relational awareness score with respect to each of its associated data object relationships. This allows the data object to have an independent recognition of various data object relationships, including data object relationships that are typically modeled indirect data object relationships in traditional graph models, while being able to distinguish between more significant data object relationships (e.g., data object relationships having higher respective relational awareness scores) and less significant data object relationships (e.g., data object relationships having lower respective relational awareness scores).

The term "absorption metric" may refer to data that indicate a property of the particular data object that is determined based at least in part on the individual attributes for the particular object and that can be used to estimate the individual absorption score of the particular data object. In some embodiments, generating the one or more absorption metrics based at least in part on the one or more individual attributes includes selecting a subset of the individual attributes based at least in part on an input space of an individualized absorption space configured to generate individual absorption scores for data objects based at least in part on absorption metrics for the data objects. In some embodiments, generating the one or more absorption metrics based at least in part on the one or more individual attributes includes performing a dimensionality reduction and/or feature embedding algorithm on the one or more individual attributes.

The term "individual absorption space" may refer to data that indicate a space configured to relate absorption metrics for various data objects that include a first set of data objects with known individual absorption scores and a second set of data objects with unknown individual absorption scores. An individual absorption space may be utilized to perform predictive inferences configured to generate relational awareness scores. The noted predictive inferences may include one or more supervised machine learning inferences and one or more unsupervised machine learning inferences, the latter category including one or more clustering machine learning inferences.

The term "absorption parameter" may refer to data that indicate a parameter used to determine an absorption parameter for the retrieved data object. Examples of absorption parameters include one or more of individual absorption parameters, hierarchical absorption parameters, operational absorption parameters, attribute-based absorption parameters, environment-based absorption parameters, and/or the like. In some embodiments, the one or more absorption parameters for a particular retrieved data object may include an individual absorption score for the particular retrieved data object, and the individual absorption score of the particular retrieved data object indicates an estimated relational awareness capacity of the particular retrieved data object given one or more object attributes of the particular retrieved data object. In some embodiments, the one or more absorption parameters for a particular retrieved data object include a hierarchical absorption score for the particular retrieved data object, and the hierarchical absorption score of the particular retrieved data object is determined based at least in part on each individual absorption score for a parent data object that is a hierarchical parent of the particular retrieved data object. In some embodiments, the one or more absorption parameters for a particular retrieved data object include an operational absorption score for the particular retrieved data object, and the operational absorption score of the particular retrieved data object is determined based at least in part on each individual absorption score for a related data object that is operationally related to the particular retrieved data object. In some embodiments, the one or more absorption parameters for a particular retrieved data object include an environment-based absorption score for the particular retrieved data object, and the environment-based absorption score of the particular retrieved data object indicates an estimated relational significance of the particular retrieved data object to an environment state of a data interaction platform executing the data retrieval query.

The term "visualization configuration parameter" refers to data that indicate at least one visual feature of an icon associated with the particular retrieved data object. The visualization configuration parameters may be defined based on one or more data visualization programming languages and/or one or more visualization definition features provided using graphical interaction capabilities of an integrated development environment for data visualization. In some embodiments, the one or more visualization configuration parameters for a particular retrieved data object include one or more visualization location coordinates for the particular retrieved data object, one or more shape-defining visualization configuration parameters for the particular retrieved data object, one or more rotation-speed-defining visualization configuration parameters for the particular retrieved data object, one or more color-defining visualization configuration parameters for the particular retrieved data object, one or more lighting/highlight visualization configurations configuration parameters, and one or more pulse-intensity-defining visualization configuration parameters for the particular retrieved data object. In some embodiments, to generate the visualization configuration parameters for the retrieved data object, a data visualization engine maps the one or more absorption parameters for the retrieved data object of the plurality of retrieved data objects to a visualization space comprising one or more input dimensions associated with the one or more absorption parameters and one or more output dimensions associated with one or more visualization configuration parameters and generates the visualization configuration parameters based at least in part on the visualization space. In some embodiments, at least some of the visualization configuration parameters are determined based at least in part on user input.

The term "visualization location coordinate" may refer to data that indicate a dimension of an n-dimensional visualization space associated with a data interaction platform. In some embodiments, the visualization location coordinates include at least one of the following: a first visualization location coordinate determined based at least in part on each particular relational awareness score for any retrieved data object relationship between the particular retrieved particular data object and other retrieved data objects, a second visualization location coordinate determined based at least in part on each environment-based absorption score for any retrieved data object relationship between the particular retrieved data object and the other retrieved data objects; and a third visualization location coordinate determined based at least in part on a hierarchical meta-type of the particular retrieved data object, where the hierarchical meta-type of the particular data object may indicate whether the particular data object is comprising one or more related hierarchical meta-type designations of a plurality of predefined hierarchical meta-type designations.

The term "shape-defining visualization configuration parameter" may refer to data that indicate an aspect of a shape of the icon associated with the particular retrieved data object. For example, a particular shape-defining visualization configuration parameter may define whether the icon for a corresponding retrieved data object is a rectangle, a circle, a cylinder, and/or the like. As another example, a particular shape-defining visualization configuration parameter may define size of the icon for a corresponding retrieved data object. As yet another example, a particular shape-defining visualization configuration parameter may define size of an aura region associated with the icon for a corresponding retrieved data object. In some embodiments, at least one shape-defining visualization configuration parameter for a particular retrieved data object may be determined based at least in part on user input, e.g., user input defining that an aspect of shape of an icon associated with the particular retrieved data object should indicate a particular attribute of the particular retrieved data object.

The term "color-defining visualization configuration parameter" may refer to data that indicate an aspect of a color of the icon associated with the particular retrieved data object. For example, a particular color-defining visualization configuration parameter may define whether the icon for a corresponding retrieved data object is red, blue, yellow, and/or the like. As another example, a particular color-defining visualization configuration parameter may define a color of a spectral region of an icon associated with the corresponding retrieved data object. In some embodiments, at least one color-defining visualization configuration parameter for a particular retrieved data object may be determined based at least in part on user input, e.g., user input defining that an aspect of color of an icon associated with the particular retrieved data object should indicate a particular attribute of the particular retrieved data object.

The term "rotation-speed-defining visualization configuration parameter" may refer to data that indicate an aspect of a rotation speed of the icon associated with the particular retrieved data object. For example, a particular rotation-speed-defining visualization configuration parameter may define whether the icon for a corresponding retrieved data object rotates faster or slow. As another example, a particular rotation-speed-defining visualization configuration parameter may define whether an icon associated with the corresponding retrieved data object rotates at all. In some embodiments, at least one rotation-speed-defining visualization configuration parameter for a particular retrieved data object may be determined based at least in part on user input, e.g., user input defining that an aspect of rotation speed of an icon associated with the particular retrieved data object should indicate a particular attribute of the particular retrieved data object.

The term "lighting/highlight visualization configuration parameter" may refer to data that indicate an aspect of lighting and/or highlight of the icon associated with the particular retrieved data object. For example, a particular lighting/highlight visualization configuration parameter may define whether the icon for a corresponding retrieved data object is light or dark. As another example, a particular lighting/highlight visualization configuration parameter may define a discrete and/or continuous value for an aspect of lighting and/or highlight of the icon associated with the particular retrieved data object based on one or more properties of the retrieved data objects, e.g., one or more relational awareness scores for relationships associated with the retrieved data object.

The term "pulse-intensity-defining visualization configuration parameter" may refer to data that indicate an aspect of a pulse intensity of the icon associated with the particular retrieved data object. For example, a particular pulse-intensity-defining visualization configuration parameter may define whether the icon for a corresponding retrieved data object pulses (e.g., contracts and expands). As another example, a particular pulse-intensity-defining visualization configuration parameter may define whether an icon associated with the corresponding retrieved data object pulses fast or slow. As yet another example, a particular pulse-intensity-defining visualization configuration parameter may define whether an icon associated with the corresponding retrieved data object has a smaller or larger range of contraction and expansion. In some embodiments, at least one pulse-intensity-defining visualization configuration parameter for a particular retrieved data object may be determined based at least in part on user input, e.g., user input defining that an aspect of pulse intensity of an icon associated with the particular retrieved data object should indicate a particular attribute of the particular retrieved data object. For example, the current state of a user interface element may enable a user to depict an indication of a first name of a "living" data object based at least in part on a pulse intensity of the icon of the "living" data object, e.g., such that an icon for a "living" data object having a first name whose first letter has alphabetic precedence over other "living" data objects pulses slower.

The term "layout configuration parameter may refer to data that indicate an aspect of layout of icons associated with the group of retrieved data objects. In some of the embodiments that utilize layout configuration parameters to define a layout of the icons associated with the group of retrieved data objects, one or more visualization location coordinates include one or more layout-based configuration parameters that define a location of the particular retrieved data object with respect to the defined layout. In some embodiments, layout configuration parameters are generated based at least in part on attributes of data object relationships between the group of retrieved data objects. In some embodiments, layout configuration parameters are generated based at least in part on user input.

The term "object integration parameter" may refer to data that indicate an attribute of the external data object that can be used to infer data object relationship between the external data object and at least some of the group of integrated data object relationships. In some embodiments, determining which object attributes can be used for integration is performing using one or more predictive models, such as one or more machine learning predictive models and/or one or more artificial intelligence predictive models. In some embodiments, the one or more object integration parameters for the external data object include one or more entity-type-defining parameters for the external data object, such as an entity-type-defining parameter indicating that the external data object relates to a "contacts" data object and/or an entity-type-defining parameter indicating that the external data object relates to a "projects" data object. In some embodiments, the one or more object integration parameters for the external data object include one or more topic-defining parameters for the external data object, such as a topic-defining parameter indicating that the external data object relates to business and/or a topic-defining parameter indicating that the external data object relates to sports. In some embodiments, the one or more object integration parameters are generated using an online learning model configured to process user interaction data with the external data object outside of the data interaction platform to generate the one or more object integration parameters. In some embodiments, the online learning model is a follow-the-regularized-leader model.

The term "unintegrated data object relationship" may refer to data that indicate a relationship between the external data object and at least one of the group of integrated data objects. In some embodiments, each unintegrated data object relationship is associated with one or more related data objects, where the one or more related data objects associated with an unintegrated data object relationship may include the external data object and at least one of the group of integrated data objects. In some embodiments, generating the one or more unintegrated data object relationships includes mapping the one or more object integration parameters to a relationship extrapolation space of the group of integrated data objects, wherein the relationship extrapolation space is comprising one or more input dimensions associated with the one or more object integration parameters and one or more output dimensions associated with one or more candidate data object relationship types; and determining the one or more unintegrated data object relationships based at least in part on the relationship extrapolation space.

The term "relationship extrapolation space" may refer to a data object that associate input parameters of particular data objects to desired relational definition parameters of the particular data objects. In some embodiments, generating the one or more unintegrated data object relationships includes mapping the one or more object integration parameters to a relationship extrapolation space of the group of integrated data objects, wherein the relationship extrapolation space is comprising one or more input dimensions associated with the one or more object integration parameters and one or more output dimensions associated with one or more candidate data object relationship types; and determining the one or more unintegrated data object relationships based at least in part on the relationship extrapolation space. In some embodiments, determining the one or more unintegrated data object relationships based at least in part on the relationship extrapolation space includes utilizing an unsupervised machine learning model (e.g., a clustering machine learning, a K-nearest-neighbor machine learning model, and/or the like) defined by the input space and output space of the relationship extrapolation space. In some embodiments, determining the one or more unintegrated data object relationships based at least in part on the relationship extrapolation space includes utilizing a supervised machine learning model (e.g., a neural network machine learning model) defined by the input space and output space of the relationship extrapolation space. In some embodiments, determining the one or more unintegrated data object relationships based at least in part on the relationship extrapolation space includes utilizing an online machine learning model (e.g., a follow-the-regularized-leader machine learning model) defined by the input space and output space of the relationship extrapolation space.

The term "relational score extrapolation space" may refer to a data object that associate input parameters of particular data objects and/or particular data object relationships to desired relational-awareness-score-related parameters of the particular data objects and/or particular data object relationships. In some embodiments, generating each relational awareness score for an unintegrated data object relationship includes mapping the one or more relational absorption parameters for the unintegrated data object relationship to a relational score extrapolation score for the group of integrated data object relationships, wherein the relational score extrapolation space is comprising one or more input dimensions associated with the one or more relational absorption parameters and one or more output dimensions associated with one or more relational awareness parameters; and determining the relational awareness score based at least in part on the one or more relational awareness parameters. In some embodiments, determining each relational awareness score for an unintegrated data object relationship based at least in part on the relational score extrapolation space includes utilizing a supervised machine learning model (e.g., a neural network machine learning model) defined by the input space and output space of the relationship extrapolation space. In some embodiments, determining each relational awareness score for an unintegrated data object relationship based at least in part on the relational score extrapolation space includes utilizing a supervised machine learning model (e.g., a neural network machine learning model) defined by the input space and output space of the relationship extrapolation space. In some embodiments, determining each relational awareness score for an unintegrated data object relationship based at least in part on the relational score extrapolation space includes utilizing an online machine learning model (e.g., a follow-the-regularized-leader machine learning model) defined by the input space and output space of the relationship extrapolation space.

III. COMPUTER PROGRAM PRODUCTS, METHODS, AND COMPUTING ENTITIES

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SWIM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. EXEMPLARY SYSTEM ARCHITECTURE

FIG. 1 is a schematic diagram of an example architecture 100 for performing data modeling and/or data visualization. The architecture 100 includes one or more client computing entities 102 and a data interaction platform computing entity 106. The data interaction platform computing entity 106 may be configured to communicate with at least one of the client computing entities 102 over a communication network (not shown). The communication network may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like). While not depicted in FIG. 1, the data interaction platform computing entity 106 may retrieve input data from one or more external computing entities, such as one or more external information server computing entities.

A client computing entity 102 may be configured to provide data retrieval requests and/or data visualization requests to the data interaction platform computing entity 106. The data interaction platform computing entity 106 may be configured to generate data retrieval outputs and/or data vitalization outputs in response to data retrieval requests and/or data visualization requests by client computing entities 102 and provide the generated data retrieval outputs and/or data vitalization outputs to requesting client computing entities 102.

The data interaction platform computing entity 106 includes a relational awareness modeling engine 111, a query processing engine 112, a data visualization engine 113, an external integration engine 114, and a storage subsystem 108. The relational awareness modeling engine 111 may be configured to generate relational awareness metadata and/or relationally aware data models for data objects stored in the storage subsystem 108 and to store the generated relational awareness metadata and/or relationally aware data models in the storage subsystem 108. The query processing engine 112 may be configured to process search queries based at least in part on the relational awareness metadata and/or relationally aware data models stored in the storage subsystem 108. The data visualization engine 113 may be configured to generate visual representations of data objects and/or data object relationships based at least in part on the relational awareness metadata and/or relationally aware data models stored in the storage subsystem 108. The external integration engine 114 may be configured to generate relational awareness metadata for external data objects and/or integrate external data objects in the relationally aware data models stored in the storage subsystem 108. The external integration engine 108 may store its generated relational awareness metadata and/or external integration data in the storage subsystem 108. In some embodiments, a visual representation may include one or more of a presentation, a display, a user interface, mark-up data, data that can be utilized to generate a user interface (e.g., JavaScript source code data), a video, etc.

The storage subsystem 108 may be configured to store generated relational awareness metadata and/or relationally aware data models associated with the data interaction platform computing entity 108. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary Data Interaction Platform Computing Entity

FIG. 2 provides a schematic of a data interaction platform computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the data interaction platform computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. In some embodiments, the data interaction platform computing entity 106 may be configured to perform one or more edge computing capabilities.

As shown in FIG. 2, in one embodiment, the data interaction platform computing entity 106 may include or be in communication with one or more processing elements 205 (also referred to as processors, processing circuitry, and/or similar terms used herein interchangeably) that communicate with other elements within the data interaction platform computing entity 106 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the data interaction platform computing entity 106 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity—relationship model, object model, document model, semantic model, graph model, and/or the like.

In one embodiment, the data interaction platform computing entity 106 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the data interaction platform computing entity 106 with the assistance of the processing element 205 and operating system.

As indicated, in one embodiment, the data interaction platform computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the data interaction platform computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the data interaction platform computing entity 106 may include or be in communication with one or more input elements, such as a keyboard input, a mouse input, a touch screen/display input, motion input, movement input, audio input, pointing device input, joystick input, keypad input, and/or the like. The data interaction platform computing entity 106 may also include or be in communication with one or more output elements (not shown), such as audio output, video output, screen/display output, motion output, movement output, and/or the like.

Exemplary Client Computing Entity

FIG. 3 provides an illustrative schematic representative of a client computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Client computing entities 102 can be operated by various parties. As shown in FIG. 3, the client computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the data interaction platform computing entity 106. In a particular embodiment, the client computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102 may operate in accordance with multiple wired communication standards and protocols, such as those described above with regard to the data interaction platform computing entity 106 via a network interface 320.

Via these communication standards and protocols, the client computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 102 can also download changes, add-ons, and updates, for instance, to its firmware, software (e.g., including executable instructions, applications, program modules), and operating system.

According to one embodiment, the client computing entity 102 may include location determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the client computing entity's 102 position in connection with a variety of other systems, including cellular towers, Wi-Fi access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the client computing entity 102 to interact with and/or cause display of information/data from the data interaction platform computing entity 106, as described herein. The user input interface can comprise any of a number of devices or interfaces allowing the client computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client computing entity 102. As indicated, this may include a user application that is resident on the entity or accessible through a browser or other user interface for communicating with the data interaction platform computing entity 106 and/or various other computing entities.

In another embodiment, the client computing entity 102 may include one or more components or functionality that are the same or similar to those of the data interaction platform computing entity 106, as described in greater detail above. As will be recognized, these architectures and descriptions are provided for exemplary purposes only and are not limiting to the various embodiments.

In various embodiments, the client computing entity 102 may be embodied as an artificial intelligence (AI) computing entity, such as an Amazon Echo, Amazon Echo Dot, Amazon Show, Google Home, and/or the like. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. EXEMPLARY SYSTEM OPERATIONS

Various embodiments of the present invention address technical shortcomings of traditional graph-based databases. For example, various embodiments of the present invention introduce innovative data models that process relationships between data objects not as static associations that are recorded independent of those data objects, but as dynamic associations that are recorded and absorbed by the data objects according to various attributes of those data objects. According to some aspects, a data object has relational awareness score with respect to each of its associated data object relationships. This allows the data object to have an independent recognition of various data object relationships, including data object relationships that are typically modeled indirect data object relationships in traditional graph models, while being able to distinguish between more significant data object relationships (e.g., data object relationships having higher respective relational awareness scores) and less significant data object relationships (e.g., data object relationships having lower respective relational awareness scores).

Various embodiments of the present invention address the noted shortcomings of the traditional graph-based database by introducing data models that process relationships between data objects not as static associations that are recorded independent of those data objects, but as dynamic associations that are recorded and absorbed by the data objects according to various attributes of those data objects. For example, various embodiments of the present invention enable recording numerous relationships between data objects as well as associating each recorded relationship with a dynamically-generated relational awareness score that indicates the significance of relationships to associated data objects. As discussed in greater detail below, relational awareness scores for particular data objects may be determined based at least in part on individual attributes of the particular data objects, individual attributes of hierarchical parent data objects of the particular data objects, individual attributes of data objects that are operationally related to the particular data objects, individual attributes of data objects that are deemed sufficiently similar to the particular data objects, significance of data objects and/or data object relationships to environment spaces of a data interaction environment, and/or the like.

Through utilizing the dynamic relational awareness concepts described herein, data retrieval and/or data visualization may be rendered more efficient and effective. Various embodiments of the present invention introduce efficient techniques for data retrieval and/or data visualization that utilize relational awareness scores and/or absorption scores. Furthermore, utilizing the dynamic relational awareness concepts described herein that are more scalable and are better capable of integrating external data objects into a relationally aware data model compared to existing data management solutions. Various embodiments of the present invention introduce efficient techniques for efficiently and effectively integrating external data objects into relationally aware data models. Through utilizing at least one of the dynamic relational awareness concepts described herein, the data retrieval concepts discussed herein, the data visualization concepts described, and the external integration concepts described herein, various embodiments of the present invention address various shortcomings of existing data management solutions (e.g., various shortcomings of existing graph-based data management solutions) and make important technical contributions to efficiency and effectiveness of such data management solutions.

In some embodiments, relational awareness score enable a data object to maintain self-awareness regarding its context. In some embodiments, updating of data objects may cause a change in values that encode relational properties of the data objects. In this sense, changes in data fields associated with a data object affects the relational context of the noted data object by, for example, changing relational awareness scores associated with the noted data object and other data objects. In some of the noted embodiments, the relational context updating techniques introduced herein enable a data object to exercise self-awareness not only regarding its immediate data context but also with respect to its relational context vis-à-vis other data objects. For example, the updating of the contents of a document data object causes changes in the relational scores encoding the strength of relationships of the document object with other data objects (e.g., with other task data objects).

Data Interaction Platform

FIG. 4 provides an operational example of a user interface 400 for a data interaction platform that may be generated by the data interaction platform computing entity 106 and that may utilize at least some of the dynamic relational awareness concepts, the data visualization concepts, and the external integration concepts discussed in the present document. The user interface 400 includes user interface elements 401-408 as well as user interface element 410. The user interface elements 401-408 each correspond to a hierarchical meta-type designation characterizing root nodes of a hierarchical dependency structure between data objects utilized by the data interaction platform. As further described below, the data interaction platform maintains a hierarchy of data objects, where each child data object hierarchically depends from one or more parent data objects. For example, a data object corresponding to a particular person who is an employee of a particular company and a graduate of a particular university may be a hierarchical dependent of a data object associated with employees of the particular company and a data object associated with graduates of the particular university. The data object associated with the employees of the particular company may in turn be a hierarchical dependent of a data object associated with working adults, while the data object associated with graduates of the particular university may in turn be a hierarchical dependent of a data object associated with university graduates. As further discussed below, an innovative aspect of the present invention relates to utilizing relational awareness signals provided at each level of a hierarchical dependency structure between data objects (e.g., absorption scores of each parent data object for a particular data object) to generate relational awareness scores for particular data objects.

In some embodiments, the hierarchical dependency structure relates each data object to at least one of various preconfigured hierarchical meta-type designations, where each hierarchical meta-type designation may relate to foundational properties of the data object that give a universal meaning to its relationship with other data objects. As described above, the preconfigured hierarchical meta-type designations may server as root nodes of a hierarchical dependency structure between data objects utilized by the data interaction platform. Various approaches may be adapted to define such preconfigured hierarchical meta-type designations, where each approach may utilize different foundational properties of data objects to define preconfigured hierarchical meta-type designations and/or maintain different levels of granularity for defining preconfigured hierarchical meta-type designations. In the exemplary approach depicted in the user interface 400 of FIG. 4, the preconfigured hierarchical meta-type designations are defined based on primary and potentially secondary characteristics/classifications to include a "living" designation associated with the user interface element 401, a "places" designation associated with the user interface element 402, a "things" designation associated with the user interface element 403, a "time" designation associated with the user interface element 404, an "actions" designation associated with the user interface element 405, a "communications" designation associated with the user interface element 406, a "groupings" designation associated with the user interface element 407, and a "knowledge" designation associated with the user interface element 408. However, a person of ordinary skill in the relevant technology will recognize that other formulations of the various preconfigured hierarchical meta-type designations are feasible and may confer particular advantages in various implementations and use cases.

Depending on system semantics, the "living" hierarchical meta-type designation may relate to data objects describing people, contacts, animals, plants, and/or the like. An operational example of a user interface depicting visual relationships of particular "living" data objects that may be generated in response to user selection of user interface element 401 is presented in FIG. 5. The user interface depicted in FIG. 5 includes a visualization of various target "living" data objects, such as the "living" data object corresponding to the individual named "Pooya Shoghi," whose visual representation is depicted using the user interface element 501 in the user interface of FIG. 5. As depicted in the user interface of FIG. 6, a user selection of the user interface element 501 depicts data objects that are related to the selected "living" data object, where the data objects are in turn organized by the preconfigured hierarchical meta-type designations discussed above in relation to user interface elements 401-408, here associated with the user interface elements 601-608 respectively. The user interface depicted in FIG. 5 further enables adding new data objects that are related to the selected "living" data object by selecting a designation for a new data object via the user interface element 610 and selecting the user interface element 611, which in turn leads to display of the user interface depicted in FIG. 7, which includes a form for entering attributes of the new data object (such as a company name attribute name that can be entered using user interface element 701, a company industry sector attribute name that can be entered using user interface element 702, and company address attributes that can be entered using user interface elements 703).

Depending on system semantics, the "places" hierarchical meta-type designation may relate to data objects describing locations, cities, regions, countries, continents, and/or the like. A "places" data object may have relationships with data objects of other hierarchical meta-type designations. For example, a "places" data object may have a "was born in" relationship with a "living" data object. As another example, a "places" data object may have a "will be performed in" relationship with an "action" data object. As yet another example, a "places" data object may have a "is located in" relationship with a "things" data object. As a further example, a "places" data object may have "occurred in" relationship with a "communications" data object.

Depending on system semantics, the "things" hierarchical meta-type designation may relate to data objects describing buildings, products, inanimate objects, equipment, inventory, and/or the like. A "things" data object may have relationships with data objects of other hierarchical meta-type designations. For example, a "things" data object may have a "purchased" relationship with a "living" data object. As another example, a "things" data object may have a "is generated using" relationship with an "action" data object. As yet another example, a "things" data object may have a "is located in" relationship with a "places" data object. As a further example, a "things" data object may have "was a subject of" relationship with a "communications" data object. In some embodiments, the "things" data objects may be selected via files of preconfigured formats which are configured to generate visualizations of the noted "things" data objects, for example a file that describe a visualization of a building or a product using relational awareness modeling data associated with the building or the product. FIG. 12 provides an operational example of a file selection user interface that may be generated in response to user selection of user interface element 403 in order to enable a user to select a file with a preconfigured format that describe a visualization of a "things" data object.

Depending on system semantics, a "time" hierarchical meta-type designation may relate to data objects describing seconds, minutes, hours, dates, date or time ranges, and/or the like. A "time" data object may have relationships with data objects of other hierarchical meta-type designations. For example, a "time" data object may have a "was born on" relationship with a "living" data object. As another example, a "time" data object may have a "will be performed on" relationship with an "action" data object. As yet another example, a "time" data object may have a "was purchased on" relationship with a "things" data object. As a further example, a "time" data object may have "occurred on" relationship with a "communications" data object. In some embodiments, a time data object may be a category of particular events. In some embodiments, a time data object may be used in linear and non-linear manners and may be deemed related to an action data object. A time data object may also be used to describe "active" and "inactive" statuses, such as a person being considered "active" during periods that fall within their life span and inactive after their period of death.

Time may also be associated with variations of various other designations, like object properties. By example, the start time of an object may have an associated size, like size a birth or size as a seedling, with said property being modified through course of the Time period. As an example, a tree may have an associated start size as 1 CM, and a state as a seed, with a secondary Time that is "Related" to the first time by a Time Period of X days after adequate light and heat, to transform into a tree of a very small size, with another linearly increased size to a maximum size occurring on yet another related Time period from the start Time, then a continuation to an approximate life span that does not alter (or does) alter the size or other properties until the end of that Time.

Depending on system semantics, an "actions" hierarchical meta-type designation may relate to data objects describing events, tasks, projects, performances, concerts, and/or the like. An "actions" data object may have relationships with data objects of other hierarchical meta-type designations. For example, an "actions" data object may have a "was performed by" relationship with a "living" data object. As another example, an "actions" data object may have a "will be performed on" relationship with a "time" data object. As yet another example, an "actions" data object may have a "can be performed by" relationship with a "things" data object. As a further example, an "actions" data object may have "was processed using" relationship with a "communications" data object. In some embodiments, the "actions" hierarchical meta-type designation may have two child data objects, a "tasks" child data object and a "projects" child data object. FIG. 9 provides an operational example of a user interface that may be generated in response to user interface of user interface element 405 associated with the "actions" hierarchical meta-type designation (a second operational example is depicted in FIG. 39). As depicted in FIG. 9, the depicted user interface includes user interface elements 901-902, which correspond to the "tasks" data object and "projects" data object respectively. As further depicted in the user interface of FIG. 10, selection of the user interface element 901 associated with the "tasks" data object relates to depicting various target data objects depending from the "tasks" data object, including the "Install ViZZ" data object associated with the user interface element 901. As further depicted in the user interface of FIG. 11, selection of user interface element 901 data objects that are related to the selected "tasks" data object, where the data objects are in turn organized by the preconfigured hierarchical meta-type designations discussed above in relation to user interface elements 401-408.

Tasks may refer to a single event, like the kicking of a football, or a series of events, like the playing of a football game, or the construction of a building. Therefore, Tasks may have associated child and parent tasks. As an example, the task of driving a car from work to home may include the task of starting the car, stopping at stop lights, and the like, while also having parent tasks of all actions (Tasks) for which the car was involved, or even all the cars of a city, and the like.

Depending on system semantics, the "communications" hierarchical meta-type designation may relate to data objects describing emails, phone calls, text messages, pager messages, meetings, and/or the like. Communications may also include the communicating of visual, audio and other information such as related in photos, videos, x-rays, multi-dimensional interaction such as within 3D models, and the relating of sensory information, such as smells, etc. A "communications" data object may have relationships with data objects of other hierarchical meta-type designations. For example, a "communications" data object may have a "was received by" relationship with a "living" data object. As another example, a "communications" data object may have a "includes guidelines for" relationship with an "action" data object. As yet another example, a "communications" data object may have a "discusses price of" relationship with a "things" data object. As a further example, a "communications" data object may have "occurred in" relationship with a "time" data object.

Depending on system semantics, the "groupings" hierarchical meta-type designation may relate to data objects describing companies, teams, organizations, email lists, and/or the like. A "groupings" data object may have relationships with data objects of other hierarchical meta-type designations. For example, a "groupings" data object may have a "is a participant in" relationship with a "living" data object. As another example, a "groupings" data object may have a "is expected to perform" relationship with an "action" data object. As yet another example, a "groupings" data object may have a "is owner of" relationship with a "things" data object. As a further example, a "groupings" data object may have "was formed in" relationship with a "time" data object. In some embodiments, a groupings data object may signify a relationship between the data objects in each group, for example a collection of people may be represented by a group data object of a company, thereby creating a relationship, via that company, of those contacts.

Depending on system semantics, the "knowledge" hierarchical meta-type designation may relate to data objects describing files, documents, books, articles, and/or the like. A "knowledge" data object may have relationships with data objects of other hierarchical meta-type designations. For example, a "knowledge" data object may have a "is authored by" relationship with a "living" data object. As another example, a "knowledge" data object may have a "describes how to perform" relationship with an "action" data object. As yet another example, a "knowledge" data object may have a "includes information about" relationship with a "things" data object. As a further example, a "knowledge" data object may have "was authored in" relationship with a "time" data object. In some embodiments, the "knowledge" hierarchical meta-type designation may have two child data objects, a "files" child data object and a "documents" child data object. FIG. 11 provides an operational example of a user interface that may be generated in response to user interface of user interface element 408 associated with the "knowledge" hierarchical meta-type designation. As depicted in FIG. 11, the depicted user interface includes user interface elements 1101-1102, which correspond to the "files" data object and the "documents" data object respectively. A knowledge data object may also have "is related to" information within the same characteristic class of knowledge items to other information on the same subject matter.

In some embodiments, a data object may be simultaneously associated with one or more hierarchical meta-type designations and/or may be a collection of one or more data objects of different hierarchical meta-type designations. For example, a person object may be a collection of interactions, living elements, relationships to others, etc. As another example, a photo object may be a collection of the subject matter, when it was taken, where it was taken, who took it, etc. As yet another example, an event data object may be a collection of the people or objects related to that event, the actions that occurred during the event, where the event took place, when the event took place, etc. In some embodiments, data becomes both more enriched, more self-aware, more useable, more storage-wise efficient, and more accessible (easily found by its identity), thus eliminating the need for utilizing nominal designators like file names and improving the ability to find things based on their unique characteristics. In some embodiments, the characteristics of an object can be temporally dynamically, e.g., such characteristics can change through time and experience, thus a data object for a person entity may change from childhood to adulthood.

Returning to FIG. 4, the user interface 400 further includes the user interface element 410 which enables user selection of one or more environment states for the data interaction platform. An environment state of a data interaction platform may indicate an inferred user purpose and/or an indicated user purpose behind usage of the data interaction platform at a particular time. Environment states may be generated based at least in part on user-supplied information and/or by performing machine learning analysis of the usages of data at different time intervals and/or in different locations. For example, the data interaction platform computing entity 106 may infer based at least in part on user interaction data that the user uses separate groups of data objects at different time intervals and thus conclude that the separate groups of data objects belong to different environments. Moreover, selection of one or more environment states for a particular usage session may be performed based at least in part on explicit user selection and/or based at least in part on detecting that the user is at a time-of-day and/or at a location associated with a particular environment state. For example, the data interaction platform computing entity 106 may infer a "working" environment state for a particular usage session by a user during working hours and/or while the user is located at a geographic location of the user's office. As further discussed below, an innovative aspect of the present invention relates to utilizing relational awareness signals provided by the environment states for usage of a data interaction platform to generate relational awareness scores for particular data objects.

FIG. 13 provides an operational example of a user interface that enables user selection of environment states. As depicted in the user interface of FIG. 13, the defined environment states are divided into four meta-type designations: a "live" environment 1301 (e.g., related to private or personal environment states) that includes the environment state "Pooya's Private Workspace" 1311, a "work" environment 1302 (e.g., related to professional environment states), a "play" environment 1303 (e.g., related to entertainment-related or leisure-related environment states) that includes the environment state "Pooya's Fun" 1313, and a "global" environment 1304 (e.g., related to general or public environment states) that includes the environment state "Global Public" 1314. A user can select an environment state by selecting one or more of the appropriate environments. Selection or deselection of environment states can affect visualizations of retrieved data item. For example, as depicted in the user interface of FIG. 14 relative to the user interface of FIG. 5, after selection of the environment state "Global Public" 1314, selection of the user interface element 401 leads to generation and display of a more crowded visualization with a greater number of depicted data objects compared to prior to selection of the environment state "Global Public" 1314. In some embodiments, environments can be utilized to define security parameters for accessing particular data objects and/or particular inter-object relationships. Users may create or select more than one environment at a time. By example, a user may have more than one job, and thus more than one work environment. This can include past jobs with differing states (Active, Inactive, Temporary, etc), or multiple simultaneous jobs. Users may also choose to display more than one simultaneous state, such as work and home data. Data visualization can also be impacted by user preference, through discernment using AI or other logic to determine most relevant data, by user geographic location, time of day, etc, to alter display of information and visual relevance of information. By example, though a user may have both work and home environments open, because they are at work and are engaged in work activities, the work-related information may be given visual preference over the home information. Further, because the user is accessing specific data, such as the projects they are working on, the information display for those projects may also be given priority over other project information, as may information relative to what they are currently doing, the people within the department they work in or who are also working on the same projects, and the like. In some embodiments, the data objects accessible by an end-user may be determined by one or more security policies associated with the data object.

The term "security environment" may refer to data that indicate one or more runtime parameter value ranges for one or more runtime parameters associated with a data access session by a user profile which may affect the ability of the user profile to access particular data objects. For example, a particular security environment may be defined by at least one of a location-based runtime parameter value indicating a particular geographic area (e.g., a particular geographic area corresponding to a particular office of a particular company), a temporal runtime parameter value indicating a particular range of time within a week (e.g., every weekday between 9 AM and 5 PM), a network connection-based runtime parameter indicating a particular network connection used to connect to the data interaction platform computing entity (e.g., a particular virtual private network (VPN) associated with a company), an environment-selection runtime parameter indicating an environment state selected by a user of the data interaction platform computing entity 106 (e.g., an environment state associated with work or leisure), a jurisdictional runtime parameter indicating a legal and/or regulatory jurisdiction of a user profile associated with the data access request, and/or the like.

The example data interaction platform depicted and described herein using FIGS. 4-14 can be utilized to process data retrieval queries and generate responsive query outputs, where a data retrieval query is any request to retrieve one or more data objects that correspond to particular data retrieval query criteria, e.g., one or more filtering criteria, one or more search criteria, and/or the like. For example, FIG. 15 provides an operational example of a user interface 1500 for processing data retrieval queries using the noted data interaction platform (a second operational example is presented in FIG. 38). As depicted in FIG. 15, the user interface 1500 includes user interface elements 1501 for specifying data retrieval query criteria, user interface elements 1502 for specifying visualization parameters defining a desired visualization of data, and user interface elements 1503 depicting search results. As further depicted in the user interface 1600 of FIG. 16, query outputs can be saved as sessions 1601-1602 and visualization results 1603 may include relationships between retrieved data objects. Processing data retrieval queries using a proposed data interaction platform will be described in greater detail below.

To provide the data modeling, data visualization, external integration, and query processing functionalities discussed herein, a data interaction platform utilizing dynamic relational awareness needs to utilize a robust logical data model that enables both relational awareness modeling aspects as well as dynamic user interaction aspects of the noted functionalities. An example of such a logical data model 1700 for a data interaction system is provided in FIG. 17. As depicted in FIG. 17, a user node 1701 is associated with a user profile object 1702, which uniquely identifies the user node 1701 within the data interaction platform, encodes attributes and relationships of the user node 1701 in relation to the data interaction platform, and enables the user node 1701 to interact with other user nodes 1701 within the data interaction platform. The user profile object 1702 manages various data objects, such as a collaboration space 1703 of user profile objects whose access to the data interaction platform is controlled by the user node 1701, a shared space 1704 of data objects that were shared by the user node 1701 with other user profile objects within the data interaction platform and which may include primary data objects such as primary data object 1741 or other shared spaces such as shared space 1742, a team object 1705 that enables the user node 1701 to manage access to its data on a group level, environment objects 1706 each identifying an environment state associated with the user node 1701, and environment classes 1707 each identifying a meta-type designation of environment states associated with the user node 1701.

As further depicted in the logical data model 1700 of FIG. 17, user profile object 1702 owns a space object 1708 which may act as container of multiple data objects and which may include one or more space objects such as space object 1781, one or more primary data objects such as primary data object 1782, and one or more secondary data objects such as secondary data object 1783. Moreover, user profile object 1702 owns a primary data object 1709 which may act as a primary data node and which may include one or more space objects such as space object 1791, one or more primary data objects such as primary data object 1792, and one or more secondary data objects such as secondary data object 1794. In some embodiments, a secondary data object is a data object that is defined by association with another data object such that it will be deleted upon deletion of the other data object. An example of a secondary data object is a phone number data object for an individual person data object. In some embodiments, at least some of the data objects depicted in the logical data model 1700 of FIG. 17 are "default" data objects, meaning that they are automatically created upon creation of a user profile object. In some embodiments, the default data objects include one or more of the team object 1705, the collaborator space 1703, and the shared space 1704.

Data Modeling and Data Retrieval

FIG. 18 is a flowchart diagram of an example process 1800 for generating relational awareness models for a data interaction platform. Via the various steps/operations of the process 1800, the relational awareness modeling engine 111 of the data interaction platform computing entity 106 can generate relational awareness scores for data object relationships with respect to related data objects in an efficient and effective manner.

The process 1800 begins at step/operation 1801 when the relational awareness modeling engine 111 generates an absorption score for each data object associated with a data interaction platform. In some embodiments, the absorption score for a data object indicates an estimated relational awareness tendency of the data object. Different data objects may exhibit different expected capacities of forming relationships with other data objects. For example, a "living" data object may typically have a stronger tendency to be aware of its relationships relative to a "communications" data object. The noted example illustrates both the diverse absorption scores of various data objects as well as the role of hierarchical relationships in forming the diverse absorption scores of various data objects. As described below, hierarchical relationships are one of many inferential signals that the relational awareness modeling engine 111 can use to infer absorption scores for various data objects.

In some embodiments, step/operation 1801 can be performed in accordance with the process depicted in FIG. 19, which is a flowchart diagram of an example process for generating an absorption score for a particular data object. The process depicted in FIG. 19 begins at step/operation 1901 when the relational awareness modeling engine 111 generates an individual absorption score for the particular data object. In some embodiments, the individual absorption score of the particular data object indicates an estimated relational awareness tendency of the particular data object given one or more individual attributes of the particular data object. For example, based at least in part on an example model for inferring individual absorption scores, a data object associated with a particular individual person having a high educational degree may be deemed to have a high absorption score. As another example, based at least in part on another example model for generating individual absorption scores, a data object a data object associated with a particular individual person having a particular physical profile (e.g., age, height, weight, and/or the like) may be deemed to have a high absorption score.

In some embodiments, step/operation 1901 can be performed in accordance with the process depicted in FIG. 20, which is a flowchart diagram of an example process for generating an individual absorption score for a particular data object. The process depicted in FIG. 20 begins at step/operation 2001 when the relational awareness modeling engine 111 obtains one or more individual attributes for the particular data object. Examples of individual attributes for the particular data object include dynamic attributes generated in accordance with the data schema code segment 2100 of FIG. 21, dynamic properties generated in accordance with the data schema code segment 2200 of FIG. 22, and the static properties generated in accordance with the data schema code segment 2300 of FIG. 23.

At step/operation 2002, the relational awareness modeling engine 111 generates one or more absorption metrics based at least in part on the one or more individual attributes obtained in step/operation 2001. In some embodiments, an absorption metric of a particular data object is a property of the particular data object that is determined based at least in part on the individual attributes for the particular object and that can be used to estimate the individual absorption score of the particular data object. In some embodiments, generating the one or more absorption metrics based at least in part on the one or more individual attributes includes selecting a subset of the individual attributes based at least in part on an input space of an individualized absorption space configured to generate individual absorption scores for data objects based at least in part on absorption metrics for the data objects. In some embodiments, generating the one or more absorption metrics based at least in part on the one or more individual attributes includes performing a dimensionality reduction and/or feature embedding algorithm on the one or more individual attributes.

In some embodiments, data objects may be configured to explore and identify relationship properties between themselves and other data objects. For example, a document object may be configured to explore to identify document objects of similar subject, and then create relationships between itself and the identified documents and generate a relational awareness score for each created relationship based on both similarity and relevance of the subject matters of the two document objects. In some embodiments, the self-exploration concepts discussed herein enable a data model to be organically self-building, which reduces and/or eliminates the need for expensive data modeling operations.

At step/operation 2003, the relational awareness modeling engine 111 maps the one or more absorption metrics generated in step/operation 2002 to an individual absorption space. An individual absorption space may be a space configured to relate absorption metrics for various data objects that include a first set of data objects with known individual absorption scores and a second set of data objects with unknown individual absorption scores. An operational example of an individual absorption space 2400 is depicted in FIG. 24. As depicted in FIG. 24, the individual absorption space 2400 includes input dimensions 2401-2403 associated with absorption metrics A-C respectively. Each point 2411-2416 depicts a corresponding data object. As further depicted in the individual absorption space 2400 of FIG. 24, points having solid boundaries (e.g., points 2411 and 2414) have known individual absorption scores, while points having dashed boundaries (e.g., points 2412-2413 and 2415-2416) have unknown individual absorption scores.

At step/operation 2004, the relational awareness modeling engine 111 generates the individual absorption score based at least in part on the individual absorption space. In some embodiments, to generate the individual absorption score for a particular data object, the relational awareness modeling engine 111 generates, based at least in part on the individual absorption space, one or more clusters of data objects including a cluster that includes the point corresponding to absorption metrics for the particular data object as mapped to the individual absorption space as well as points corresponding to one or more data objects with known individual absorption spaces. In some embodiments, to generate the individual absorption score for a particular data object, the relational awareness modeling engine 111 finds the closest K data objects with known individual absorption spaces whose corresponding points in the individual absorption space is closest to the point corresponding to the absorption metrics for the particular data object and generates the individual absorption score for the particular data object based at least in part on the known individual absorption spaces for the closest K data objects, where K may be a preconfigured hyper-parameter of the relational awareness modeling engine 111 and may have a value of one or more.

An operational example of generating individual absorption scores based at least in part on the individual absorption space is depicted in the individual absorption space 2400 of FIG. 24. As depicted in FIG. 24, the individual absorption space 2400 includes two object clusters: object cluster 2421 and object cluster 2422. In accordance with the clustering arrangement depicted in FIG. 24, the relational awareness modeling engine 111 may utilize the known individual absorption score for the data object corresponding to the point 2411 to generate individual absorption scores of the data objects corresponding to the points 2412-2413. Moreover, further in accordance with the clustering arrangement depicted in FIG. 24, the relational awareness modeling engine 111 may utilize the known individual absorption score for the data object corresponding to the point 2414 to generate individual absorption scores of the data objects corresponding to the points 2415-2416.

Returning to FIG. 19, at step/operation 1902, the relational awareness modeling engine 111 generates a hierarchical absorption score for the particular data object. For example, the hierarchical absorption score for a particular data object that has a hierarchical parents P1, P2, and P3 may be determined based at least in part on individual absorption scores of P1, P2, and P3. In some embodiments, the hierarchical absorption score for the data object is determined based at least in part on each individual absorption score for a parent data object that is a hierarchical parent of the data object. In some embodiments, the one or more parent data objects for a particular data object include a hierarchical meta-type of the particular data object, where the hierarchical meta-type of the particular data object indicates whether the particular data object is comprising one or more related hierarchical meta-type designations of a plurality of predefined hierarchical meta-type designations. In some embodiments, the plurality of predefined hierarchical meta-type designations include: a first predefined hierarchical meta-type designation associated with living real-world entities, a second predefined hierarchical meta-type designation associated with non-living-object real-world entities, a third predefined hierarchical meta-type designation associated with location-defining real-world entities, a fourth predefined hierarchical meta-type designation associated with time-defining real-world entities, a fifth predefined hierarchical meta-type designation associated with communication-defining entities, a sixth predefined hierarchical meta-type designation associated with group-defining entities, and a seventh predefined hierarchical meta-type designation associated with knowledge-defining entities.

At step/operation 1903, the relational awareness modeling engine 111 generates an operational absorption score for the particular data object. In some embodiments, the operational absorption score for the data object is determined based at least in part on each individual absorption score for a related data object that is operationally related to the particular data object. In some embodiments, a related data object is deemed related to a particular data object if there is a non-hierarchical relationship between the two data objects. In some embodiments, the one or more related data objects for a particular data object of include one or more user-defining objects associated with the particular data object and one or more access-defining data objects associated with the particular data object. In some embodiments, the one or more user-defining objects associated with the particular data object include one or more primary user-defining objects associated with the particular data object and one or more collaborator user-defining objects associated with the particular data object. In some embodiments, the one or more access-defining data objects associated with the particular data object include one or more sharing space data objects associated with the particular data object (e.g., a public sharing space data object, a collaborator space object, a shared space object, and/or the like).

At step/operation 1904, the relational awareness modeling engine 111 generates an attribute-based absorption score for the particular data object. In some embodiments, the attribute-based absorption score for the particular data object is performed based at least in part on each individual absorption score for a similar data object whose respective individual attributes are determined to be sufficiently similar to the one or more object attributes of the particular data object. In some embodiments, the relational awareness modeling engine 111 generates a distance measure between each pair of data objects and determines particular pairs of data objects whose distance measure exceeds a threshold distance measure. In some of those embodiments, the relational awareness modeling engine 111 generates an attribute-based absorption score for a particular data object based at least in part on any data object that is member of a particular pair of data objects that also includes the particular data object.

At operation 1905, the relational awareness modeling engine 111 generates the absorption score for the particular data object based at least in part on the individual absorption score for the particular data object, the hierarchical absorption score for the particular data object, the operational absorption score for the particular data object, and the attribute absorption score for the particular data object. In some embodiments, to generate the absorption score for the particular data object, the relational awareness modeling engine 111 applies a parameter to each of the individual absorption score for the particular data object, the hierarchical absorption score for the particular data object, the operational absorption score for the particular data object, and the attribute absorption score for the particular data object, where each parameter may be determined using a preconfigured absorption score generation model such as a generalized linear model and/or using a supervised machine learning algorithm for determining absorption scores.

Returning to FIG. 18, at step/operation 1802, the relational awareness modeling engine 111 generates an environment-based absorption score for each data object relationship. In some embodiments, the environment-based absorption score of a particular data object relationship indicates an estimated relational significance of the particular data object relationship given an environment state of the data interaction platform. In some embodiments, the environment state of the data interaction platform is selected from a plurality of candidate environment states of the data interaction platform. In some of those embodiments, the plurality of candidate environment states of the data interaction platform indicates at least one of the following: one or more private environment states, one or more professional environment states, one or more leisure environment state, and one or more public environment states.

At step/operation 1803, the relational awareness modeling engine 111 generates relational awareness scores based at least in part on the absorption scores for data objects determined in step/operation 1801 and environment-based absorption scores for data object relationships determined in step/operation 1803. In some embodiments, for each data object relationship of the plurality of data object relationships that is associated with a plurality of related data objects, relational awareness modeling engine 111 generates a relational awareness score with respect to each of the plurality of related data objects associated with the data object relationship. In some of those embodiments, the relational awareness score for the data object relationship with respect to a particular related data object of the plurality of related data objects is determined based at least in part on the absorption score of the particular related data object and the environment-based absorption score for the data object relationship. In some embodiments, to generate relational awareness scores, the relational awareness modeling engine 111 applies a parameter to each of the absorption scores for the data objects and environment-based absorption scores for the data object relationships, where each parameter may be determined using a preconfigured relational score generation model such as a generalized linear model and/or using a supervised machine learning algorithm for determining relational awareness scores.

In some embodiments, the query processing engine 112 of the data interaction platform computing entity 106 uses the relational awareness scores generated by the relational awareness modeling engine 111 at step/operation 1803 to process one or more data retrieval queries. In some of those embodiments, to process a data retrieval query, the query processing engine 112 identifies one or more filtering parameters associated with the data retrieval query, generates a query relevance score for each data object relationship based at least in part on one or more filtering parameters and each relational awareness score associated with the data object relationship, and generates a query output based at least in part on each query relevance score for a data object relationship.

In some embodiments, a relational score may have multiple score components, such as a negative score component and a positive score component. In some of the embodiments where a relational score has a positive component a negative component, the score components are viewed as independent from one another and not summed up in a cumulative manner. For example, a relationship may be associated with a positive score component of ten and a negative score component of ten, but the two values are not summed up to generate a value of zero. In some embodiments, relational scores may be displayed graphically using textual representations and/or using graphical representations, for example by utilizing one or more of the data visualization techniques described herein (including one or more multi-dimensional data visualization techniques described herein).

In some embodiments, when relational awareness scores change over time, past scores may be maintained and be accessible to generate time-series data that reflect changes in relational scores over time. For example, a relational awareness score between two people may start off at a 3, increase over time to an 8, and then decrease to 1. The relational awareness modeling engine 111 may be configured to analyze such fluctuations to generate one or more interaction recommendations between the noted two people. Moreover, various events may be associated with various relational impact scores. For example, an event may have a negative but temporary impact score of −9.

Data Visualization

FIG. 25 is a flowchart diagram of an example process 2500 for generating a visual representation of a group of retrieved data objects which have been retrieved in response to a data retrieval query. Using the various steps/operations of process 2500, the data visualization engine 113 of the data interaction platform computing entity 106 can perform visualization of data objects using relational awareness metrics.

The process 2500 begins at step/operation 2501 when the data visualization engine 113 generates one or more absorption parameters for the retrieved data object. In some embodiments, an absorption parameter for the retrieved data object is any parameter used to determine an absorption parameter for the retrieved data object. Examples of absorption parameters include one or more of individual absorption parameters, hierarchical absorption parameters, operational absorption parameters, attribute-based absorption parameters, environment-based absorption parameters, and/or the like. In some embodiments, the one or more absorption parameters for a particular retrieved data object may include an individual absorption score for the particular retrieved data object, and the individual absorption score of the particular retrieved data object indicates an estimated relational awareness capacity of the particular retrieved data object given one or more object attributes of the particular retrieved data object. In some embodiments, the one or more absorption parameters for a particular retrieved data object include a hierarchical absorption score for the particular retrieved data object, and the hierarchical absorption score of the particular retrieved data object is determined based at least in part on each individual absorption score for a parent data object that is a hierarchical parent of the particular retrieved data object. In some embodiments, the one or more absorption parameters for a particular retrieved data object include an operational absorption score for the particular retrieved data object, and the operational absorption score of the particular retrieved data object is determined based at least in part on each individual absorption score for a related data object that is operationally related to the particular retrieved data object. In some embodiments, the one or more absorption parameters for a particular retrieved data object include an environment-based absorption score for the particular retrieved data object, and the environment-based absorption score of the particular retrieved data object indicates an estimated relational significance of the particular retrieved data object to an environment state of a data interaction platform executing the data retrieval query.

At step/operation 2502, the data visualization engine 113 generates one or more visualization configuration parameters for each retrieved data object based at least in part on the one or more absorption parameters for the retrieved data object generated in step/operation 2501. In some embodiments, a visualization configuration parameter for a particular retrieved data object indicates at least one visual feature of an icon associated with the particular retrieved data object. In some embodiments, the one or more visualization configuration parameters for a particular retrieved data object include one or more visualization location coordinates for the particular retrieved data object, one or more shape-defining visualization configuration parameters for the particular retrieved data object, one or more rotation-speed-defining visualization configuration parameters for the particular retrieved data object, one or more color-defining visualization configuration parameters for the particular retrieved data object, one or more lighting/highlight visualization configurations configuration parameters, and one or more pulse-intensity-defining visualization configuration parameters for the particular retrieved data object. In some embodiments, to generate the visualization configuration parameters for the retrieved data object, the data visualization engine 113 maps the one or more absorption parameters for the retrieved data object of the plurality of retrieved data objects to a visualization space comprising one or more input dimensions associated with the one or more absorption parameters and one or more output dimensions associated with one or more visualization configuration parameters and generates the visualization configuration parameters based at least in part on the visualization space. In some embodiments, at least some of the visualization configuration parameters are determined based at least in part on user input, e.g., user input entered using a visualization tools selection user interface such as the example visualization tools selection user interface 3400 of FIG. 34.

In some embodiments, relational awareness modeling engine 111 tracks variations in relational awareness scores. In some embodiments, relational awareness modeling engine 111 tracks relative volatility of relational awareness scores for a particular data object over time. In some embodiments, the relational awareness modeling engine 111 uses the variations in relational awareness scores and/or relative volatility of relational awareness scores for a particular data object over time to generate predictive conclusions about the behavior of the data object. For example, substantial fluctuations in relational awareness scores of a person data object may indicate psychological instability. As another example, substantial fluctuations in relational awareness scores of an organization data object may indicate poor management.

In some embodiments, step/operation 2502 may be performed in accordance with the process depicted in FIG. 26, which is a flowchart diagram of an example process for generating visualization configuration parameters for a particular retrieved data object. The process depicted in FIG. 26 begins at step/operation 2601 when the data visualization engine 113 generates one or more visualization location coordinates for the particular retrieved data object. In some embodiments, each of the one or more visualization location coordinates for the particular retrieved data object correspond to a dimension of an n-dimensional visualization space associated with a data interaction platform. In some embodiments, the visualization location coordinates include at least one of the following: a first visualization location coordinate determined based at least in part on each particular relational awareness score for any retrieved data object relationship between the particular retrieved particular data object and other retrieved data objects, a second visualization location coordinate determined based at least in part on each environment-based absorption score for any retrieved data object relationship between the particular retrieved data object and the other retrieved data objects; and a third visualization location coordinate determined based at least in part on a hierarchical meta-type of the particular retrieved data object, where the hierarchical meta-type of the particular data object may indicate whether the particular data object is comprising one or more related hierarchical meta-type designations of a plurality of predefined hierarchical meta-type designations.

At step/operation 2602, the data visualization engine 113 generates one or more shape-defining visualization configuration parameters for the particular retrieved data object. A shape-defining visualization configuration parameter for the particular retrieved data object may define an aspect of a shape of the icon associated with the particular retrieved data object. For example, a particular shape-defining visualization configuration parameter may define whether the icon for a corresponding retrieved data object is a rectangle, a circle, a cylinder, and/or the like. As another example, a particular shape-defining visualization configuration parameter may define size of the icon for a corresponding retrieved data object. As yet another example, a particular shape-defining visualization configuration parameter may define size of an aura region associated with the icon for a corresponding retrieved data object. In some embodiments, at least one shape-defining visualization configuration parameter for a particular retrieved data object may be determined based at least in part on user input, e.g., user input defining that an aspect of shape of an icon associated with the particular retrieved data object should indicate a particular attribute of the particular retrieved data object. For example, as depicted in the example visualization configuration user interface 2700 of FIG. 27, the current state of the user interface element 2701 enables a user to depict an indication of a middle name of a "living" data object based at least in part on an aura of the icon of the "living" data object, e.g., such that an icon for a "living" data object having a middle name will have a larger aura and/or such that an icon for a "living" data object having a middle name whose first letter has alphabetic precedence over other "living" data objects has a larger aura.

At step/operation 2603, the data visualization engine 113 generates one or more color-defining visualization configuration parameters for the particular retrieved data object. A color-defining visualization configuration parameter for the particular retrieved data object may define an aspect of a color of the icon associated with the particular retrieved data object. For example, a particular color-defining visualization configuration parameter may define whether the icon for a corresponding retrieved data object is red, blue, yellow, and/or the like. As another example, a particular color-defining visualization configuration parameter may define a color of a spectral region of an icon associated with the corresponding retrieved data object. In some embodiments, at least one color-defining visualization configuration parameter for a particular retrieved data object may be determined based at least in part on user input, e.g., user input defining that an aspect of color of an icon associated with the particular retrieved data object should indicate a particular attribute of the particular retrieved data object. For example, as depicted in the example visualization configuration user interface 2700 of FIG. 7, the current state of the user interface element 2702 enables a user to depict an indication of an employer name of a "living" data object based at least in part on a spectral color of the icon of the "living" data object, e.g., such that an icon for a "living" data object having an employer name will have a brighter spectral color and/or such that an icon for a "living" data object having an employer name whose first letter has alphabetic precedence over other "living" data objects has a brighter spectral color.

At step/operation 2604, the data visualization engine 113 generates one or more rotation-speed-defining visualization configuration parameters for the particular retrieved data object. A rotation-speed-defining visualization configuration parameter for the particular retrieved data object may define an aspect of a rotation speed of the icon associated with the particular retrieved data object. For example, a particular rotation-speed-defining visualization configuration parameter may define whether the icon for a corresponding retrieved data object rotates faster or slow. As another example, a particular rotation-speed-defining visualization configuration parameter may define whether an icon associated with the corresponding retrieved data object rotates at all. In some embodiments, at least one rotation-speed-defining visualization configuration parameter for a particular retrieved data object may be determined based at least in part on user input, e.g., user input defining that an aspect of rotation speed of an icon associated with the particular retrieved data object should indicate a particular attribute of the particular retrieved data object. For example, as depicted in the example visualization configuration user interface 2700 of FIG. 7, the current state of the user interface element 2703 enables a user to depict an indication of a first name of a "living" data object based at least in part on a rotation speed of the icon of the "living" data object, e.g., such that an icon for a "living" data object having a first name whose first letter has alphabetic precedence over other "living" data objects has a slower rotation speed.

At step/operation 2605, the data visualization engine 113 generates one or more lighting/highlight visualization configuration parameters for the particular retrieved data object. A lighting/visualization visualization configuration parameter for the particular retrieved data object may define an aspect of lighting and/or highlight of the icon associated with the particular retrieved data object. For example, a particular lighting/highlight visualization configuration parameter may define whether the icon for a corresponding retrieved data object is light or dark. As another example, a particular lighting/highlight visualization configuration parameter may define a discrete and/or continuous value for an aspect of lighting and/or highlight of the icon associated with the particular retrieved data object based on one or more properties of the retrieved data objects, e.g., one or more relational awareness scores for relationships associated with the retrieved data object.

At step/operation 2605, the data visualization engine 113 generates one or more pulse-intensity-defining visualization configuration parameters for the particular retrieved data object. A pulse-intensity-defining visualization configuration parameter for the particular retrieved data object may define an aspect of a pulse intensity of the icon associated with the particular retrieved data object. For example, a particular pulse-intensity-defining visualization configuration parameter may define whether the icon for a corresponding retrieved data object pulses (e.g., contracts and expands). As another example, a particular pulse-intensity-defining visualization configuration parameter may define whether an icon associated with the corresponding retrieved data object pulses fast or slow. As yet another example, a particular pulse-intensity-defining visualization configuration parameter may define whether an icon associated with the corresponding retrieved data object has a smaller or larger range of contraction and expansion. In some embodiments, at least one pulse-intensity-defining visualization configuration parameter for a particular retrieved data object may be determined based at least in part on user input, e.g., user input defining that an aspect of pulse intensity of an icon associated with the particular retrieved data object should indicate a particular attribute of the particular retrieved data object. For example, the current state of a user interface element may enable a user to depict an indication of a first name of a "living" data object based at least in part on a pulse intensity of the icon of the "living" data object, e.g., such that an icon for a "living" data object having a first name whose first letter has alphabetic precedence over other "living" data objects pulses slower.

Returning to FIG. 25, at step/operation 2502, the data visualization engine 113 generates one or more layout configuration parameters for the group of retrieved data objects. In some embodiments, a layout configuration parameter defines an aspect of layout of icons associated with the group of retrieved data objects. In some of the embodiments that utilize layout configuration parameters to define a layout of the icons associated with the group of retrieved data objects, one or more visualization location coordinates include one or more layout-based configuration parameters that define a location of the particular retrieved data object with respect to the defined layout. In some embodiments, layout configuration parameters are generated based at least in part on attributes of data object relationships between the group of retrieved data objects. In some embodiments, layout configuration parameters are generated based at least in part on user input, e.g., user input entered using the example display style selection user interface element 2800 of FIG. 28. Examples of layouts defined by layout configuration parameters include cloud layouts (e.g., the example cloud layout depicted using the user interface 2900 of FIG. 29), spiral layouts (e.g., the example spiral layout depicted using the user interface 3000 of FIG. 30), grid layouts (e.g., the example grid layout depicted using the user interface 3100 of FIG. 31), line layouts (the example line layout depicted using the user interface 3200 of FIG. 32), and cube layouts (the example cube layout depicted using the user interface 3300 of FIG. 33). Other examples of layouts defined by layout configuration parameters include hierarchical layouts, such as family trees, organizational charts, workflows, etc.

In some embodiments, the data visualization engine 113 generates the visual representation based at least in part on each one or more visualization configuration parameters for a retrieved data object of the group of retrieve data objects. An operational example of an example data visualization user interface 3500 is presented in FIG. 35. In some embodiments, the data visualization engine 113 generates the visual representation based at least in part on one or more visualization configuration parameters for each retrieved data object relationship between the group of retrieved data objects. In some embodiments, to generate visualization configuration parameters for a retrieved data object relationship, the data visualization engine 113 uses each relational awareness score associated with the retrieved data object relationship with respect to at least one retrieved data object of the group of retrieved data objects. In some embodiments, to generate visualization configuration parameters for a retrieved data object relationship, the data visualization engine 113 uses each environment-based absorption score associated with the retrieved data object relationship with respect to an environment state of the data interaction platform being utilized. In some embodiments, visualization configuration parameters for a retrieved data object relationship may indicate one or more of tabular data display, multi-line display of text (e.g., a rolodex-style display), radial display (e.g., a Ferris-wheel-style display), flash-based display of object-related information, text visualization properties such as font changes, etc.

External Object Integration

FIG. 36 depicts a flowchart diagram of an example process 3600 for integrating an external data object into a data model with dynamic relational awareness. Via the various steps/operations of process 3600, the external integration engine 114 of the data interaction platform computing entity 106 can enable external integration of unintegrated data objects into a data interaction platform comprising a group of integrated data object relationships between a group of integrated data objects.

The process 3600 begins at step/operation 3601 when the external integration engine 114 generates object integration parameters for the external data object. In some embodiments, an object integration parameter for the external data object is an attribute of the external data object that can be used to infer data object relationship between the external data object and at least some of the group of integrated data object relationships. In some embodiments, the one or more object integration parameters for the external data object include one or more entity-type-defining parameters for the external data object, such as an entity-type-defining parameter indicating that the external data object relates to a "contacts" data object and/or an entity-type-defining parameter indicating that the external data object relates to a "projects" data object. In some embodiments, the one or more object integration parameters for the external data object include one or more topic-defining parameters for the external data object, such as a topic-defining parameter indicating that the external data object relates to business and/or a topic-defining parameter indicating that the external data object relates to sports. In some embodiments, the one or more object integration parameters are generated using an online learning model configured to process user interaction data with the external data object outside of the data interaction platform to generate the one or more object integration parameters. In some embodiments, the online learning model is a follow-the-regularized-leader model.

In some embodiments, the one or more object integration parameters for the external data object include an individual absorption score for the external data object, where the individual absorption score of the external data object may indicate an estimated relational awareness capacity of the external data object given one or more object attributes of the external data object. In some embodiments, the one or more object integration parameters for the external data object include a hierarchical absorption score for the external data object, where the hierarchical absorption score of the external data object may be determined based at least in part on each individual absorption score for a parent data object that is a hierarchical parent of the external data object. In some embodiments, the one or more object integration parameters for the external data object include an operational absorption score for the external data object, where the operational absorption score of the external data object may be determined based at least in part on each individual absorption score for a related data object that is operationally related to the external data object. In some embodiments, the one or more object integration parameters for the external data object include an environment-based absorption score for the external data object, where the environment-based absorption score of the external data object may indicate an estimated relational significance of the external data object to an environment state of the data interaction platform. In some embodiments, the one or more object integration parameters for the external data object include an attribute-based absorption score for the external data object, where the attribute-based absorption score of the external data object may be determined based at least in part on individual absorption scores of data objects whose individual attributes are deemed sufficiently similar to the individual attributes of the external data object, e.g., whose individual attributes have a similarity score with respect to the external data object that exceeds a threshold similarity score.

At step/operation 3602, the external integration engine 114 generates one or more unintegrated data object relationships based at least in part on the one or more object integration parameters. In some embodiments, an unintegrated data object relationship is a relationship between the external data object and at least one of the group of integrated data objects. In some embodiments, each unintegrated data object relationship is associated with one or more related data objects, where the one or more related data objects associated with an unintegrated data object relationship may include the external data object and at least one of the group of integrated data objects. In some embodiments, generating the one or more unintegrated data object relationships includes mapping the one or more object integration parameters to a relationship extrapolation space of the group of integrated data objects, wherein the relationship extrapolation space is comprising one or more input dimensions associated with the one or more object integration parameters and one or more output dimensions associated with one or more candidate data object relationship types; and determining the one or more unintegrated data object relationships based at least in part on the relationship extrapolation space. In some embodiments, generating the one or more relational absorption parameters for an unintegrated data object relationship of the one or more unintegrated data object relationships includes generating the one or more relational absorption parameters based at least in part on the one or more object integration parameters generated in step/operation 3601.

In some embodiments, determining the one or more unintegrated data object relationships based at least in part on the relationship extrapolation space includes utilizing an unsupervised machine learning model (e.g., a clustering machine learning, a K-nearest-neighbor machine learning model, and/or the like) defined by the input space and output space of the relationship extrapolation space. In some embodiments, determining the one or more unintegrated data object relationships based at least in part on the relationship extrapolation space includes utilizing a supervised machine learning model (e.g., a neural network machine learning model) defined by the input space and output space of the relationship extrapolation space. In some embodiments, determining the one or more unintegrated data object relationships based at least in part on the relationship extrapolation space includes utilizing an online machine learning model (e.g., a follow-the-regularized-leader machine learning model) defined by the input space and output space of the relationship extrapolation space.

In some embodiments, step/operation 3602 for a particular external data object that is a digital document may be performed in accordance with the process depicted in FIG. 37. The process depicted in FIG. 37 begins at step/operation 3701 when the external integration engine 114 receives the digital document. The digital document may be an email communication, a word file, etc. The digital document may be in a regular text format, rich text format, image format, etc. The digital document may be uploaded to the data interaction platform computing entity 106, identified (e.g., downloaded) by the external integration engine 114 based on monitoring end-user activity, and/or generated by the external integration engine 114 based on monitoring end-user activity.

At step/operation 3702, the external integration engine 114 performs text-preprocessing on the digital document to generate relevant features from the digital document. The text pre-processing performed by the external integration engine 114 may include at least one of tokenization, stop-word removal, term-frequency-inverse-domain-frequency (TF-IDF) modeling, word embedding modeling. In some embodiments, TF-IDF modeling may be performed based on a corpus of data that include textual data associated with other data objects modeled by the data interaction platform computing entity 106. In some embodiments, TF-IDF modeling may be performed based on a vocabulary of modeled terms defined by configuration parameters of the data interaction platform computing entity 106. In some embodiments, embedding features may be determined based on detected feature patterns of other data objects modeled by the data interaction platform computing entity 106 and/or based on configuration parameters of the data interaction platform computing entity 106.

At step/operation 3703, the external integration engine 114 performs feature modeling on the features generated at step/operation 3702. Feature modeling may involve utilizing one or more machine learning models, such as one or more supervised machine learning models and/or one or more unsupervised machine learning models. In some embodiments, the machine learning models utilized for feature modeling include a convolutional machine learning model. In some of the embodiments utilizing a convolutional machine learning model to perform feature modeling, the kernels of the convolutional machine learning model may be defined based on data relationships defined based on relational awareness scores generated by the relational awareness modeling engine 111. For example, the relational awareness modeling engine 111 may determine a strong relationship between person data objects of the type executive and event objects of the type earning call and thus look for combinations of the terms associated with the two noted data objects using a particular feature extraction kernel of a convolutional neural network.

At step/operation 3704, the external integration engine 114 performs output generation based on the feature modeling data generated in step/operation 3703. The generated output includes one or more unintegrated data object relationships each defined by one or more unintegrated data object relationship parameters, where the unintegrated data object relationship parameters for each unintegrated data object relationship are determined based on the feature modeling data associated with the digital document. The generated output may further include text summarization data, document classification data, and sentiment detection data.

At step/operation 3603, the external integration engine 114 generates one or more relational awareness scores for each unintegrated data object relationship generated in step/operation 3603. In some embodiments, for each unintegrated data object relationship of the one or more unintegrated data object relationships, the external integration engine 114 generates one or more relational absorption parameters for the unintegrated data object relationship, and generates, based at least in part on the one or more relational absorption parameters, a respective relational awareness score for the unintegrated data object relationship with respect to each related data object of the one or more related data objects that is associated with the unintegrated data object relationship. In some embodiments, by generating data object relationships between a new data object and existing data objects of a relationally aware database as well as generating relational awareness scores for the newly generated data object relationships, the external integration engine 114 performs external integration of the new data object into the relationally aware database in an effective and efficient manner. In some embodiments, a continuous altering of relationships creates a ripple effect, where the change, addition, or removal of an object can create new relationships, create new relationship parameters for existing relationships, and impact existing relationship parameters.

In some embodiments, generating each relational awareness score for an unintegrated data object relationship includes mapping the one or more relational absorption parameters for the unintegrated data object relationship to a relational score extrapolation score for the group of integrated data object relationships, wherein the relational score extrapolation space is comprising one or more input dimensions associated with the one or more relational absorption parameters and one or more output dimensions associated with one or more relational awareness parameters; and determining the relational awareness score based at least in part on the one or more relational awareness parameters. In some embodiments, determining each relational awareness score for an unintegrated data object relationship based at least in part on the relational score extrapolation space includes utilizing a supervised machine learning model (e.g., a neural network machine learning model) defined by the input space and output space of the relationship extrapolation space. In some embodiments, determining each relational awareness score for an unintegrated data object relationship based at least in part on the relational score extrapolation space includes utilizing a supervised machine learning model (e.g., a neural network machine learning model) defined by the input space and output space of the relationship extrapolation space. In some embodiments, determining each relational awareness score for an unintegrated data object relationship based at least in part on the relational score extrapolation space includes utilizing an online machine learning model (e.g., a follow-the-regularized-leader machine learning model) defined by the input space and output space of the relationship extrapolation space.

VI. CONCLUSION

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous. Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method for generating a data model with dynamic relational awareness for a data interaction platform comprising a plurality of data object relationships between a plurality of data objects, the computer-implemented method comprising:

for each data object of the plurality of data objects:
generating an individual absorption score, wherein the individual absorption score indicates an estimated relational awareness tendency given one or more individual attributes of the corresponding data object,
generating a hierarchical absorption score, wherein the hierarchical absorption score is generated based at least in part on each individual absorption score for a parent data object that is a hierarchical parent of the corresponding data object, and
generating an operational absorption score, wherein the operational absorption score for the data object is determined based at least in part on each individual absorption score for a related data object that is operationally related to the data object; and for each data object relationship that is associated with a plurality of related data objects, generating a relational awareness score for the data object relationship with respect to each of the plurality of related data objects that are associated with the data object relationship, wherein the relational awareness score for a particular data object relationship with respect to a particular related data object is generated based at least in part on the individual absorption score for the particular related data object, the hierarchical absorption score for the particular related data object, and the operational absorption score for the particular related data object.

2. The computer-implemented method of claim 1, wherein generating the individual absorption score for a particular data object of the plurality of data objects comprises:
generating one or more absorption metrics for the particular data object based at least in part on the one or more object attributes of the particular data object;
mapping the one or more absorption metrics to an individual absorption space; and
generating the individual absorption score based at least in part on the individual absorption space.

3. The computer-implemented method of claim 1, wherein the one or more parent data objects for a particular data object comprise a hierarchical meta-type of the particular data object, wherein the hierarchical meta-type of the particular data object indicates whether the particular data object is comprising one or more related hierarchical meta-type designations of a plurality of predefined hierarchical meta-type designations.

4. The computer-implemented method of claim 3, wherein the plurality of predefined hierarchical meta-type designations comprises:
a first predefined hierarchical meta-type designation associated with living real-world entities,
a second predefined hierarchical meta-type designation associated with non-living-object real-world entities,
a third predefined hierarchical meta-type designation associated with location-defining real-world entities,
a fourth predefined hierarchical meta-type designation associated with time-defining real-world entities,
a fifth predefined hierarchical meta-type designation associated with communication-defining entities,
a sixth predefined hierarchical meta-type designation associated with group-defining entities, and
a seventh predefined hierarchical meta-type designation associated with knowledge-defining entities.

5. The computer-implemented method of claim 1, wherein the one or more related data objects for a particular data object comprise one or more user-defining objects associated with the particular data object and one or more access-defining data objects associated with the particular data object.

6. The computer-implemented method of claim 5, wherein the one or more user-defining objects associated with the particular data object comprise one or more primary user-defining objects associated with the particular data object and one or more collaborator user-defining objects associated with the particular data object.

7. The computer-implemented method of claim 5, wherein the one or more access-defining data objects associated with the particular data object comprise one or more sharing space data objects associated with the particular data object.

8. The computer-implemented method of claim 1, wherein the environment state of the data interaction platform is selected from a plurality of candidate environment states of the data interaction platform.

9. The computer-implemented method of claim 8, wherein the plurality of candidate environment states of the data interaction platform comprises one or more private environment states, one or more professional environment states, one or more leisure environment state, and one or more public environment states.

10. The computer-implemented method of claim 1, further comprising:
performing a data retrieval query in relation to the data interaction platform using the data model.

11. The computer-implemented method of claim 10, wherein performing the data retrieval query comprises:
identifying one or more filtering parameters associated with the data retrieval query;
generating a query relevance score for each data object relationship of the plurality of data object relationships based at least in part on one or more filtering parameters and each relational awareness score associated with the data object relationship; and
generating a query output based at least in part on each query relevance score for a data object relationship of the plurality of data object relationships.

12. The computer-implemented method of claim 1, wherein:
generating the overall absorption score for a particular data object of the plurality of data objects is performed further based at least in part on an attribute-based absorption score for the particular data object, and
the attribute-based absorption score for the particular data object is performed based at least in part on each individual absorption score for a similar data object of the plurality of data objects whose respective individual attributes are determined to be sufficiently similar to the one or more object attributes of the particular data object.

13. The computer-implemented method of claim 1, further comprising:
detecting a modification of a first data object of the plurality of data objects; and
in response to detecting the modification, updating each relational awareness score associated with the first data object.

14. An apparatus for generating a data model with dynamic relational awareness for a data interaction platform comprising a plurality of data object relationships between a plurality of data objects, the apparatus comprising at least one processor and at least one memory including program code, the at least one memory and the program code configured to, with the processor, cause the apparatus to at least:
for each data object of the plurality of data objects:
generate an individual absorption score, wherein the individual absorption score indicates an estimated relational awareness tendency given one or more individual attributes of the corresponding data object,
generate a hierarchical absorption score, wherein the hierarchical absorption score is generated based at least in part on each individual absorption score for a parent data object that is a hierarchical parent of the corresponding data object, and
generate an operational absorption score, wherein the operational absorption score for the data object is determined based at least in part on each individual absorption score for a related data object that is operationally related to the data object; and for each data object relationship that is associated with a plurality of related data objects, generate a relational awareness score for the data object relationship with respect to each of the plurality of related data objects that are associated with the data object relationship, wherein the relational awareness score for a particular data object relationship with respect to a particular related data object is generated based at least in part on the individual absorption score for the particular related data object, the hierarchical absorption score for the particular related data object, and the operational absorption score for the particular related data object.

15. The apparatus of claim 14, wherein generating the individual absorption score for a particular data object of the plurality of data objects comprises:
generating one or more absorption metrics for the particular data object based at least in part on the one or more object attributes of the particular data object;
mapping the one or more absorption metrics to an individual absorption space; and
generating the individual absorption score based at least in part on the individual absorption space.

16. The apparatus of claim 14, wherein the one or more parent data objects for a particular data object comprise a hierarchical meta-type of the particular data object, wherein the hierarchical meta-type of the particular data object indicates whether the particular data object is comprising one or more related hierarchical meta-type designations of a plurality of predefined hierarchical meta-type designations.

17. The apparatus of claim 16, wherein the plurality of predefined hierarchical meta-type designations comprises:
a first predefined hierarchical meta-type designation associated with living real-world entities,
a second predefined hierarchical meta-type designation associated with non-living-object real-world entities,
a third predefined hierarchical meta-type designation associated with location-defining real-world entities,
a fourth predefined hierarchical meta-type designation associated with time-defining real-world entities,
a fifth predefined hierarchical meta-type designation associated with communication-defining entities,
a sixth predefined hierarchical meta-type designation associated with group-defining entities, and
a seventh predefined hierarchical meta-type designation associated with knowledge-defining entities.

18. The apparatus of claim 14, wherein the one or more related data objects for a particular data object comprise one or more user-defining objects associated with the particular data object and one or more access-defining data objects associated with the particular data object.

19. The apparatus of claim 18, wherein the one or more user-defining objects associated with the particular data object comprise one or more primary user-defining objects associated with the particular data object and one or more collaborator user-defining objects associated with the particular data object.

20. A computer program product for generating a data model with dynamic relational awareness for a data interaction platform comprising a plurality of data object relationships between a plurality of data objects, the computer program product comprising at least one non-transitory computer-readable storage medium having computer-readable program code portions stored therein, the computer-readable program code portions configured to:
for each data object of the plurality of data objects:
generate an individual absorption score, wherein the individual absorption score indicates an estimated relational awareness tendency given one or more individual attributes of the corresponding data object,
generate a hierarchical absorption score, wherein the hierarchical absorption score is generated based at least in part on each individual absorption score for a parent data object that is a hierarchical parent of the corresponding data object, and
generate an operational absorption score, wherein the operational absorption score for the data object is determined based at least in part on each individual absorption score for a related data object that is operationally related to the data object; and
for each data object relationship that is associated with a plurality of related data objects, generate a relational awareness score for the data object relationship with respect to each of the plurality of related data objects that are associated with the data object relationship, wherein the relational awareness score for a particular data object relationship with respect to a particular related data object is generated based at least in part on the individual absorption score for the particular related data object, the hierarchical absorption score for the particular related data object, and the operational absorption score for the particular related data object.

* * * * *